US007778899B2

(12) United States Patent
Scumniotales et al.

(10) Patent No.: US 7,778,899 B2
(45) Date of Patent: Aug. 17, 2010

(54) METHOD AND SYSTEM FOR OBJECT-ORIENTED WORKFLOW MANAGEMENT OF MULTI-DIMENSIONAL DATA

(75) Inventors: John Scumniotales, Redmond, WA (US); Jeff Hill, Snohomish, WA (US); Vorun Kreal, Bellevue, WA (US); Suhas A. Kelkar, Redmond, WA (US)

(73) Assignee: Serena Software, Inc., Redwood City, CA (US)

( * ) Notice: Subject to any disclaimer, the term of this patent is extended or adjusted under 35 U.S.C. 154(b) by 1736 days.

(21) Appl. No.: 10/894,658

(22) Filed: Jul. 19, 2004

(65) Prior Publication Data

US 2005/0114243 A1    May 26, 2005

Related U.S. Application Data

(63) Continuation-in-part of application No. 10/613,534, filed on Jul. 3, 2003.

(60) Provisional application No. 60/471,811, filed on May 19, 2003.

(51) Int. Cl.
*G06Q 40/00* (2006.01)
(52) U.S. Cl. .......................... 705/35; 705/7
(58) Field of Classification Search ............... 705/36 R, 705/35, 7
See application file for complete search history.

(56) References Cited

U.S. PATENT DOCUMENTS

| 5,359,724 | A | 10/1994 | Earle ........................... 395/425 |
|---|---|---|---|
| 5,519,875 | A | 5/1996 | Yokoyama et al. ........... 395/800 |
| 6,105,074 | A | 8/2000 | Yokote ........................ 709/328 |
| 6,253,191 | B1 * | 6/2001 | Hoffman ...................... 705/35 |
| 6,694,511 | B1 | 2/2004 | Yokote ........................ 717/148 |
| 6,801,199 | B1 | 10/2004 | Wallman |
| 6,954,761 | B2 | 10/2005 | Azuma |
| 7,110,971 | B2 | 9/2006 | Wallman |
| 7,117,176 | B2 | 10/2006 | Wallman |
| 2003/0033437 | A1 * | 2/2003 | Fischer et al. ................ 709/310 |
| 2003/0110113 | A1 * | 6/2003 | Martin ......................... 705/36 |

OTHER PUBLICATIONS

"About OLAP," URL=http://www.olapcouncil.org/about/aboutco. htm, 1997, download date May 2, 2003, 1 page.

(Continued)

*Primary Examiner*—James A Kramer
*Assistant Examiner*—James A Vezeris
(74) *Attorney, Agent, or Firm*—Black Lowe & Graham PLLC

(57) ABSTRACT

Methods and systems for managing and analyzing multi-dimensional data are provided. Example embodiments provide a Meta-Object Data Management System "MODMS," which enables users to arrange and to rearrange the hierarchical relationships of the data on an ad-hoc basis and allows the data to be analyzed using any set of attributes (dimensions) while the system is running. The MODMS represents heterogeneous data in a normalized (standardized) fashion using an object type management system that allows the coercion of one type of object into another different type of object and automatically resolves attribute dependencies. The MODMS supports object transitions for transforming an object from one type to another based upon meeting a defined set of criteria and subject to approval by designated entities. In one embodiment, the MODMS is used to implement an enterprise portfolio management system.

55 Claims, 46 Drawing Sheets

OTHER PUBLICATIONS

Codd et al., "Providing OLAP to User-Analysts: An IT Mandate," White Paper from E. F. Codd Associates, 1993.

Colliat, "OLAP, Relational, and Multidimensional Database Systems," *SIGMOD Record* 25(3):64-69, Sep. 1996.

"Executive Guide to Managing Information Technology Portfolios," URL=http://www.wa.gov/dis/portfolio, Apr. 2002, 17 pages.

Gates, "Project management tools: A new look," *Application Development Trends,* Mar. 2003, URL=http://www.adtmag.com/print.asp?id=7349, download date Apr. 30, 2003, 4 pages.

"Hyperion® Essbase® Data Mart Design Approaches," White Paper from Hyperion Solutions Corporation, Nov. 2000.

"ITaP: Portfolio Management Tool Requirements Definition and Tool Recommendation," URL=http://www.itap.purdue.edu/projects/detail.cfm?ProjectID=268, download date May 6, 2003, 2 pages.

Kuo, "Management Dashboards: Enabling Performance Management across the Enterprise," White Paper from BusinessObjects.

"Large-Scale Data Warehousing Using Hyperio Essbase OLAP Technology," White Paper from Hyperion Solutions Corporation, Jan. 2000.

Morris et al., "Hyperion Solutions: Meeting the Need for Packaged and Custom Analytic Applications," IDC White Paper, Jun. 2001.

Nuage, "BusinessObjects Application Foundation: The Framework for Delivering Analytic Applications," Data Sheet from BusinessObjects™, Jul. 2002.

"OLAP and OLAP Server Definitions: OLAP: On-Line Analytical Processing," URL=http://www.olapcouncil.org/research/glossaryly.htm, 1997, download date May 2, 2003, 9 pages.

"OLAP Council White Paper," URL=http://www.olapcouncil.org/research/whtpapco.htm, 1997, download date May 2, 2003, 4 pages.

"Product Development Consulting, Inc.: Portfolio Management," URL=http://www.pdcinc.com/practice/portfolio.html, download date May 6, 2003, 3 pages.

Rottach, "WebIntelligence: Integrated Query, Reporting, and Analysis for the Web," Data Sheet from BusinessObjects™, Jun. 2002.

Shaw, "Business Performance Management: Gaining Insight and Driving Performance," White Paper from Hyperion Solutions Corporation, 2003.

"The Business Intelligence Industry's Leading Products and Services," White Paper from BusinessObjects, 2001.

"The Role of the OLAP Server in a Data Warehousing Solution," White Paper from Hyperion Solutions Corporation, 2001.

Van den Bergh, "BusinessObjects™: Integrated Query, Reporting, and Analysis for the Enterprise," Data Sheet from BusinessObjects™, Apr. 2001.

* cited by examiner

Transition Table 3301

| name1 | Source_Type_ID | Dest_Type_ID | P_Approval_list | P.Criteria_Calculation |
|---|---|---|---|---|
| name2 | Source_Type_ID | Dest_Type_ID | P_Approval_list1 | P.Criteria_calculation |

3302, 3303, 3304, 3304

Approval List Defn 3320

| name1 | email | Y? |
|---|---|---|
| name2 | email | Y? |
| name3 | email | Y? |
| ... | | |
| name x | email | Y? |
| name y | email | Y? |

3321

Criteria Calculation 3330

```
ret = false;
If ((c=Object.Attrib.TagName)
        == "Effort")
    then if c.value > 0
        then ret = true;

return (ret);
```

FIG. 33

METHOD AND SYSTEM FOR OBJECT-ORIENTED WORKFLOW MANAGEMENT OF MULTI-DIMENSIONAL DATA

BACKGROUND OF THE INVENTION

1. Field of the Invention

The present invention relates to methods and systems for managing multi-dimensional data and, in particular, to methods and systems for creating, maintaining, and analyzing portfolios of multi-dimensional data, such as project, asset, and product investments, using an object-oriented paradigm.

2. Background Information

Today's companies, institutions, and other organizations are plagued by the vast amount of data which is now stored electronically and often needs to be analyzed by a variety of persons within the organization relative to business or organizational goals. The need to determine efficiently what data is available for analysis and how to analyze disparate data across organizational management boundaries is an ever-increasing problem as the data being tracked increases and as organizations implement more specialized or distributed functions. Managers, executives, employees, and other personnel, each with possibly differing needs for particular content and detail, need to analyze how different changes might effect the projects, products, resources, finances, and assets that each are responsible for. Rapid planning cycles, optimizing the use of critical resources, eliminating low value, non-strategic, redundant, and poorly performing assets and projects, and real time visibility of results are common goals in today's organizations.

The idea of "portfolio management" has evolved within such organizations as a way to emphasize that all assets of an organization, be they financial, human, equipment resources, human resources or other assets, require management and oversight in the same manner as traditional investments such as real property, commercial paper, and equity investments. Managing a group of assets as a portfolio encourages decision makers to view the member investments as a whole but also be able to analyze and scrutinize each discrete investment. Portfolio-based management of IT assets, such as technology investments, has become a popular example of applying portfolio management in a modern day organization. With portfolio-based management, IT information such as inventory lists, spreadsheets, and project management data are managed as assets that need to be analyzed as to how well they are meeting IT and organizational level objectives.

Traditionally, discrete systems have been developed to handle the data management and analysis needs of various entities within an organization. This phenomenon has grown out of the situation that the data for each entity is typically stored in its own subsystem and analysis tools have been developed that are targeted for the specific needs of that entity. Thus, to date, portfolio management systems have been created to separately manage each type of investment. For example, extensive financial management and analysis systems have been developed and used to analyze the financial assets of an organization such as stocks, bonds, and other commercial paper. Classically, the data for these systems is stored in a variety of (typically) relational data base management systems (RDBMS) so that queries can be executed to gain historical insight into the data. "What-if" scenarios are often handled by separate analysis packages that are specific to the type of data being analyzed and the type of analysis conducted. On-line analysis processing packages (OLAP packages) have been developed to support such "what-if" analysis with data that have a large number of axes/variables (often referred to as multi-dimensional data). For example, an inventory control system of a geographical distributed company may have resource data that can be viewed, analyzed, and sorted by geographic location, region, type of resource, date placed in operation, organization, responsible party, etc. An OLAP package attempts to collect and store such data according to how the data is expected be analyzed so as to optimize analysis efficiency (by reducing search times). In order to analyze the same data according to different views, the system is taken off-line and the data structures are recalculated to prepare for additional analysis. This can be a very time consuming and burdensome process if the data set is very large, as is typical.

Similarly, to handle project management, separate project management and analysis systems have been developed to aid managers and other executives in the project planning and execution lifecycles of projects within an organization. For example, there are systems that offer extensive milestone, critical path, and resource analysis for organization data that can be defined as a project. There exist tools today that allow a group of projects to be viewed as "investments" within a portfolio. These tools provide a way for project managers and other executives within an organization to analyze the costs and benefits of such projects in a similar manner to how financial analysts analyze financial investments.

BRIEF SUMMARY OF THE INVENTION

Embodiments of the present invention provide enhanced computer- and network-based methods and systems for managing and analyzing multi-dimensional data. Multi-dimensional data is data having a large plurality of attributes, such as data found in enterprise management systems. Example embodiments provide a Meta-Object Data Management System ("MODMS"), which enables users to arrange and to rearrange the hierarchical relationships of the data on an ad-hoc basis so that the data may be analyzed using any set of attributes (dimensions) while the system is running. The MODMS stores heterogeneous data in a normalized (standardized) fashion using an object type management system, which allows the arbitrary coercion of one type of object into another different type of object and automatically resolves attribute dependencies. The arbitrary coercion of one type of object into another different type of object permits and supports a system whereby any type of investment can be contained within any other type of investment, so investments can be moved within and across portfolios at will. In addition, investments can be transitioned from one type to another based upon specified criteria and/or approvals.

The Meta-Object Data Management System provides techniques for creating, managing, and analyzing relationships between, typically, heterogeneous, multi-dimensional data. In one example embodiment, the Meta-Object Data Management System comprises one or more functional components/modules that work together to implement an enterprise portfolio management system.

According to one approach, a Meta-Object Data Management System comprises an object type management subsystem, a meta-object instantiation subsystem, one or more data repositories that hold the data used to populate objects and object type definitions (for whatever other data is being managed), and an input/output interface. For example, the data repositories may store the financial investment data and the project management (investment) data of the enterprise. The object type management subsystem is used to define objects that correspond to the various data types (e.g., investment types) that will be created and managed by the MODMS. The meta-object instantiation subsystem is used to create instances of object types defined by the object type management system. The input/output interface represents any interface to the components of the MODMS and make take the form of a user command interface or a programmatic interface, such as an application programming interface definition.

In one aspect, each meta-object comprises an object identifier, an object type, and an attribute block. In another aspect, each object type is a collection of attributes defined from a global attributes data structure. An object type definition can be dynamically and automatically changed, by modifying one of the global attributes associated with that object type. When an object type definition is changed, the MODMS automatically adjusts each instantiated meta-object that is associated with that object type without recompiling or recreating the meta-objects. In yet another aspect, meta-objects do not obey traditional inheritance rules, and thus each meta-object can be type cast into a different object type. In another aspect, an attribute block stores all of the attribute values for a single meta-object. Each attribute value is stored between a beginning attribute tag and an ending attribute tag that identifies the attribute. The attribute tag-value pairs are stored in a serialized single variable within the meta-object. In one of these aspects, the tags are XML tags.

In yet another aspect, transitions from one object type to another object type can be defined and associated with an object type. In one of these aspects, when a meta-object is instantiated, it is associated automatically with instances of potential transitions that are defined for that object type. When specified criteria for a particular transition are met, the transition can be started. In another aspect, transitions have approvals associated with them that need to complete before a transition of the associated meta-object is permitted to progress to completion. Also, transitions can be defined that do not require criteria to be met or approvals to be granted. In addition, transition can be defined to transition between objects of different types or between objects of the same type (e.g., used to control other aspects of workflow). Transitions may specify that an object is to be moved to a new location after the transition occurs.

In another aspect, multi-dimensional views of the data can be dynamically created through the use of datasheets. A datasheet attribute specification is defined, and a corresponding datasheet is computed based upon the object instances associated with the datasheet. When datasheets are moved and copied to different locations, their resultant data and presentation is automatically adjusted for the new location. In one of these aspects, a datasheet is represented using a virtual object tree. A virtual object is generated for each grouping of data that matches a discrete combination of values of the attributes identified by the datasheet attribute specification. Then, a virtual object is generated for each specified group of groups, until all groupings and sub-groupings have been associated with virtual objects.

In yet another aspect, charts that represent multi-dimensional views of the data can also be dynamically created. Each chart is associated with a datasheet and the structure of the chart can automatically reflect the dimensions of the datasheet, or be manually controlled. Once a chart structure has been created, the presentation displayed by the chart structure can be automatically modified by selecting a different axis of the data to be presented. The resulting chart is then automatically populated using values of the underlying datasheet.

According to another approach, a portfolio management system is created using the MODMS. The portfolio management system comprises a portfolio manager for instantiating meta-objects to correspond to portfolio data and a portfolio analyzer for displaying instantiated meta-objects whose attribute values match an attribute specification.

In an example portfolio management system, heterogeneous investment data, for example financial investments and project management resource investments are managed and analyzed using a single abstraction, a meta-object. In addition, each investment data item can be converted to a different type of investment data item without reentering the original data. Investment data can be dynamically organized within other investment data irrespective of the type of investment data.

All of these approaches and aspects and other approaches and aspects are supported by the methods and systems of a Meta-Object Data Management System.

BRIEF DESCRIPTION OF THE DRAWINGS

FIG. 33 is an example block diagram abstraction of an object (type) transition table that contains transition definitions created and managed by an example object type management subsystem of a Meta-Object Data Management System.

DETAILED DESCRIPTION OF THE INVENTION

Embodiments of the present invention provide enhanced computer- and network-based methods and systems for managing and analyzing multi-dimensional data. Multi-dimensional data is data having a large plurality of attributes, such as data found in enterprise management systems. Example embodiments provide a Meta-Object Data Management System ("MODMS"), which enables users to arrange and to rearrange the hierarchical relationships of the data on an ad-hoc basis and allows the data to be analyzed using any set of attributes (dimensions) while the system is running. Thus, analysis of the data can appear to occur concurrently with transactions on the underlying data. The MODMS represents heterogeneous data in a normalized (standardized) fashion using an object type management system that allows the arbitrary coercion of one type of object into another different type of object and automatically resolves attribute dependencies. Attribute dependencies occur when the values of attributes of one object are calculated or dependent upon attribute values of another object. Such dependencies are useful in portfolio management applications where, for example, values that correspond to a cost attribute of multiple investment line items are aggregated (rolled-up) into a summary line item that represents the cost attribute of the portfolio as a whole. The ability to coerce one type of object into another different type of object permits and supports a system whereby any type of object can be contained within any other type of object, so, for example, investments in a portfolio management system can be moved within and across portfolios at will. In addition, investments can be transitioned from one type to another based upon specified criteria and/or approvals.

The Meta-Object Data Management System provides techniques for creating, managing, and analyzing relationships between, typically heterogeneous, multi-dimensional data. In one example embodiment, the Meta-Object Data Management System comprises one or more functional components/modules that work together to implement an enterprise portfolio management system. One skilled in the art will recognize, however, that the techniques of a MODMS may be used for the creation, management, and analysis of relationships between many different types of single and multi-dimensional data, and is not limited to use with portfolio management.

Figure 1:
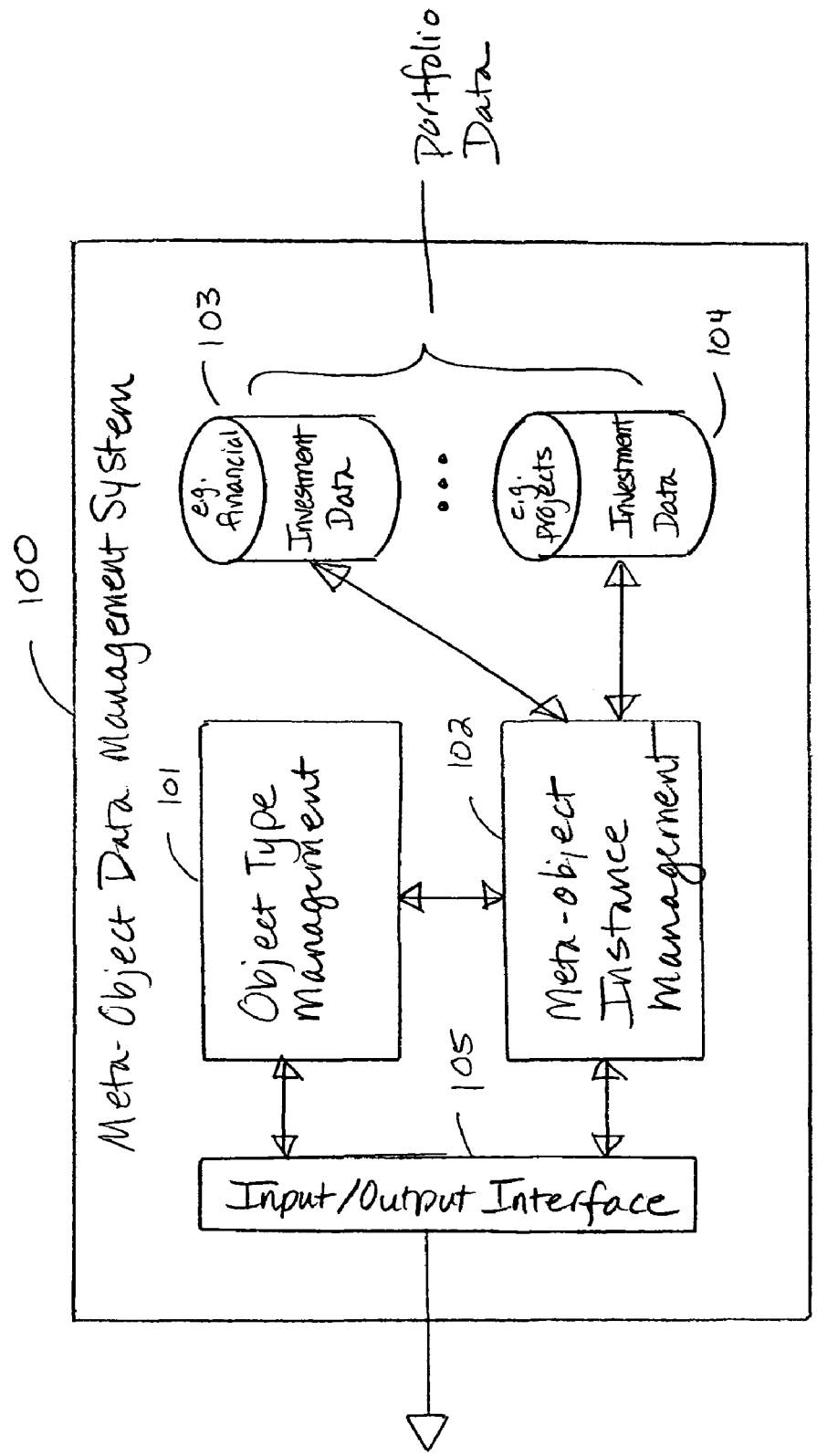
FIG. 1 is an example block diagram of components of an example Meta-Object Data Management System.

FIG. 1 is an example block diagram of components of an example Meta-Object Data Management System. One skilled in the art will recognize that these components may be implemented in software or hardware or a combination of both. As shown, a Meta-Object Data Management System may comprise an object type management subsystem 101; a meta-object instantiation subsystem 102; one or more data repositories 103-104 that hold, for example, the data used to populate objects and object type definitions (for whatever data is being managed); and an input/output interface 105. For example, the data repository 103 may store the financial investment data of an enterprise and the data repository 104 may store the project management (investment) data of the enterprise. The object type management subsystem 101 is used to define object types that correspond to the various data types (e.g., investment types) that will be created and managed by the MODMS. The meta-object instantiation subsystem 102 is used to create instances of the object types defined by the object type management system 101. The input/output interface 105 represents any interface to the components of the MODMS and make take the form of a user command interface or a programmatic interface, such as an application programming interface definition.

More specifically, the object type management subsystem 101 defines and manages global attributes and creates and manages object type definitions, which are each a collection of one or more global attributes. An excerpt from an example set of global attribute definitions for an example enterprise portfolio management system is attached as Appendix A, which is herein incorporated by reference in its entirety. Example global attributes may include characteristics of the data to be stored and analyzed such as a description, cost to date, tangible benefits, intangible benefits, etc., or any other definable characteristic whose value can be specified. Global attributes can be added, deleted, and modified while the MODMS is running. Once an object type definition is created, its collection of attributes can be adjusted. For example, attributes can be added to or deleted from an object type definition. Further, when an attribute definition is adjusted, any changes are percolated throughout the object type definitions that include that attribute and preferably throughout meta-object instances of the modified object type.

The object type management subsystem 101 also defines and manages object transitions between the object types defined and managed by the subsystem. Object transitions are progressions that allow an instantiated object of one (source) object type to be transformed (by the MODMS) into another (destination) object type when the "state" of the object (attribute values) meets designated criteria and any required approvals have been granted. Object transitions also support "workflow" management by allowing an instantiated object to be moved to a new location when the transition is approved and performed (or to a different location if the transition is rejected). Accordingly, object transitions also may occur without changing the object type and based upon the state of the object changing. The MODMS object type management subsystem 101 supports object transitions by providing for the coercion of one type of object into another without recompiling the system. Object transition definitions can be added, deleted, and modified while the MODMS is running. When an object transition definition is adjusted, preferably any changes are percolated to the source object type definitions that are affected by the change, and thus will affect newly instantiated objects of those object types. In some embodiments, the changes are percolated to existing object transitions; however, to do so, rules for governing behavior for "in-progress" transitions need to be defined. For example, if an existing object transition has been initiated and approval requests have been sent out, it may be more difficult to change the behavior of the transition. Some embodiments simply don't allow for changes to in-progress transitions.

The meta-object instantiation subsystem 102 supports the creation of instances of objects that are defined by the object type management system 101. The meta-object instantiation subsystem 102 implements an abstraction of a "higher level" object, known as a meta-object, that is not tied to a particular object type, but rather implements a broader object concept that is used to unify the creation and management of all object types that correspond to user data. For example, within a portfolio management system, a meta-object is instantiated (created) to correspond to each "investment" type in the system, including, for example, portfolios, projects, products, financial assets, equipment, initiatives, operations, applications, processes, activities, human resources, other resources, other assets, etc. A representation of a hierarchy of investments is created based upon the relationships desired between investments by instantiating a meta-object that corresponds to one investment as a child of another meta-object that corresponds to another investment. The object type definitions themselves do not define the containment or inheritance relationships as common in other object-oriented systems. Rather, the containment hierarchy of instantiated meta-objects defines the relationships between the investments. Once meta-objects are instantiated, they can be moved, copied, deleted, and their attributes changed. When a meta-object is moved or copied, the attribute values of the original parent meta-object instance and the new parent meta-object instance that are dependent upon children meta-object instances are automatically adjusted (rolled up) to reflect the new containment structure. Thus, for example, when an instantiated investment object is moved to a new portfolio, the attributes of the original parent portfolio and the new parent portfolio are automatically recomputed. Similarly, when an object type definition is changed, instantiated meta-objects of the modified object type are automatically adjusted to reflect changes to the object type definition. Thus, for example, if the definition of a human resource object type is changed to add an "age" characteristic, then instances of human resource objects already created by the meta-object instantiation system 102 are automatically updated to include an "age" attribute with a default value.

In addition to defining representations for types of objects and for managing the data associated with them, the MODMS supports the concurrent analysis of data (e.g., investment data) through the use of datasheets. A datasheet is a multi-dimensional view of the underlying instance hierarchy based upon a datasheet attribute specification (e.g., a property sheet). For example, a new multi-dimensional view of the portfolio investment hierarchy can be formed dynamically by instantiating a new datasheet based upon specified properties. In one embodiment, the datasheet properties (the attribute specification) specify axes (data columns of interest), grouping, sorting, and filtering. A corresponding datasheet is then determined (calculated) by the system and displayed. Once a datasheet is generated, its properties can be adjusted, thereby causing an automatic adjustment and recalculation of the resultant datasheet. In one example embodiment, a datasheet is associated with a particular meta-object in the instance hierarchy and relates to the objects within that sub-tree of the containment hierarchy. A datasheet (or more precisely, its attribute specification) can be deleted, moved, or copied, thereby automatically causing adjustments to be made to the resultant datasheet dependant upon revised location and adjustments to be made to the associated meta-object if applicable.

Although the techniques of a Meta-Object Data Management System are generally applicable to any type of investment, the terms "investment" and "asset" are used generally to imply any type of data having one or more attributes whose cost or benefit can be assessed. One skilled in the art will recognize that an investment is not limited to traditional investment types such as real property, commercial paper, and equity investments. Rather, a MODMS can be used to support the creation, management, and analysis of any type of data object, whether commonly considered an "investment" or not.

Also, although the examples described herein often refer to portfolio management and enterprise portfolio management, one skilled in the art will recognize that the subsystems (components) of a MODMS are defined generically and that the techniques of the present invention can also be used in any system that desires to create and manage different types of data objects whose relationships to each other may change over time. In addition, the concepts and techniques described are applicable to other data management systems, including other types of applications that use data repositories to store related information, for example, inventory control systems, product databases, manufacturing systems, corporate finances, etc. Essentially, the concepts and techniques described are applicable to any data management environment. In the following description, numerous specific details are set forth, such as data formats and code sequences, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow.

In addition, although certain terms are used primarily herein, one skilled in the art will recognize that other terms could be used interchangeably to yield equivalent embodiments and examples. For example, it is well known that equivalent terms could be substituted for such terms as "object," "attribute," "dimension," etc. In addition, terms may have alternate spellings which may or may not be explicitly mentioned, and one skilled in the art will recognize that all such variations of terms are intended to be included.

Figure 2:
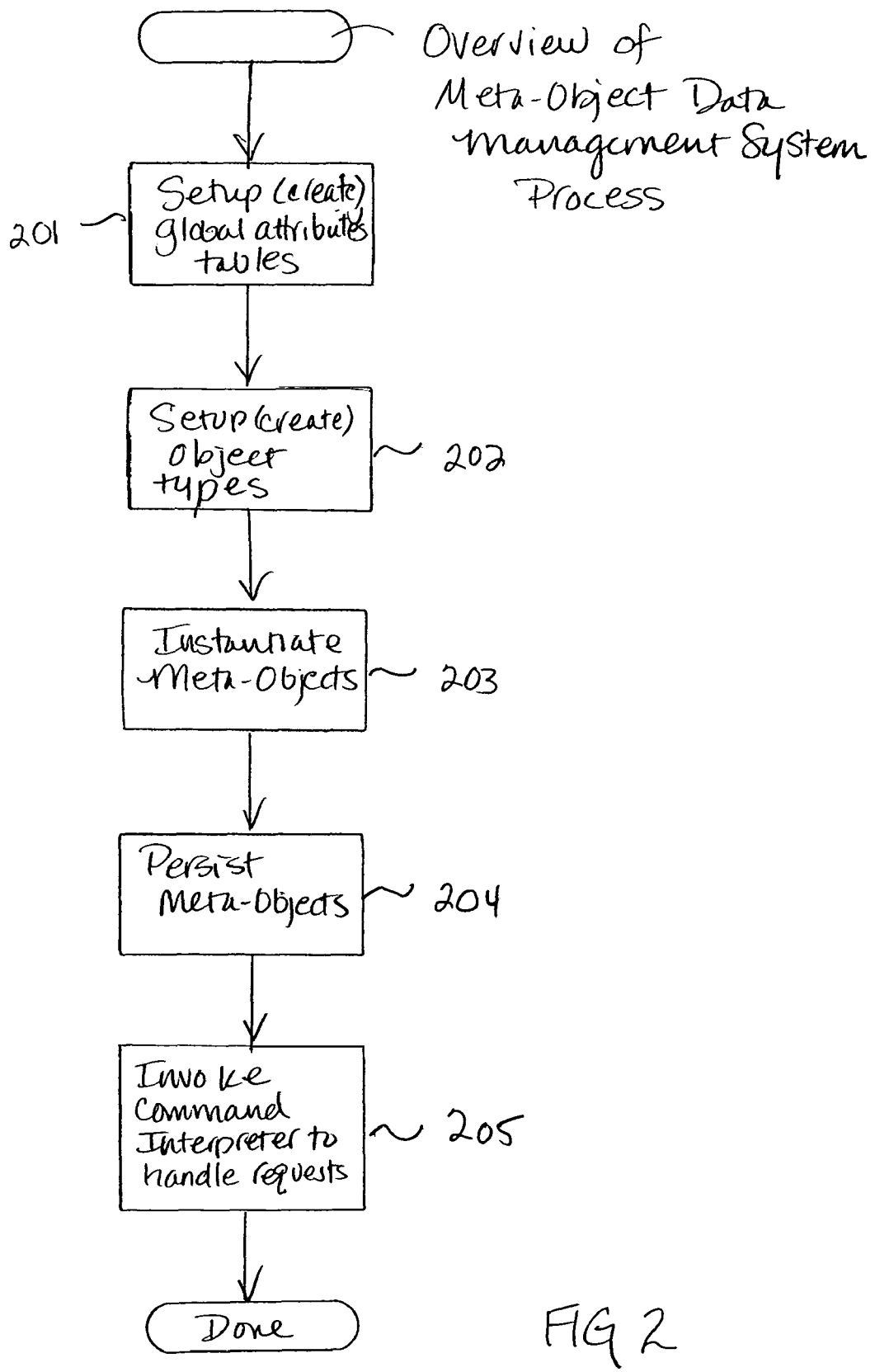
FIG. 2 is an example overview flow diagram of typical operations of an example Meta-Object Data Management System.

FIG. 2 is an example overview flow diagram of typical operations of an example Meta-Object Data Management System. In step 201, the MODMS supports the setup (creation) or management of a global attribute tables. The global attribute tables are used in step 202 to define (create) object types. In addition (not shown), the MODMS supports the creation and management of object transitions from one object type to another same or different object type. Other functions (not shown) are also supported. One skilled in the art will recognize that any well-known technique can be used to implement a global attributes table, and that any data structure equivalent of a "table" may be employed. Each object type definition is based upon a collection of global attribute definitions and a set of methods (functions) shared by all meta-objects. Typically, as shown in the example global attributes table excerpt of Appendix A, each global attribute is associated with one or more attribute values and the table contains one or more "attribute value definitions" (fields) that describe how each attribute value to be used or interpreted.

Each attribute may define more than one set of values. For example, an attribute may define one set of values that correspond to target values and define a different set of values (and potentially calculations) that correspond to actual values. An attribute that defines multiple sets of values is referred to as a "dimensioned" attribute. One skilled in the art will recognize that a dimensioned attribute is an attribute that defines multiple value sets and that each dimension instead could be represented as its own attribute. In the example global attribute table excerpted in Appendix A, each attribute definition contains a tag name for identification, a descriptive name, an indication of whether multiple attribute values (dimensions) are associated with the attribute and, for each dimension of the attribute or for a single valued attribute, an attribute value definition, which is a set of fields as that further define that value. For example, each attribute value definition typically defines:

if dimensioned, a type of dimension (e.g., target, plan, baseline, scenario, actual);

an indication of whether the attribute value can be rolled up to a corresponding parent attribute value and, if so, the type of roll-up function associated with that value;

an indication of whether the attribute value is calculated, and, if so, the calculation function for that attribute value;

an indication of whether the attribute value is a timephased attribute and, if so, then the type of timephased attribute is indicated.

Figure 5:
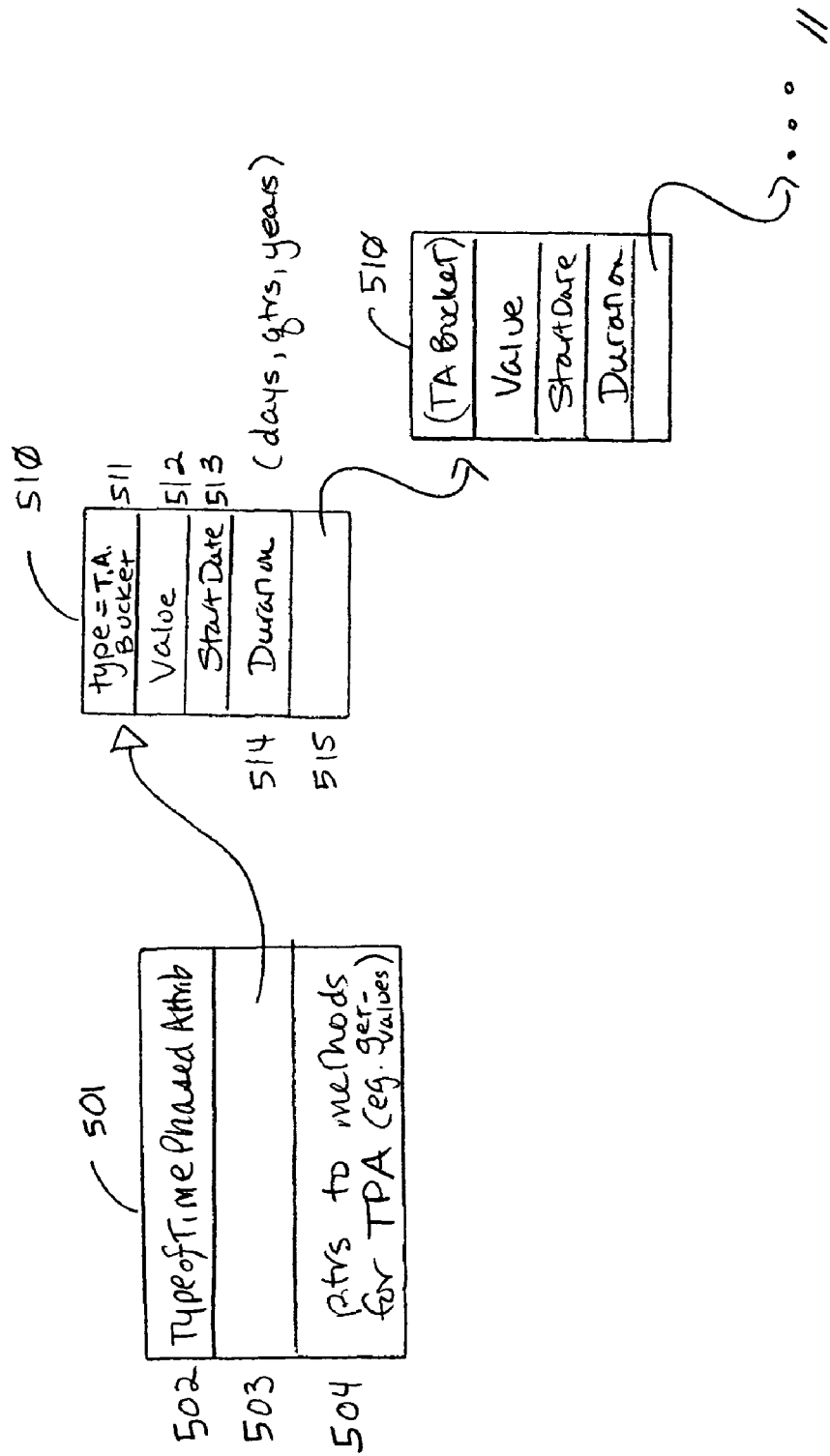
FIG. 5 is an example block diagram of an in-memory data structure representation of time-phased attribute.

Generally, time-phased attributes are attributes that have discrete values or ranges of values over periods of time, and described in more detail with reference to FIG. 5. Other fields and types of values (not shown) may also be defined in an attribute value definition and in an attribute definition. In step 203, meta-objects are instantiated using the created object types to correspond to the data that is to be managed and analyzed. In step 204, these meta-objects are persisted into storage. Then in step 205, a command interpreter is invoked to handle requests to manipulate the instantiated meta-objects and to manage the object type management subsystem.

Figure 3:
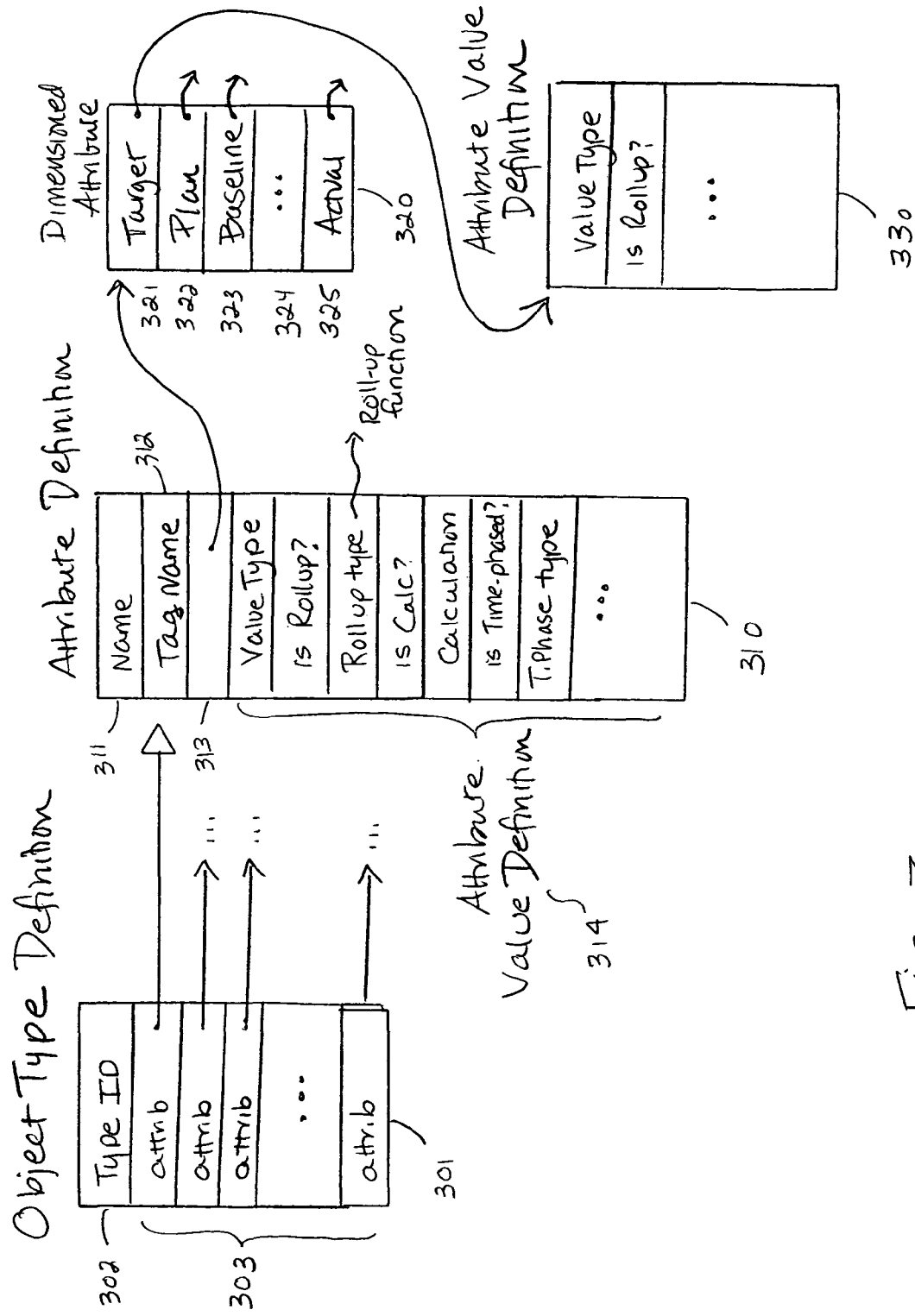
FIG. 3 is an example block diagram abstraction of an object type definition created and managed by an example object type management component of a Meta-Object Data Management System.

An administrator of an application that incorporates the MODMS typically uses an interface to the object type management system to define object types for the data to be manipulated by the application. The administrator creates a new object type (using well-known types of interfaces such as dialog boxes, tables, forms, Q&A etc.) by determining which of the global attributes are grouped together to form the new object type. FIG. 3 is an example block diagram abstraction of an object type definition created and managed by an example object type management component of a Meta-Object Data Management System. Each object type definition 301 created by the object type management component of a MODMS comprises at least an object type identifier 302 and a collection of one or more attributes 303. Each attribute of the collection 303 is an indicator to an attribute definition 310 stored in the MODMS, for example as one or more rows of a table similar to the table described in Appendix A. The data structures shown in FIG. 3 are abstract representations of the data, and one skilled in the art will recognize that any well-known method for storing tabular or linked information may be used. An attribute definition 310 defines all of the fields that comprise the attribute. As described with reference to FIG. 2, each attribute definition 310 typically comprises a descriptive name field 311, an identification tag name field 312, and an indicator to one or more attribute value definitions, for example, attribute value definition 314. When the attribute definition 310 defines a dimensioned attribute, then an indicator 313 is present that refers to multiple attribute value definitions 330 through a dimensioned attribute table 320. Specifically, for each value set that comprises a dimension of the attribute, there is an indicator, such as indicators 321-325 in the dimensioned attribute table 320 that refers to an attribute value definition 330. The different value sets for a dimensioned attribute may correspond, for example, to target values 321, plan values 322, baseline values 323, actual values 325, and other such value sets 324. These different dimensions of an attribute are present to convey the concept that a single attribute may have different values depending upon its purpose, lifecycle state, or for other reasons. Each attribute value definition 314 or 330 comprises, for example, a type of value; an indication of whether the attribute value roles up to a parent node and, if so, a rollup function; an indication of whether the value is a calculated value and, if so, a calculation function; and an indication of whether the attribute is a time-phased attribute and, if so, the type of time phased attribute, etc. One skilled in the art will recognize that even if the attribute is not a dimensioned attribute, the attribute value definition 314 may be stored in the table 320 using the same mechanism as for a dimensioned attribute instead of being stored directly in the attribute definition 310 as shown in FIG. 3. (Although attribute value definition 314 can be represented by the same structure as 330, storing the attribute value definition outside of the dimensioned attribute table may yield processing efficiencies.)

Figure 4:
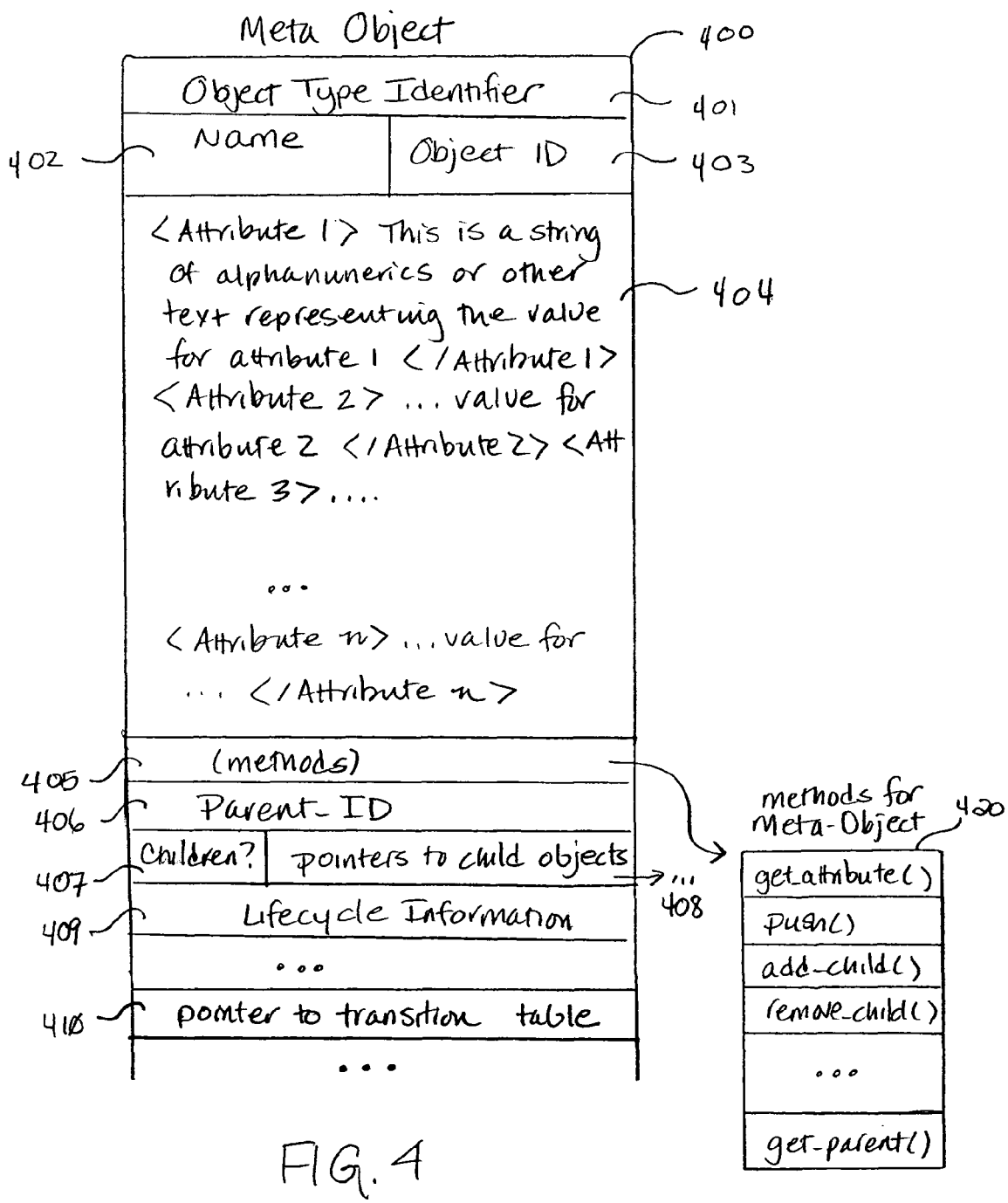
FIG. 4 is an example block diagram of an example meta-object.

Once the object type definitions have been created using the object type management component of the MODMS, then a user of the application that incorporates the MODMS can instantiate meta-objects using a meta-object instantiation component of the MODMS. FIG. 4 is an example block diagram of an example meta-object. Meta-object 400 includes an identifier of the type of object that is instantiated 401, a name 402, an identifier of the instantiated object 403, and an attribute block 404, which stores the collection of attribute values for all of the attributes defined for the object type denoted by object type identifier 401. The attribute value definitions of each attribute (such as those described with reference to FIG. 3) are used to determine how each attribute value in attribute block 404 is to be interpreted and treated. In one embodiment, the attribute block is implemented as a "tagged" data structure of, typically, alphanumeric text that represents the value for each attribute between a set of tags, such as XML tags. So, as shown in FIG. 4, the first attribute value is delimited with the beginning tag "<Attribute 1>" and with the ending tag "</Attribute 1>." The tag used in the attribute block 404 corresponds to the tag defined as tag name 312 in FIG. 3. Each meta-object 400 typically includes other fields, such as: an indicator 405 to a table of methods 420 that define the behavior of each meta-object 400; an indication of a parent meta-object 406 in an instance hierarchy; a flag 407 that indicates whether the object has any associated children meta-objects; indicators 408 to the children meta-objects of meta-object 400 in the instance hierarchy; lifecycle information 409; a pointer to a table of potential object transitions associated with the meta-object 410; and other fields (not shown).

One perspective of the attribute block 404 is that of a serialized "cache" of attribute values within an instantiated object. Because the attribute block 404 contains serialized data and stores each attribute value in a normalized (standard) fashion, the values of the attributes can be easily persisted, for example, using well-known database management technology. In addition, using a tag methodology for the block 404 allows the attribute cache to be searched efficiently. Because a meta-object is an abstraction provided by the MODMS, one skilled in the art will recognize that the abstraction can be physically implemented according to a variety of techniques. For example, when an already instantiated meta-object is read and assembled from persistent storage to be manipulated by the MODMS, the various implementations of an MODMS may temporarily store the attribute values of attribute block 404 information as discrete data structures using traditional object-oriented techniques that instantiate objects for each value based upon the attribute type, etc. Other techniques, such as more traditional monolithic programming techniques may also be employed to implement a meta-object abstraction. From the perspective of a user of an application built upon MODMS, however, each meta-object looks and acts the same regardless of the type of object that is instantiated.

If one of the attribute values of the attribute block 404 is a time-phased value, then the value is more specifically described as a series of time-phased values, where each time-phased value is in effect over a range of time. For example, a time-phased attribute may have a discrete value for each week over a three-year period. FIG. 5 is an example block diagram of an in-memory data structure representation of time-phased attribute. Each time-phased attribute 501 has an associated time-phased attribute type 502; an indicator 503 to a collection of one or more time-phased buckets 510; and pointers to the methods 504 that can be used to manipulate the type of time-phased attribute denoted by type 502. For example, a time-phased attribute typically defines methods for getting and setting values for a particular range. Each time-phased bucket 510 is a data structure that indicates the range over which a value is effective. For example, each bucket 510 may comprise a bucket type 511, a value 512 for the range indicated, a start time period indication 513, a duration 514 that defines the range (for example, in number of hours, days, quarters, years, etc.), and an indicator 515 to the next bucket in the collection or that signifies the end of the list.

Note that the values of a time-phased attribute can be stored in the attribute block 404 delimited by tags in a manner that is similar to every other attribute value. In this case, a bucket collection is delimited by a pair of tags, which in turn contains nested tags that define the values (value, start time period, duration) for each time bucket. For example, if "Administration" is the tag name of a time-phased (labor) attribute type, then the cache for the time buckets may read as:

```
<Administration>
    <Bucket Collection>
        <Bucket>
            100, 1/1/2003, 30
        </Bucket>
        <Bucket>
            250, 2/1/2003, 28
        </Bucket>
        ...
    </Bucket Collection>
</Administration>
```

The text "100, 1/1/2003, 30" in this example indicates 100 units (of labor), a start date of Jan. 1, 2003, and a duration of 30 days. The value of each bucket type is preferably stored in its smallest unit, so that it can be easily converted to other time period units as needed.

Figure 6:
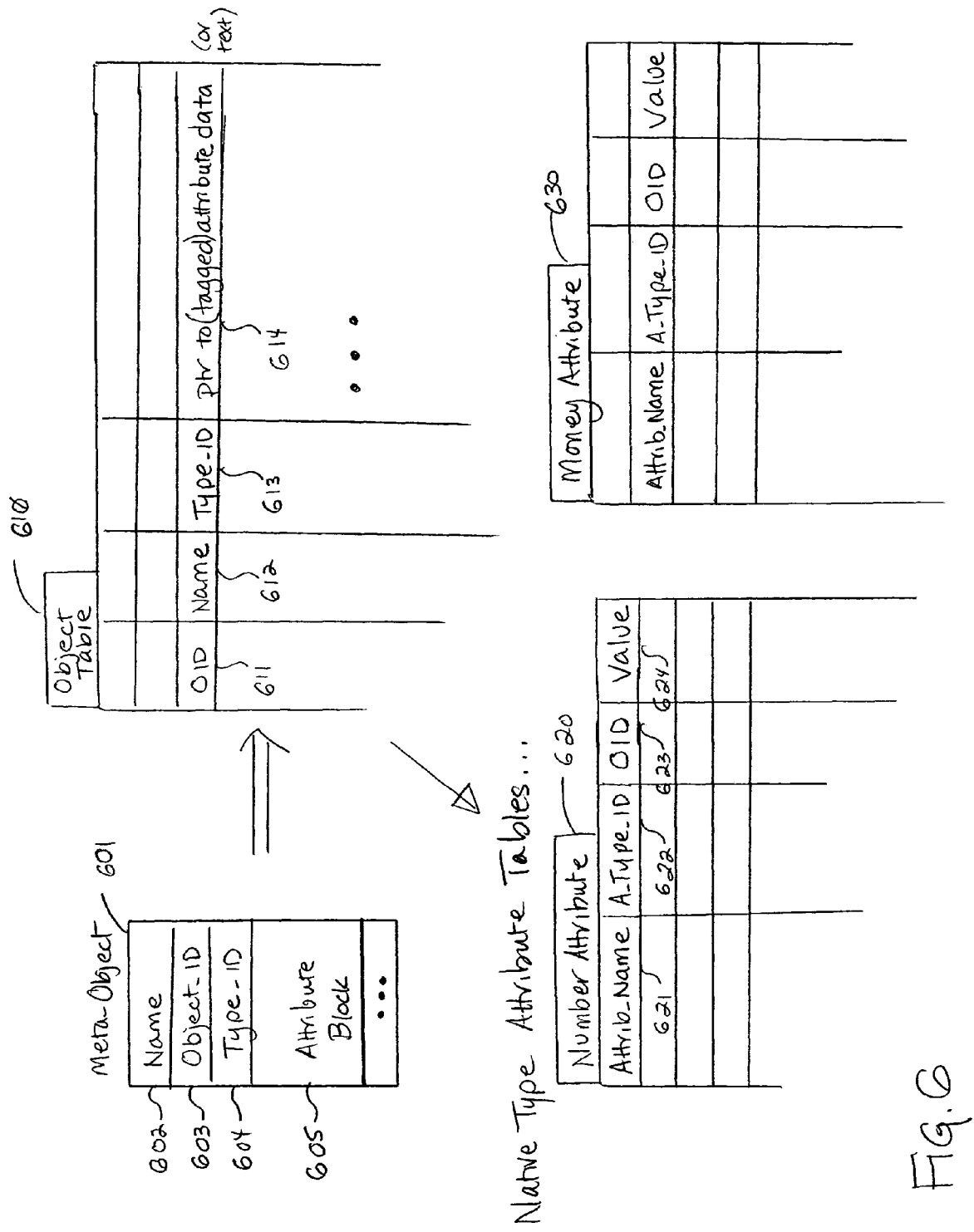
FIG. 6 is a block diagram of an example in-memory data structure representation of a meta-object.

Since a typical application that incorporates a MODMS creates and manages a very large collection of data, the physical representation of meta-objects can effect the efficiency of the application. In a typical implementation of a MODMS, each meta-object is stored as records in a multitude of tables, which are accessed by the management and analysis components of the MODMS as needed. FIG. 6 is a block diagram of an example storage representation of a meta-object. In FIG. 6, instantiated meta-object 601 is an abstract data structure representation of the meta-object 400 shown in FIG. 4 and contains the same fields: name 602; an object identifier 603; an identification of the object type 604; an attribute block 605, and other fields (not shown). The instantiated meta-object 601 is shown stored as records in object table 610 and native attribute tables 620 and 630. Only some of the tables used to represent meta-object 601 are shown in FIG. 6. For each object, the MODMS stores a record in object table 610 that contains the object identifier 611, the name of the object 612, an identifier of the object type 613, and an indicator 614 to the (tagged) attribute block. One skilled in the art will recognize that instead of an indicator to the attribute block, the attribute data may be stored in the object table itself. The fields in each record in object table 610 thus correspond to the meta-object data structure 601. For each attribute indicated by the attribute block indicator 614, the MODMS also stores a record in a table that corresponds to the "native" type of the attribute, thus cross-referencing the meta-objects by native attribute type. For example, if the attribute block contains an attribute that ultimately resolves to a "number," then a record is created in a number attribute table 620 that indexes the meta-object 601. Or, for example, if the attribute block contains an attribute that is of a type that is ultimately a money attribute, then a record is created in a money attribute table 630. Example native attribute types include such types as numbers, dates, money, text, flags, and time-phase attributes, although one skilled in the art will recognize that depending upon the use of the MODMS, different native types may be useful. Storage of each attribute in these various native attribute type tables allows attributes to be indexed and accessed efficiently based upon their types, as opposed to searching each instantiated meta-object for instances that have attributes of a specific type. This capability may be useful, for example, when an attribute definition is changed and all of the objects that have been instantiated using that definition need to be updated accordingly. Thus, each record in a native type attribute table indicates the object identifier 623 of the corresponding instantiated meta-object 601 that contains an attribute value of that type. For example, each record in number attribute table 620 stores the attribute name 621; an identifier of the attribute (sub)type 622; the identifier of the corresponding instantiated meta-object 623; and the value 624 specified for that attribute in the instantiated meta-object.

Figure 7:
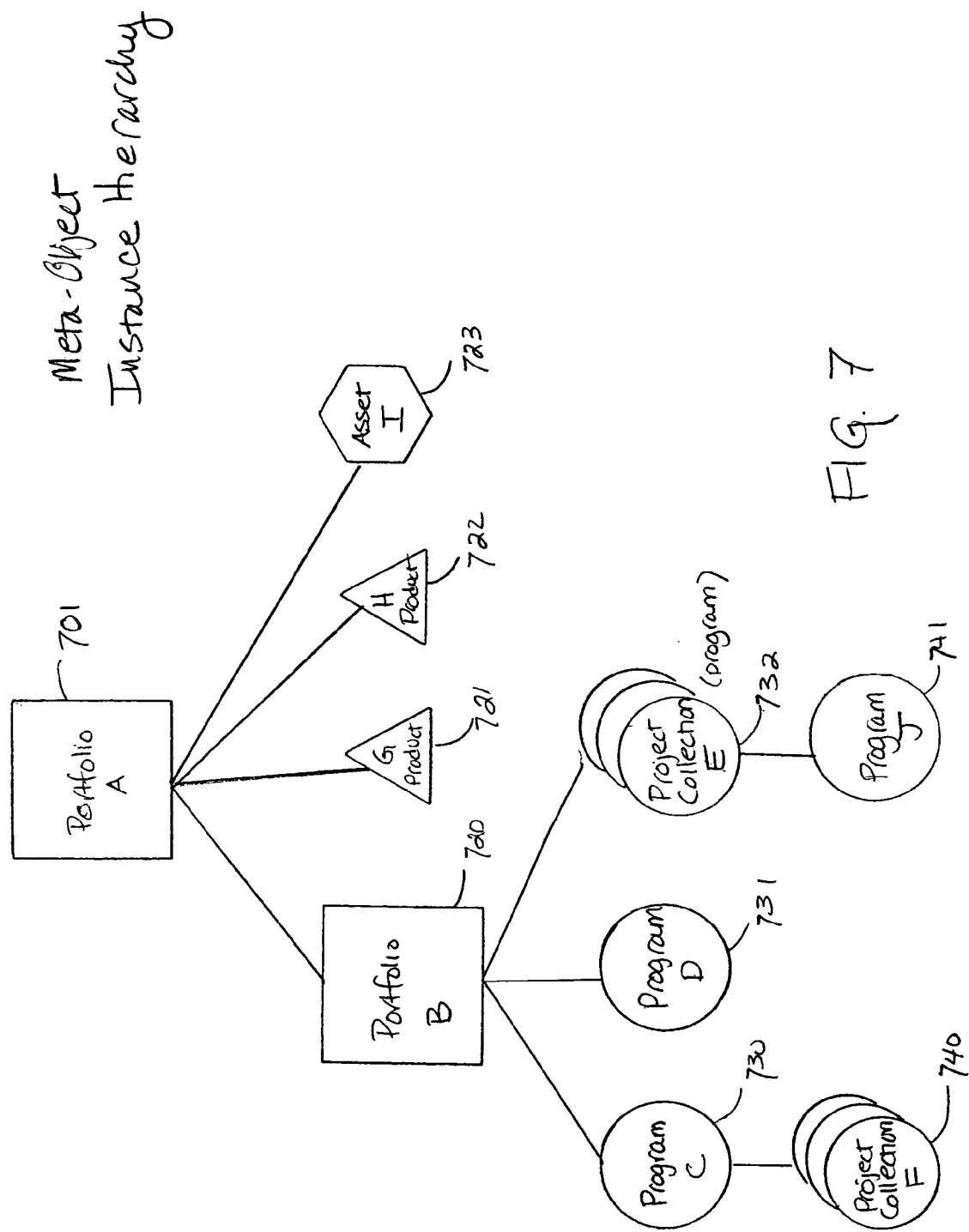
FIG. 7 is a block diagram of an abstraction of an example meta-object instance hierarchy created using an example Meta-Object Data Management System.

As previously mentioned, a meta-object is instantiated as part of a hierarchy of object instances. FIG. 7 is a block diagram of an abstraction of an example meta-object instance hierarchy created using an example Meta-Object Data Management System. The meta-object instance hierarchy defines the containment relationships of the instantiated meta-objects and is independent of the object type definitions. That is, any meta-object can be a child of any other meta-object providing it is instantiated as a child of that meta-object. This allows, for example, different types of investments to become part of other types of investments and to "behave" like they belong to the parent investment without worrying about the strict inheritance rules of traditional object-oriented programming techniques. (Using traditional object-oriented techniques, an object can be manipulated using the same methods as its "parent" object of a different object type only if the child object type definition is derived when it is created from the parent object type definition.) So, in FIG. 7, for example, a portfolio "A" meta-object 701 contains a portfolio "B" meta-object 720; two product "F" and "G" meta-objects 721 and 722; and an asset "I" meta-object 723. Further, the portfolio "B" meta-object 720 contains a project collection "E" meta-object 732; program "C" meta-object 730, and program "D" meta-object 731. The program "C" meta-object 730 further contains a project collection "F" meta-object 740. Conversely, project collection "E" meta-object 732 contains a program "J" meta-object 741. Thus, in one case a program type meta-object is a parent of a project collection type meta-object; whereas, in the other case, a project collection meta-object is a parent of a program meta-object. Thus, the containment relationships define the object ancestral relationships and not the object definitions themselves.

Figure 8:
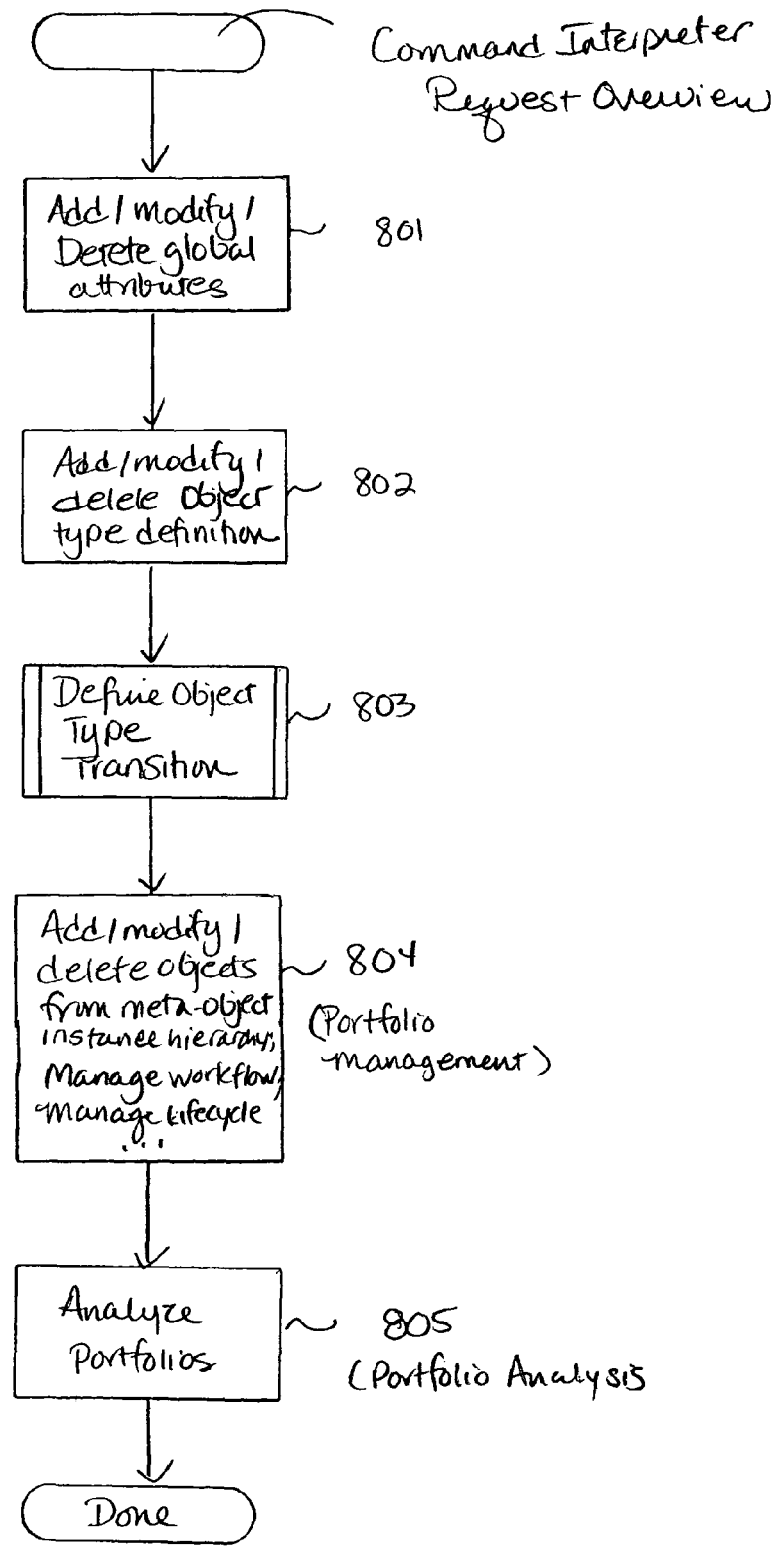
FIG. 8 is an example overview flow diagram of a command interpreter for an example Meta-Object Data Management System.

Once meta-objects have been instantiated to correspond to the initial data set, a command interpreter is invoked to manage the data and to provide analysis functions. FIG. 8 is an example overview flow diagram of a command interpreter for an example Meta-Object Data Management System. In step 801, the MODMS allows a user (for example, an administrator of an application that incorporates the MODMS) to add, modify, or delete global attributes. An example global attributes table was described with reference to FIG. 2. In step 802, the MODMS allows a user to add, modify, or delete an object type definition such as the object type definition described with reference to FIG. 3. In step 803, the MODMS allows a user to define object transitions from one object type to another same or different object type. An example user interface and routines for defining object transitions are described with reference to FIGS. 30-34. In step 804, the MODMS allows a user to add, modify, or delete instantiated meta-objects from the meta-object instance hierarchy, for example, the hierarchy shown with reference to FIG. 7. In an example Enterprise Portfolio Management System built to incorporate the MODMS, these functions are presented as part of a portfolio management application. One such example Enterprise Portfolio Management System is described with reference to FIGS. 17-29. In step 805, the MODMS allows a user to analyze aspects of a portfolio. Portfolio management routines in an example Enterprise Portfolio Management System are described further with reference to FIGS. 19-23. In an example Enterprise Portfolio Management System built to incorporate the MODMS, these functions are presented as part of a portfolio analysis application. Portfolio analysis routines are typically tied to the applications that incorporate the MODMS and so are discussed as they relate to datasheet capabilities of an example portfolio management system embodiment, such as that described further with reference to FIGS. 24-28.

One skilled in the art will recognize that there are many well-known methods for implementing interfaces for the addition, deletion, and modification of global attributes (step 801) and the addition and deletion of object type definitions, of object transitions, and of instantiated meta-objects (steps 802, 803, and 804). For example, an interface such as a dialog box-based interface, a form based application, or a direct manipulation interface can be used to modify tables that store global attributes, object type definitions, object transitions, and meta-objects. One such user interface (part of an administrator application that incorporates a MODMS) for modifying object type definitions is described with reference to FIG. 29. As mentioned previously, modifications to an object type definition, however, result in automatic adjustments to instantiated objects. Thus, when an object type definition is modified, the MODMS preferably locates all instantiated objects of that object type and modifies their contents accordingly to bring them up to date. FIGS. 9-12 describe some of the routines used to modify object type definitions and to automatically adjust instantiated objects as a result.

Figure 29:
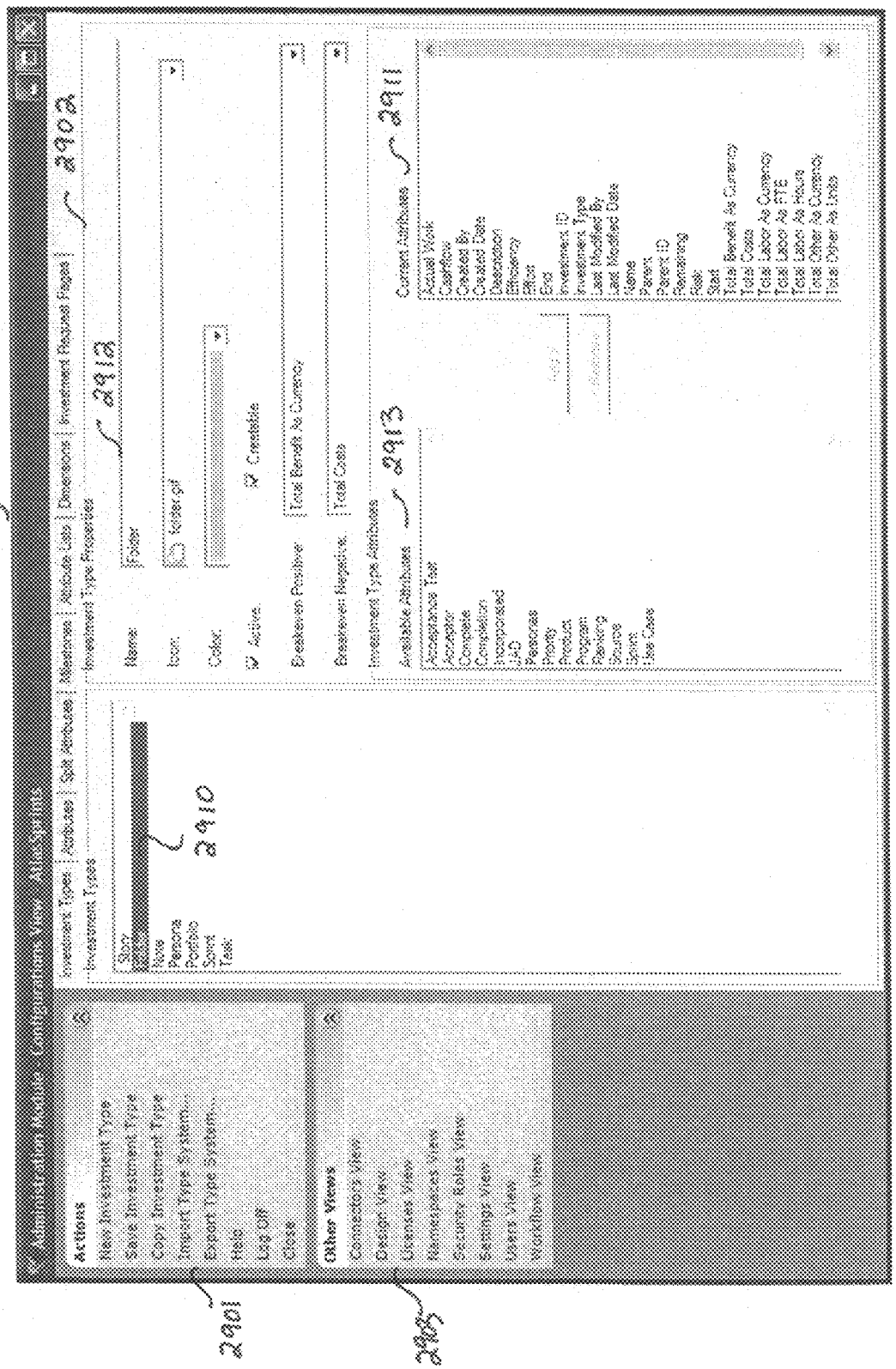
FIG. 29 is an example screen display of a configuration view of an Administration Module of an example Enterprise Portfolio Management System implemented using an example Meta-Object Data Management System.

FIG. 29 is an example screen display of a configuration view of an Administration Module of an example Enterprise Portfolio Management System implemented using an example Meta-Object Data Management System. The user interface illustrated by FIG. 29 can be used, for example, to invoke the MODMS routines used to modify object type definitions. One skilled in the art will recognize that other user interfaces can be substituted. In FIG. 29, administration module dialog 2900 displays a set of actions 2901 that can be initiated by a user, views 2903 that can be selected to show other setup and configuration aspects, and tabbed forms (dialogs) that can be selected to configure investment types, attributes, milestones, etc. For example, dialog 2902 allows the user to define various properties of a selected investment type. Example dialog 2902 shows the current attributes 2911 for a currently selected investment object 2910 named "folder" 2912. Additional selectable attributes for the selected investment type 2910 are shown in available attributes list 2913. The actions list 2901 provides functions for creating and managing investment types. For example, the "New Investment Type" action will present a dialog similar to that shown in dialog 2902. The different views 2903 allow the user to view and configure other aspects of the MODMS. For example, a user selects the Workflow View 2904 to define object transitions from one type of object to another type. Object transitions are described further with reference to FIGS. 30-34.

Figure 9:
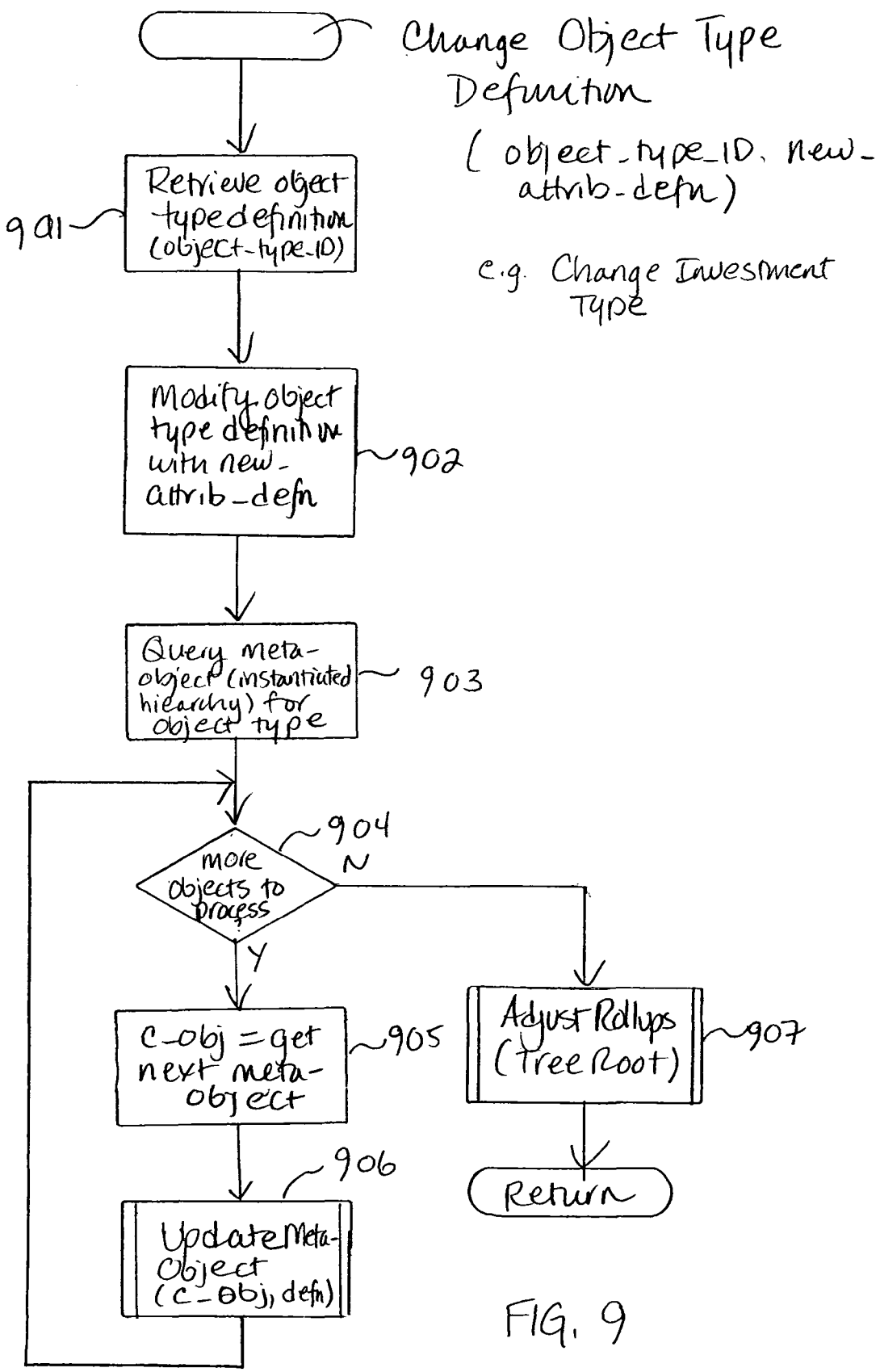
FIG. 9 is an example flow diagram of a Change Object Type Definition routine for modifying an object type definition in an example Meta-Object Data Management System.

FIG. 9 is an example flow diagram of a Change Object Type Definition routine for modifying an object type definition in an example Meta-Object Data Management System. This routine can be used, for example, to change the attributes of an investment type such as a "project." The routine is shown with steps for modifying an object type by adding a new attribute definition, and assumes a higher level user interface for selection of the change to be made (i.e., what attribute to delete or add). One skilled in the art will easily recognize how to modify the routine to change an existing attribute by deleting a designated one and replacing it with a new attribute definition or how to modify it in other ways. The routine thus takes as input a designation of the object type whose definition is to be modified, and a new attribute definition.

Specifically, in step 901, the MODMS retrieves the object type definition designated by the object_type_ID input parameter. In step 902, the MODMS modifies the retrieved object type definition by adding the new attribute definition that was designated as an input parameter to the routine. This new attribute definition is typically provided, for example, by an I/O interface to an administrator that is permitted to change the definition of attributes in a global attribute table. Next, in step 903, the MODMS queries the meta-object instantiation hierarchy to locate all of the instantiated objects of the designated object type. Since each stored meta-object includes an indication of its object type, the instantiation hierarchy is searched based upon that field. Steps 904-907 execute a loop that, for each matching meta-object, updates the meta-object with the new attribute definition and adjusts attributes that have rollup characteristics as necessary. More specifically, in step 904, the routine determines whether there are more meta-objects to process and, if so, continues in step 905, else continues in step 907. In step 905, the next instantiated meta-object is determined. Then, in step 906, an Update Meta-Object routine is invoked to add the new attribute definition to the current instantiated meta-object being processed and to perform any specified calculations, and the routine returns to the beginning of the loop in step 904. The Update Meta-Object routine is described further with reference to FIG. 10. In step 907, once all of the meta-objects that need to be updated have been updated, an Adjust Rollups routine is invoked to update the entire instantiation tree by adjusting any attributes with rollup values, since the definitions of instantiated meta-objects may have changed. The Adjust Rollups routine described further with reference to FIG. 11.

Figure 10:
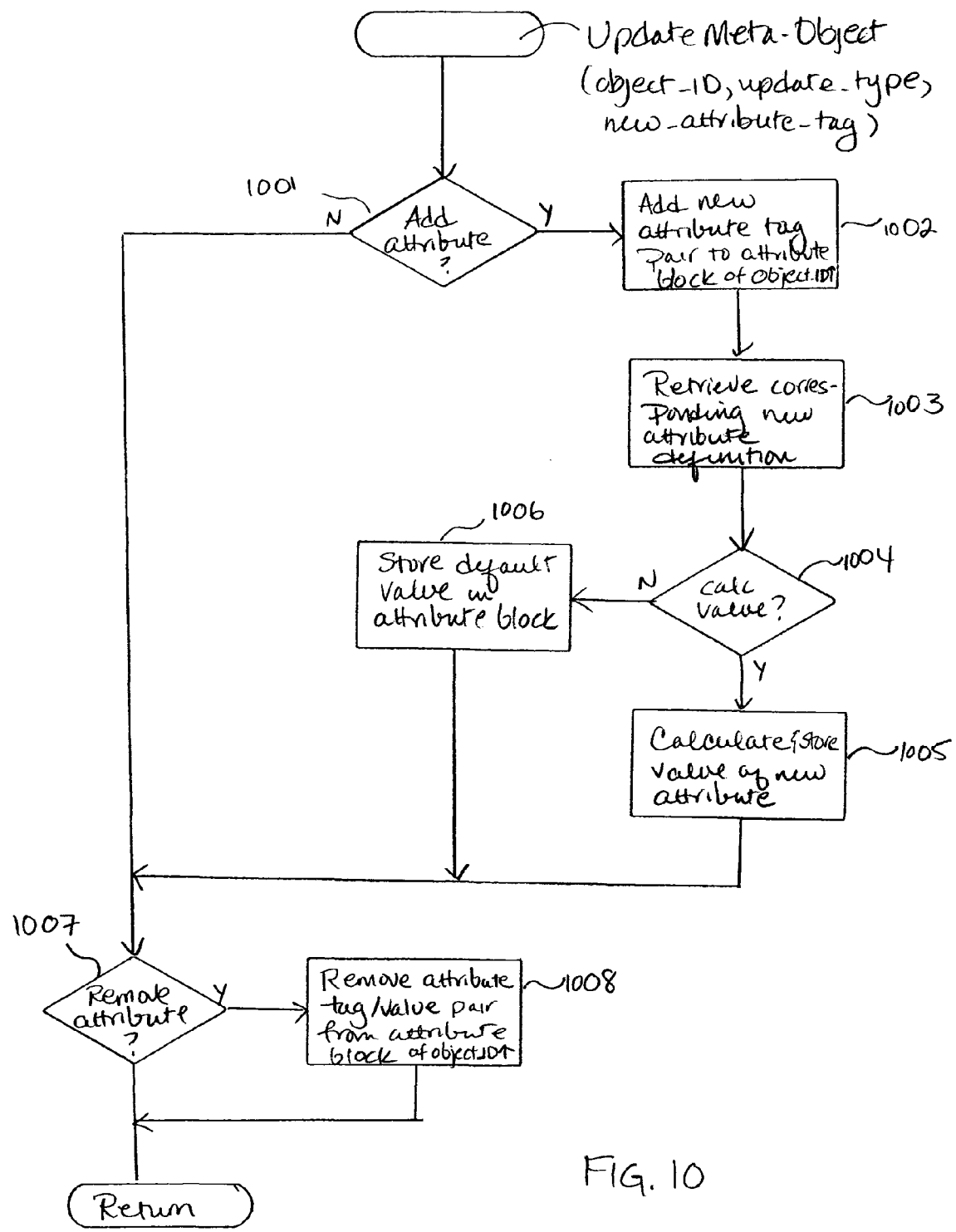
FIG. 10 is an example flow diagram of an Update Meta-Object routine for modifying an instantiated meta-object in an example Meta-Object Data Management System when its object type definition has changed.

FIG. 10 is an example flow diagram of an Update Meta-Object routine for modifying an instantiated meta-object in an example Meta-Object Data Management System when its object type definition has changed. There are different ways that an object type definition may have been changed and subsequently affect instantiated objects. For example, a new attribute (hence, a new attribute definition) may have been added to the object type, an attribute may have been removed from the object type, or other parts of the definition of an attribute may have been changed. One skilled in the art will recognize that there are may ways to implement the Update Meta-Object function to update instantiated objects of a modified object type and that, if an attribute was changed in the underlying object type definition as opposed to added or deleted, update operations can be simplified by treating modification the same as an addition followed by a deletion. The example routine shown in FIG. 10 either removes an existing attribute tag/value pair from an attribute block of an instantiated meta-object or adds a new attribute tag/value pair to the attribute block. Any calculations indicated by the corresponding new attribute definition are performed as necessary. Thus, several input parameters are specified for the Update Meta-Object routine including a designated meta-object instance to update, the type of update needed (e.g., add or delete or both for a modification), and a designated attribute tag (from which a new attribute definition can be determined).

More specifically, in step 1001, if a new attribute is to be added to the meta-object instance indicated by the designated object identifier, then the routine continues in step 1002, else continues in step 1007. In step 1002, the designated new attribute tag and a corresponding ending tag are added to the attribute block (for example, attribute block 605 in FIG. 6). In step 1003, the attribute definition that corresponds to the designated tag is retrieved from, for example, the global attributes table. In step 1004, if the retrieved attribute definition indicates that the value of the attribute is to be calculated, then in step 1005 the calculation is performed and the resultant value stored in the attribute block of the indicated meta-object instance. Otherwise, in step 1006, a default value indicated by the retrieved attribute definition is stored between the attribute tag pair in the attribute block. In step 1007, if an attribute is to be removed from the meta-object instance indicated by the designated object identifier, then the routine continues in step 1008, else returns. In step 1008, the attribute tag/value pair that corresponds to the designated attribute tag is removed from or somehow nullified in the attribute block, and the routine then returns.

Figure 11:
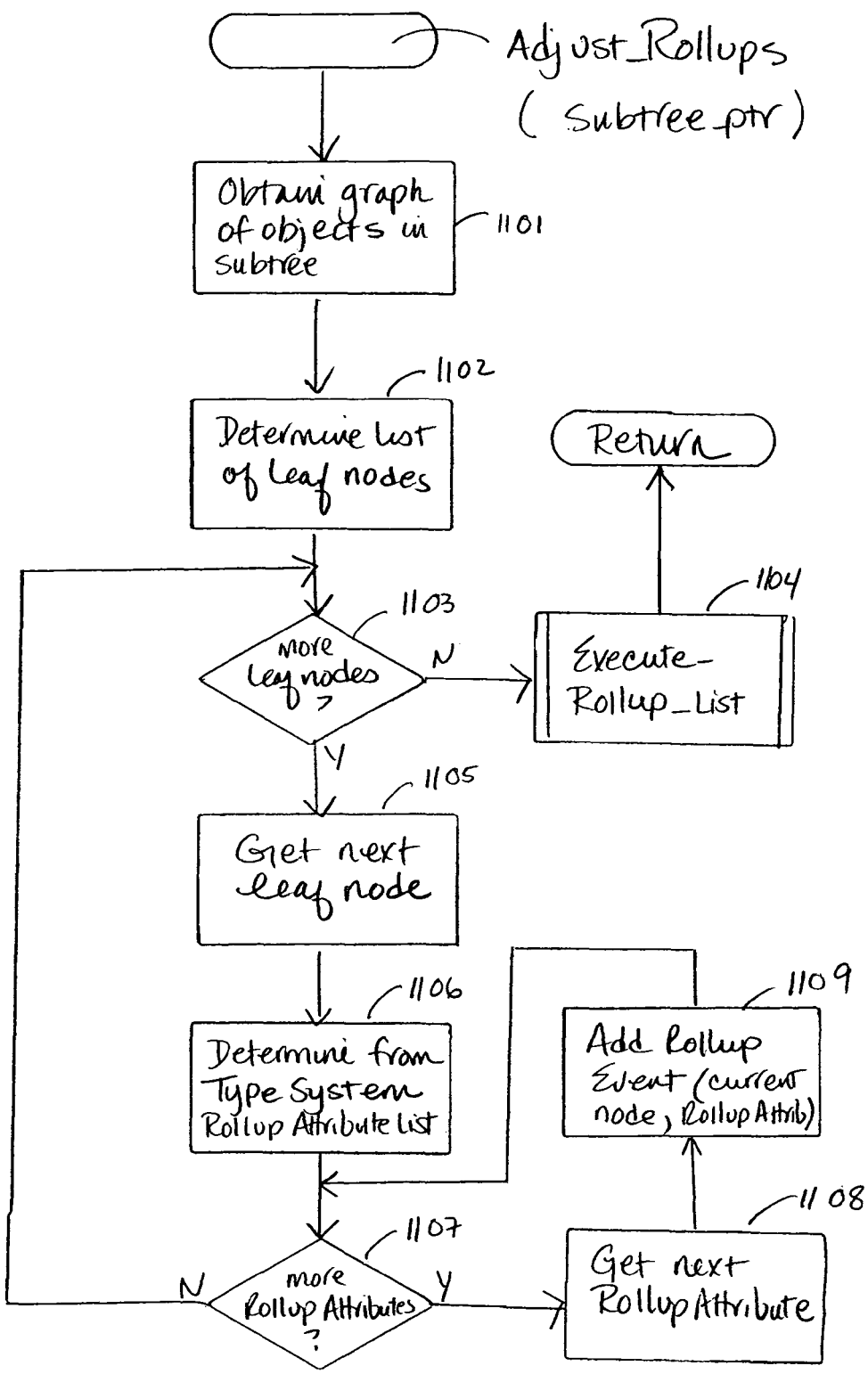
FIG. 11 is an example flow diagram of an Adjust Rollups routine for adjusting rollup attributes.

FIG. 11 is an example flow diagram of an Adjust Rollups routine for adjusting rollup attributes. This routine takes a designated sub-tree of a meta-object instantiation hierarchy and, from the leaf nodes on up, executes all attribute rollup functions that exist in any node. The rollup functions are preferably executed from the bottom of the tree upward so that they are properly aggregated progressively at each higher level in the hierarchy and thus properly reflect the values of the children nodes. There are many methods for performing adjustment of rollups, and the one illustrated keeps track of in a rollup event list (accumulates indicators to) all of the nodes that need to have their rollup functions executed in the proper order, and then executes the rollup functions of these nodes (as rollup events) in order accordingly.

Specifically, in step 1101, the routine obtains a graph of all the objects in the meta-object instance hierarchy from the designated sub-tree pointer downward to the leaf nodes. One skilled in the art will recognize that the implementation of this step is typically dependent upon the storage representation for the instantiation hierarchy. In step 1102, the routine determines a list of the leaf nodes of that sub-tree. In steps 1103-1109, the routine executes a loop for each leaf node to determine whether it has a rolled-up attribute and, if so, adds an event corresponding to that rollup to a list of rollup events to be executed. After the list is accumulated, the rollup events are executed in the order that they were added to the list, thus insuring proper aggregation. More specifically, in step 1103, the routine determines whether there are any more leaf nodes in the graph, and, if so, continues in step 1105, else continues in step 1104. In step 1105, the routine gets the next leaf node indicated by the sub-tree graph. In step 1106, the routine determines from the object type system whether the current node corresponds to a type of object which has rolled-up attributes. In one embodiment, each object type has a list of the attributes it contains (an object-specific rollup attribute list) that have values that roll up (referred to for convenience as rollup attributes). Alternatively, a list of attributes that need to be rolled-up for that object type can be dynamically generated. Steps 1107-1109 execute a loop for each of these rollup attributes to add a rollup event to the roll up list. Specifically, in step 1107, if there are more rollup attributes for that object to be processed, then the routine continues in step 1108, else returns to look at the next leaf node in step 1103. In step 1108, the routine gets the next rollup attribute from the object-specific rollup attribute list. In step 1109, the routine adds a rollup event that corresponds to that rollup attribute to the rollup event list. A rollup event includes, for example, an indication of the current node in the instantiation sub-tree and a pointer to an attribute that needs to be rolled up so that, when the event is executed, the correct rollup function can be found and the corresponding value(s) of the attribute can be determined. Example code for an example rollup event is described with reference to FIG. 12. In step 1104, once the routine determines that there are no more leaf nodes to process, the routine executes the Execute_Rollup_List routine (not shown) to execute all of the rollup events on the rollup event list that have been accumulated thus far, and then returns. Note that it is only necessary to examine the leaf nodes initially and to add rollup events for the leaf nodes, because each rollup event for a leaf node in turn will add rollup events for the parent node of each of these nodes (see FIG. 12). These nodes will in turn add rollup events for their parent node, and the entire process will bubble up similarly so that eventually all necessary rollup events from the leaf node all the way to the highest parent node across each level of the instantiation sub-tree will be added and executed.

Figure 12:
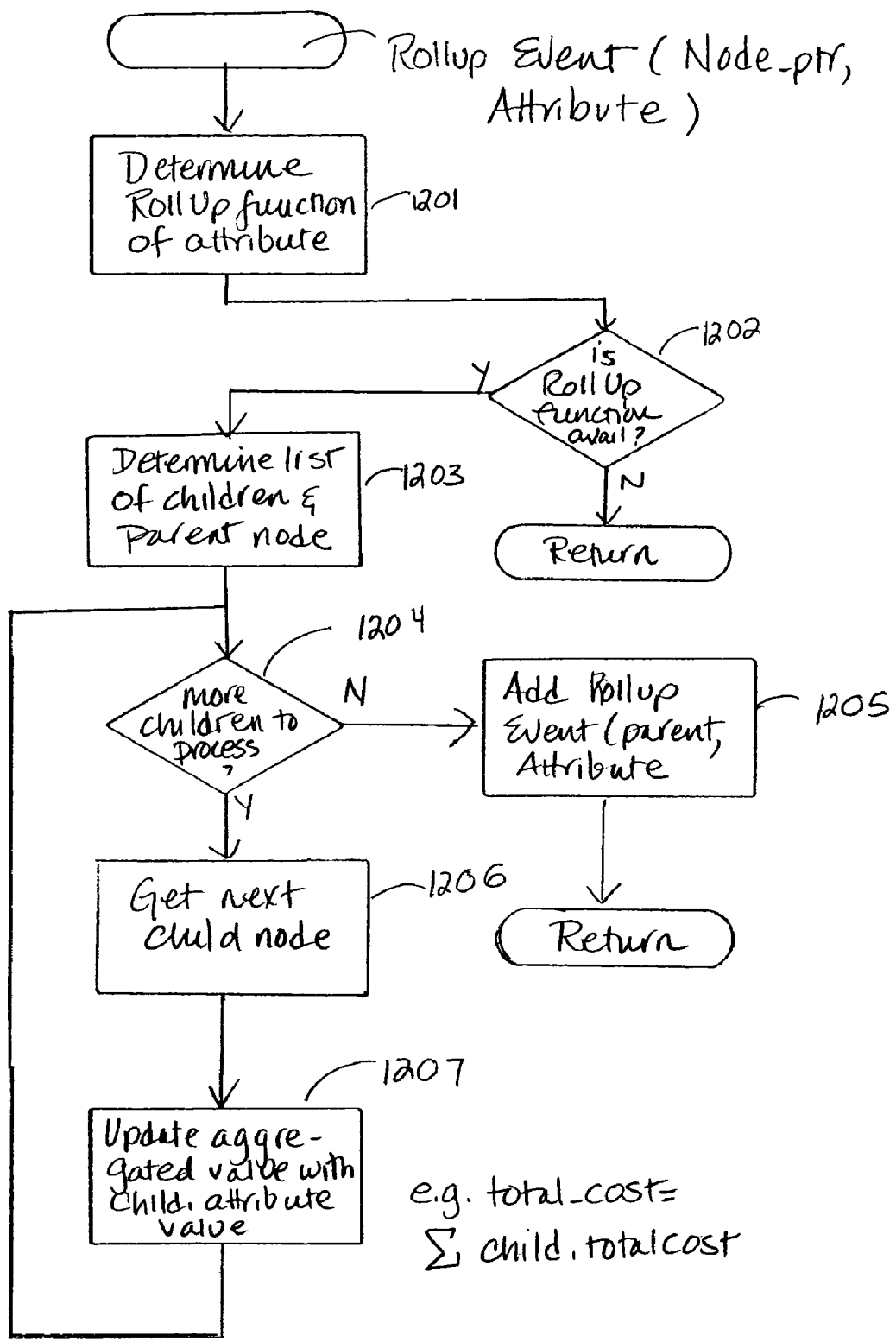
FIG. 12 is an example flow diagram of steps executed by a typical rollup event.

As described, rollup event code is executed for each rollup event that has been added to the rollup event list. FIG. 12 is an example flow diagram of steps executed by a typical rollup event. One skilled in the art will recognize that other code are possible and that this is just one example for ensuring that attributes are rolled up from the leaf nodes all the way to the root node of the designated sub-tree. In step 1201, the rollup event code determines, based upon a designated attribute and node pointer, the particular rollup function for the designated attribute. In step 1202, if there is no rollup function specified (the definition is incomplete) then the code returns, other continues in step 1203. In step 1203, the rollup event code determines a list of the children of the current designated node and the parent node of the designated node. In steps 1204-1207, the routine executes a loop to aggregate the corresponding attribute values of the designated attribute of the children nodes with the designated node so that the aggregated value can be stored in the parent node. The code also adds a rollup event corresponding to the parent node and the designated attribute so that the process can bubble up the hierarchy. More specifically, in step 1204, the routine determines whether there are more children nodes of the designated node, and, if so, continues in step 1206, else continues in step 1205. In step 1206, the routine gets the next child node to process. In step 1207, the routine updates an (accumulating) aggregated value with the corresponding attribute value from the current child and saves it until all of the values are retrieved from all the children of the designated node. For example, if the total cost is the attribute being computed and the rollup function is a summation function, then step 1207 contains a temporary variable for collecting a sum of the total cost attribute of each of the children nodes. The routine then returns to step 1204 to look for the next child node to process. In step 1205, when there are no more children nodes of the designated node to process, the routine adds a rollup event to correspond to the parent node of the designated node and designates the current attribute being processed, and then returns.

As mentioned in step 803 of FIG. 8, a user (typically an administrator) can define and manage object transitions between different or the same types of objects. An object transition definition specifies source and destination object types, a designated set of criteria if applicable, and, optionally, an approval list. Once instantiated, an object transition can be invoked to change an associated meta-object from the source object type to the destination object type after any designated set of criteria have been met and any required approvals granted. When a meta-object of the source object type is instantiated, any object transition definitions that are associated with the source object type definition are used to instantiate object transitions that are then associated with the instantiated meta-object. The criteria that are designated for each instantiated object transition define the necessary values of attributes of the associated instantiated meta-object for the transition to be permitted to take place. For example, criteria may be defined for a project investment object type that permit a project investment to be transformed into a program investment object type only when the dollar value spent on the project exceeds a specified amount. An approval list is specified when particular users (or users having a particular security role) are to be notified first to grant permission for the transition to occur. Approval requests can be sent ordered sequentially (requiring successive permissions granted before a next is requested) or simultaneously requested.

Figure 30:
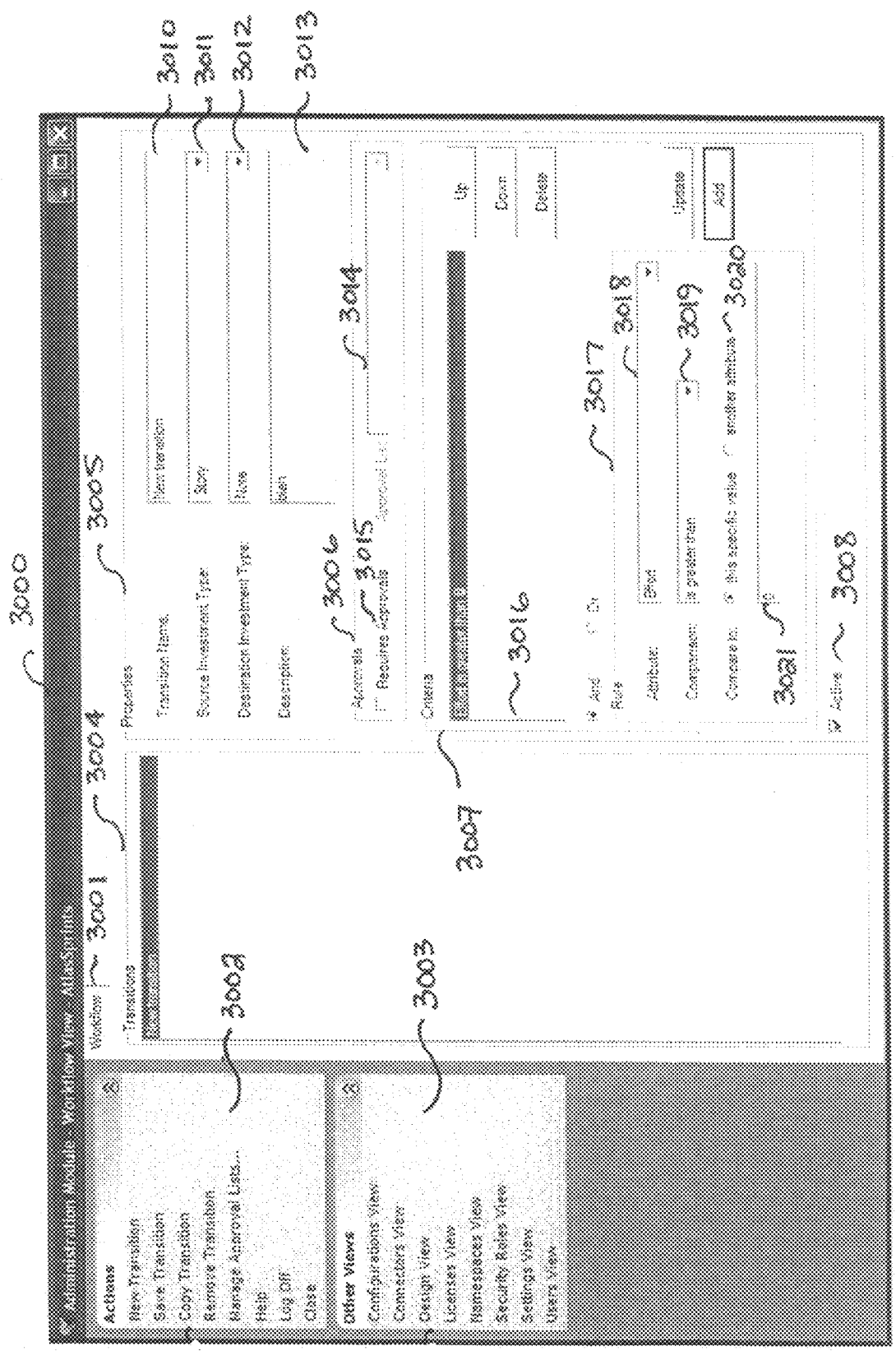
FIG. 30 is an example screen display of a workflow view of the example Administration Module of the example Enterprise Portfolio Management System used to create and manage object transition definitions.

FIG. 30 is an example screen display of a workflow view of the example Administration Module of an example Enterprise Portfolio Management System used to create and manage object transition definitions. One skilled in the art will recognize that other user interfaces can be implemented to support the capabilities described. In the Administration Module dialog 3000, the workflow view 3001 presents a list of currently defined transitions 3004 and properties in properties field 3005 for a selected transition. As shown, a new transition called "New transition" is being (or has been) defined. The properties field 3005 allows a user to identify a transition name 3010; a source investment type (object type) 3011; a destination investment type (object type) 3012; a description 3013 that may be displayed when properties of a transition instance are requested; an approval list 3014 if approvals are required to progress the transition; and one or more transition criteria defined in criteria definition field 3007. In one embodiment, the transition criteria need to be met before the transition from the source object type 3011 to the destination object type 3012 can be initiated by a user. In another embodiment, a potential transition is scheduled automatically by the system, but it doesn't progress until the criteria are met. Transitions can be defined and then separately set as "active" by setting checkbox 3008, so that object transaction instances will be created for instantiated meta-objects of the source object type. The user can invoke the actions specified on action list 3002 to define a new transition, save a created transition, copy a transition, and remove a transition. To return to defining object type definitions, the user selects the "Configurations View" action.

Figure 31:
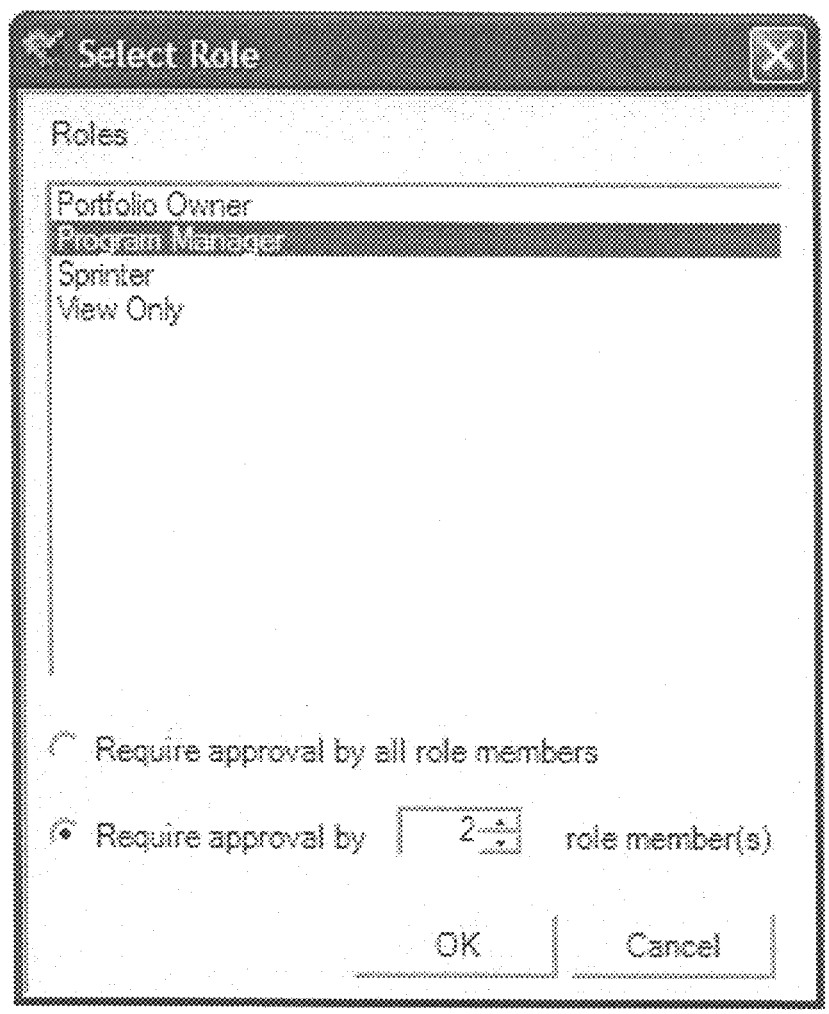
FIG. 31 is an example dialog to enter an approval list that is based upon security roles.

In addition, the user can invoke the action "Manage Approval Lists" to create and modify approval lists. Existing lists are displayed for potential selection in the approval list field 3014, if approvals are required for the transition (by, for example, setting checkbox 3015). An approval list can be defined as a list of specific users that need to approved object transitions of the selected transition name or as a list of users that have a particular security role defined (for example, by the application administrator). FIG. 31 is an example dialog to enter an approval list that is based upon security roles. The user can also define characteristics of the approval list, such as whether all members or only some number of members of the list must grant approval for the transition to progress. In addition, the user can specifiy whether the list of specific users is to be approved in sequential order (successively, one after another) or not. Other characteristics can be similarly incorporated.

The user defines criteria for the object transition definition in criteria definition field 3007. One or more criteria can be defined for a single transition, and may be combined as Boolean expressions such as by "AND" or "OR" specifications. In the example shown in FIG. 30, the user enters a rule (a criterion) by specifying an attribute name 3018, a type of comparison to be made (for example, "is greater than," "is less than," "is equal to," etc.) 3019, whether the comparison is to be made to another attribute or a value 3020, and the value 3021 (or attribute if attribute comparison is to be made). The application then constructs the Boolean expression, which is displayed in criteria definition field 3007. One skilled in the art will recognize that other forms of criteria and code other than Boolean expressions can be defined that invoke other types of evaluations, including but not limited to subprograms, functions, external modules, database inquiries, etc. Once the properties have been completed, the user designates the object transition definition as active by setting checkbox 3008 if desired and saves the transition as appropriate.

Figure 32:
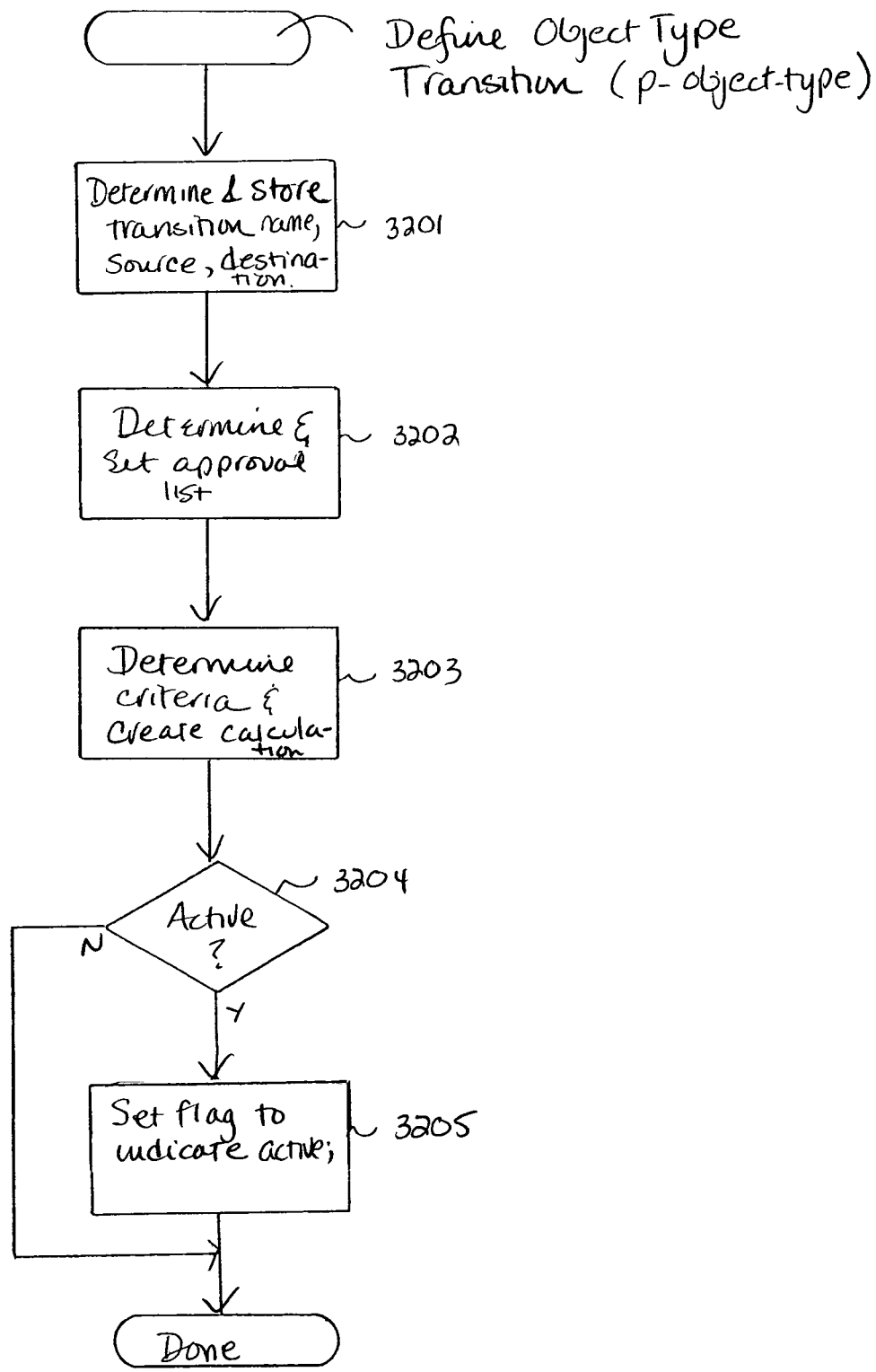
FIG. 32 is an example flow diagram of a routine for defining an object transition in an example object type management subsystem of a Meta-Object Data Management System.

FIG. 32 is an example flow diagram of a routine for defining an object type transition in an example object type management subsystem of a Meta-Object Data Management System. This routine is invoked in part or in whole by a user interface for setting up aspects of an object transition definition, such as the user interface described with reference to FIG. 30. In step 3201, the routine determines the transition definition name, source object type, and destination object type and stores the determined values as appropriate. In one embodiment, a table of object transition definitions is created in the MODMS to store (named) object transition definitions. The table may be persisted as appropriate. In step 3202, the routine determines and sets up the approval list for the defined object transition definition. In step 3203, the routine determines the criteria for transitioning the object based upon the rules defined by the user (or other rules) and creates code (e.g., Boolean expression(s)) to execute the calculation if needed. In step 3204, the routine determines whether the user has designated the definition as active, and, if so, continues in step 3205, else returns or completes. In step 3205, the routine sets a flag in the data structure that represents the object transition definition to indicate that the definition is to be instantiated with meta objects of the source object type, and then returns or completes.

FIG. 33 is an example block diagram abstraction of an object (type) transition table that contains transition definitions created and managed by an example object type management subsystem of a Meta-Object Data Management System. As mentioned, the table may be persisted as appropriate. The records (e.g., rows) of this table are definitions used to instantiate object transitions for meta-objects as they are created by the Meta-Object Instantiation Subsystem. One skilled in the art will recognize that other equivalent data structures for storing a table may be used, and that different fields may be stored and in different orders. In addition, the data in the table may be directly or indirectly included in the various fields as desired in any particular implementation. In the example shown, each record (e.g., rows 3310, 3311) in transition table 3301 contains an object transition definition. Each object transition definition stores a name 3301, an identifier of the source object typed 3302, an identifier of the destination object type 3303, an indicator of the approval list 3304, and an indicator of the calculation(s) to be used to determine whether the criteria for the transition have been met.

In the example illustrated, the indicator of the approval list 3304 refers to a separate approval list definition 3320, although different architectures can certainly be substituted. In the example approval list definition 3320, each entry 3321-3325 contains an identification of the person (or role) to approve the transition, a notification path such as an email address, and an indicator field to indicate that the identified person (or role) has approved the transition. Note that other characteristics, such as how many need to approve, whether it is ordered sequentially, etc. are not shown.

The indicator of the calculation(s) 3305 refers to code or some type of expression to be evaluated by the MODMS to determine whether criteria has been met. Purely as an example, criteria calculation 3330 is shown as pseudo-code for evaluating the rule shown in the example of FIG. 30. Any implementation appropriate for the particular application that incorporates the MODMS can be used.

Figure 34:
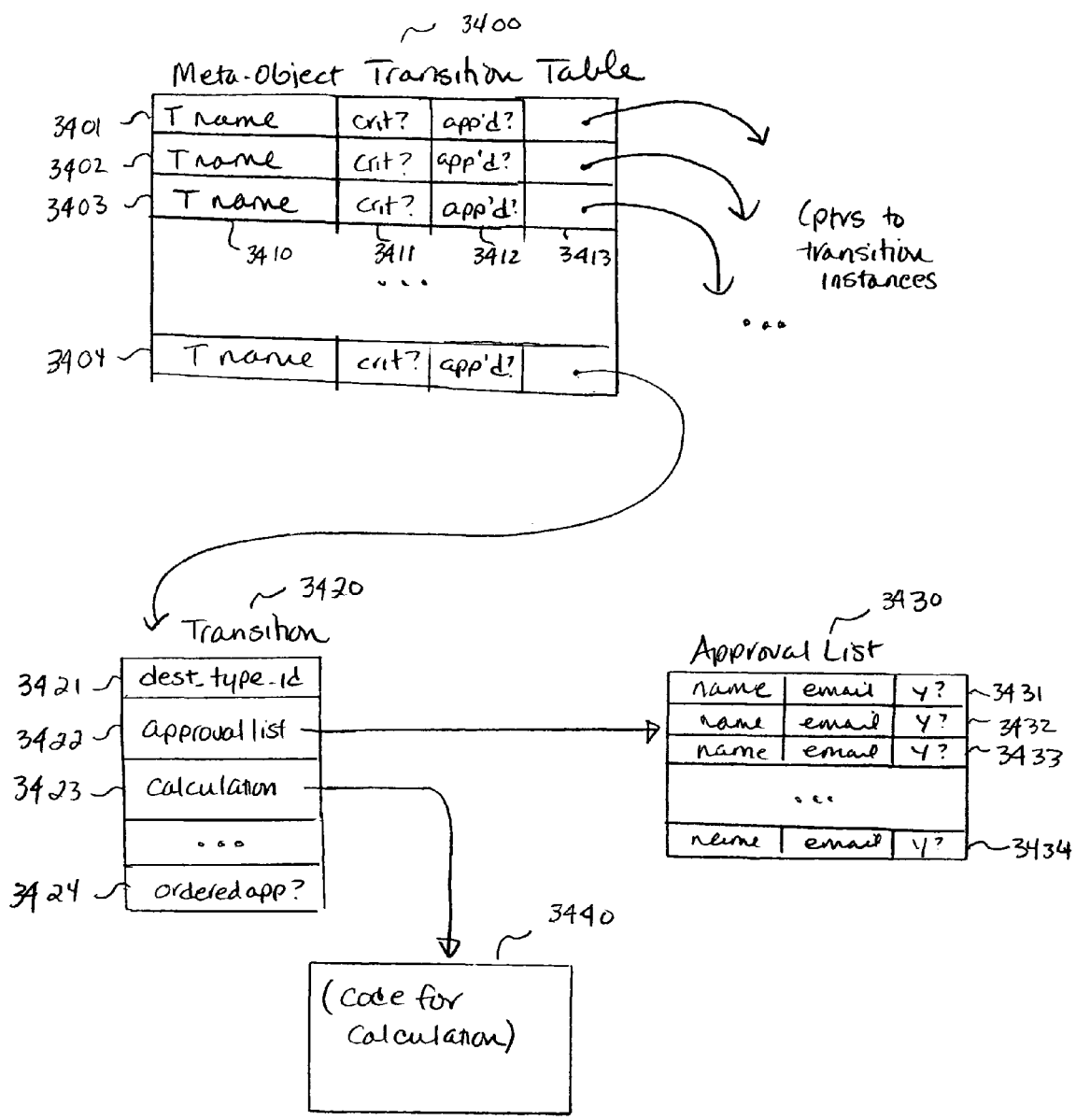
FIG. 34 is an example block diagram of an in-memory data structure representation of a transition table instantiated for an example meta-object.

FIG. 34 is an example block diagram of an in-memory data structure representation of a transition table instantiated for an example meta-object. As described, when a meta-object is instantiated from an object type definition, the MODMS determines whether there are any relevant object transition definitions. For example, the MODMS can search the object transition table 3300 of FIG. 33 to retrieve a list of all definitions whose source object type identifier (field 3302) is the same as the object type of the meta-object being instantiated. For each such definition, an object transition instance is created and added to an object transition table associated with the meta-object. For example, FIG. 4 shows a meta-object representation 400 that includes a pointer to a transition table 410. Meta-object transition table 3400 is an example of one such transition table. The entries 3401-3404 correspond to the retrieved object transition definitions. Each such entry 3401-3404 maintains state data regarding the transition and an indicator 3413 to an object transition instance, such as transition 3420. The state data includes at least a transition name 3410, whether the criteria for the transition has been met 3411, and whether the transition has been approved 3412. Other state data may also be present. Each transition instance, for example transition 3420, typically includes an identifier of the destination object type 3421, an indicator 3422 of the approval list for that transition, an indicator 3423 to the criteria calculation 3440 (or stores the calculation itself, and an indication of other characteristics, such as whether the approval list is ordered 3424. Each approval list, for example approval list 3430, comprises one or more approval entries 3431-3434, each of which comprise an indicator of the approval person/role ("approver"), a notification path, and an indicator as to whether the approver has granted approval.

Figure 13:
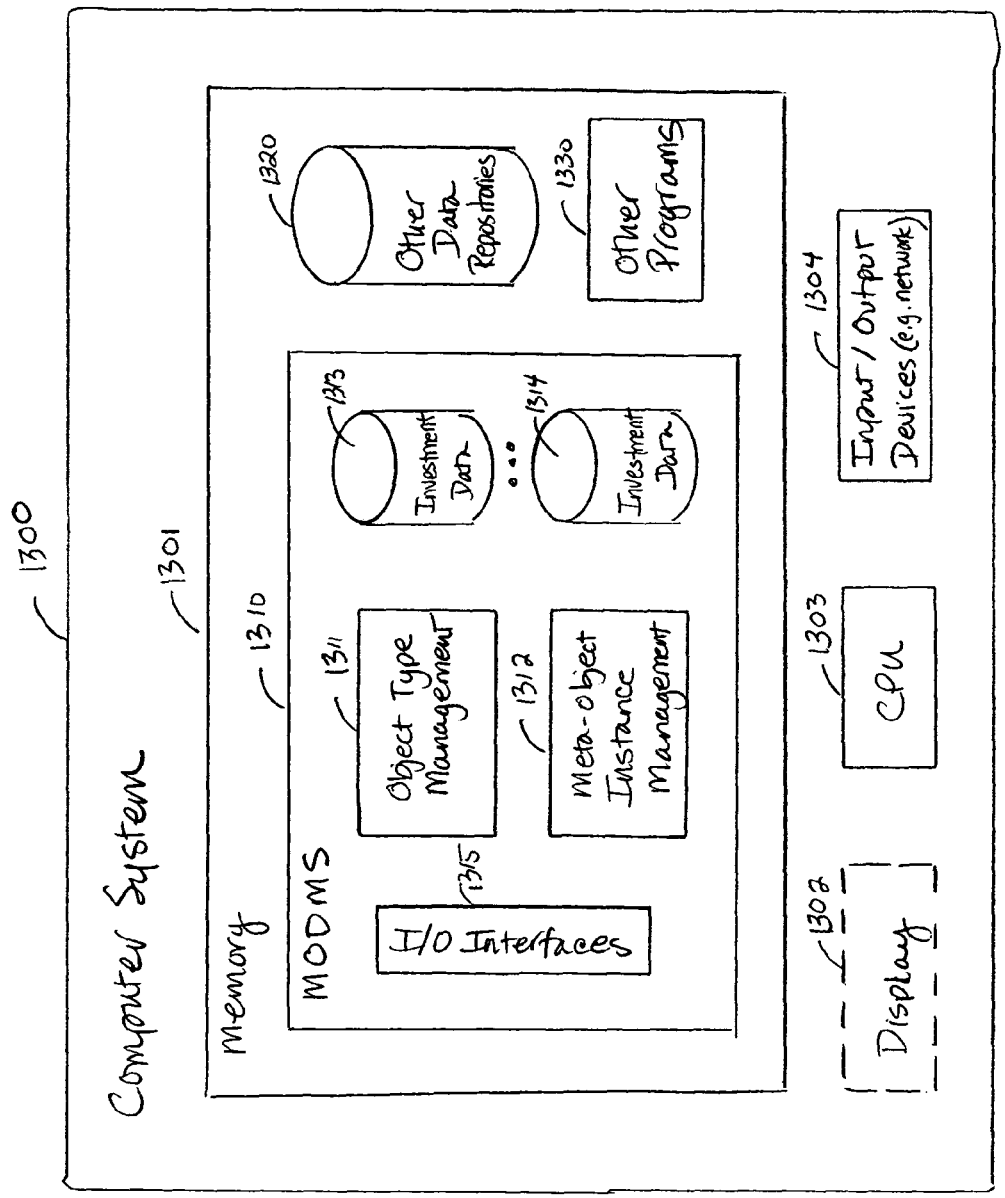
FIG. 13 is an example block diagram of a general purpose computer system for practicing embodiments of a Meta-Object Data Management System.

FIG. 13 is an example block diagram of a general purpose computer system for practicing embodiments of a Meta-Object Data Management System. The general purpose computer system 1300 may comprise one or more server and/or client computing systems and may span distributed locations. In addition, each block shown may represent one or more such blocks as appropriate to a specific embodiment or may be combined with other blocks. Moreover, the various blocks of the Meta-Object Data Management System 1310 may physically reside on one or more machines, which use standard interprocess communication mechanisms to communicate with each other.

In the embodiment shown, computer system 1300 comprises a computer memory ("memory") 1301, an optional display 1302, a Central Processing Unit ("CPU") 1303, and Input/Output devices 1304. The Meta-Object Data Management System ("MODMS") 1310 is shown residing in the memory 1301. The components of the MODMS 1310 preferably execute on CPU 1303 and manage the generation, management, and use of meta-objects, as described in previous figures. Other downloaded code 1330 and potentially other data repositories 1320 also reside in the memory 1310, and preferably execute on one or more CPU's 1303. In a typical embodiment, the MODMS 1310 includes an object type management subsystem 1311, a meta-object instance management subsystem 1312, input/output interfaces 1315, and one or more data repositories 1314, including, for example, investment data.

In an example embodiment, components of the MODMS 1310 are implemented using standard programming techniques. One skilled in the art will recognize that the components 1311-1315 lend themselves to distributed, object-oriented implementations and can be implemented to use relational database management systems, web-based (Internet or internet) interfaces, etc. However, any of the MODMS components 1311-1315 may be implemented using more monolithic programming techniques as well. In addition, programming interfaces to the data stored by the MODMS process can be available by standard means such as through C, C++, C#, and Java API and through scripting languages such as XML, or through web servers supporting such interfaces. The data repositories 1313 and 1314 are preferably implemented for scalability reasons as database systems rather than as text files, however any method for storing the application data and for storing the instantiated meta-objects may be used. In addition, some routines of the object type management subsystem 1311 and the meta-object instance management subsystems may be implemented as stored procedures, or methods attached to table "objects," although other techniques are equally effective.

One skilled in the art will recognize that the MODMS 1310 may be implemented in a distributed environment that is comprised of multiple, even heterogeneous, computer systems and networks. For example, in one embodiment, the object type management subsystem 1311, the meta-object instance management subsystem 1312, and the data repositories 1313-1314 are all located in physically different computer systems. In another embodiment, the type and instance subsystem components 1311 and 1312 of the MODMS 1310 are hosted each on a separate server machine and may be remotely located from the instantiated object and attribute tables which are stored in the data repositories 1313-1314. Different configurations and locations of programs and data are contemplated for use with techniques of the present invention. In example embodiments, these components may execute concurrently and asynchronously; thus the components may communicate using well-known message passing techniques. One skilled in the art will recognize that equivalent synchronous embodiments are also supported by an MODMS implementation. Also, other steps could be implemented for each routine, and in different orders, and in different routines, yet still achieve the functions of the MODMS.

Figure 14:
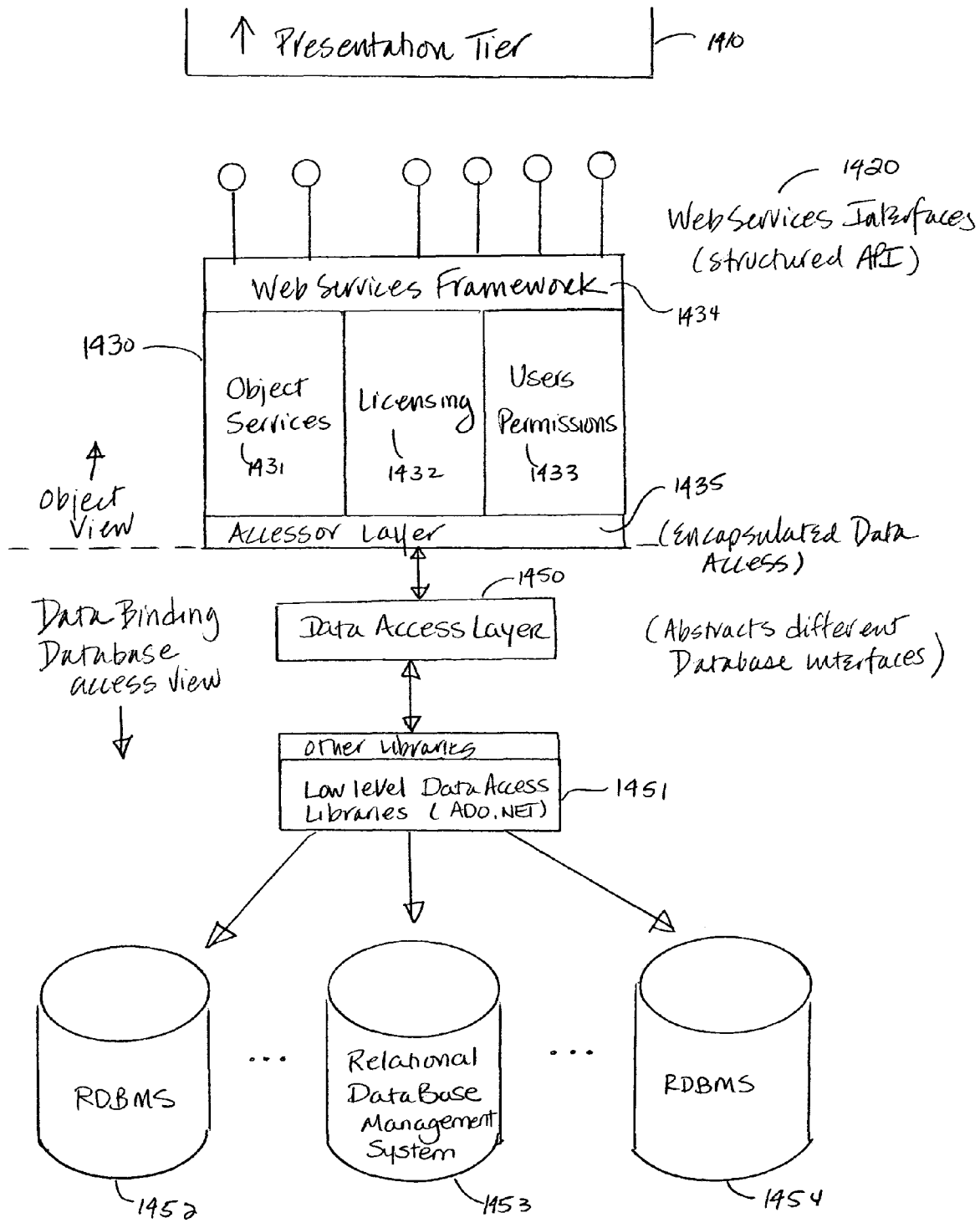
FIGS. 14 and 15 are example block diagrams of a client-server, network-based tiered architecture for implementing embodiments of a Meta-Object Data Management System.
Figure 15:
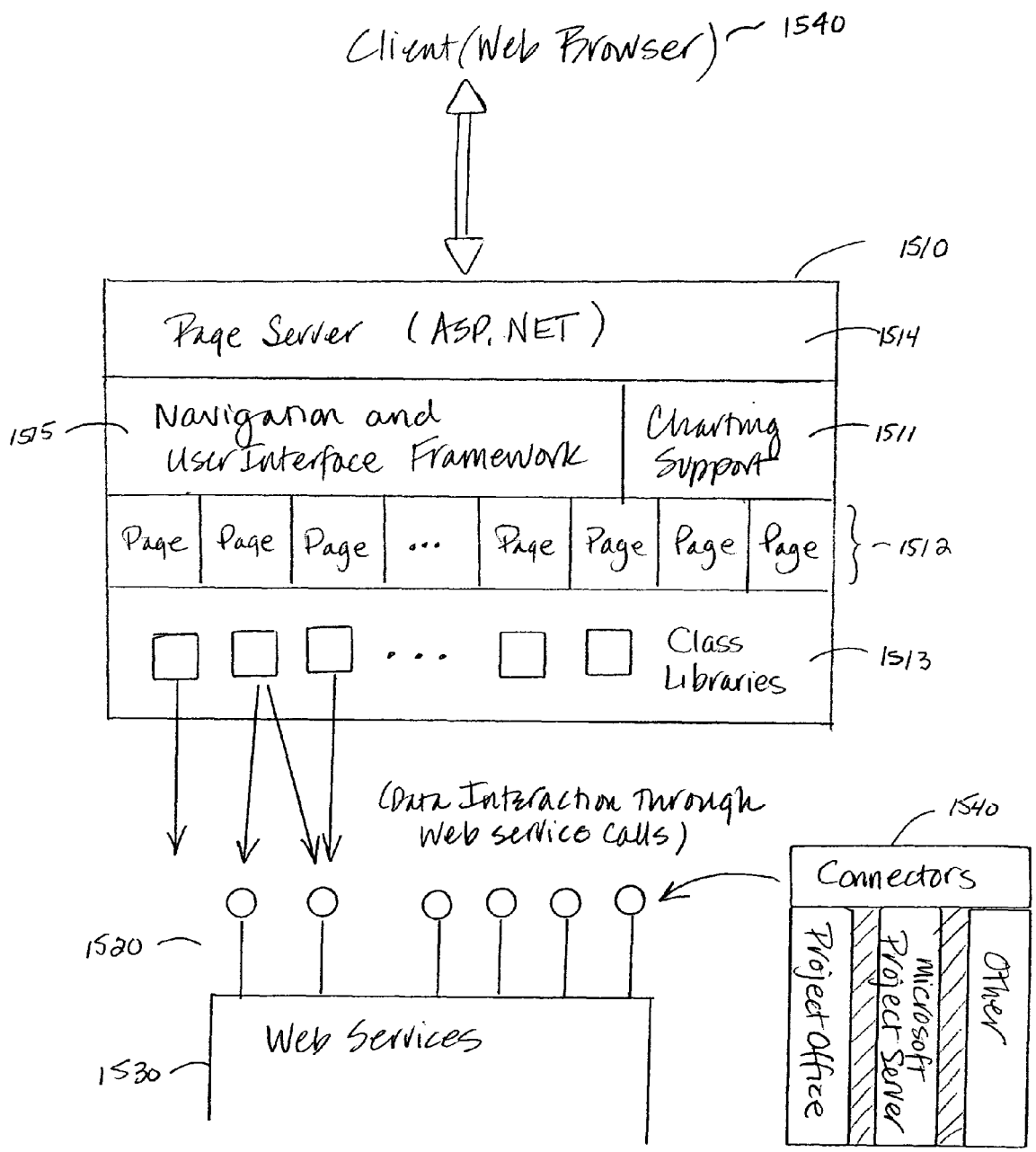

FIGS. 14 and 15 are example block diagrams of a client-server, network-based tiered architecture for implementing embodiments of a Meta-Object Data Management System. FIG. 14 illustrates how an MODMS may be implemented at the web services layer as web service interfaces and how the MODMS interacts with any type of presentation tier residing above it and with any data access tier residing below it.

So, for example, in FIG. 14, the web services interfaces 1420, which are typically structured application programming interfaces ("API"), communicate through encapsulated data access (data abstractions) to various databases. The layers in a data access layer bind the data abstractions into the various databases physically used in the system in order to manage the physical storage. For example, the web services interfaces 1420 communicate (eventually) through an accessor layer 1435 to a data access layer 1450, which communicates to lower level data access libraries 1451 (for example, ADO.NET). These access libraries 1451 provide interfaces to the various physical database management systems such as a relational database management systems 1452-1454. The web services layer 1430 contains web service interfaces (API) 1420 which are used by the presentation tier 1410 to access the various web services.

The web service layer 1430 provides support for the MODMS functions. The various capabilities of a MODMS are implemented as services, such as object services 1431, licensing services 1432, and user permissions and related services 1433. Access to the MODMS services is provided by web services framework 1434 through calls to the web services interfaces 1420.

As continued in FIG. 15, presentation tier 1510 (1410 in FIG. 14) interfaces with the MODMS services through calls to the various web services 1431-1433 using the web service interfaces 1520. In addition, various connectors 1540 to other third-party environments can interface through the web service interfaces 1520 to take advantage of the underlying technology. For example, connectors to programs such as Microsoft Project Server, and Pacific Edge's Project Office can interface through the web services interfaces 1520 to import data into the MODMS and to export data to those the third-party programs.

The presentation tier 1510 provides the input/output interface between, for example, a client web browser 1540 and the web services layer 1530 of the MODMS. The presentation layer 1510 typically comprises some type of page server 1514 (for example, ASP.NET); a navigation and user interface framework 1515; and various page definitions 1512 which are transported through the page server 1514 to the client web browser 1540. The pages 1512 may reference various class libraries provided by the system 1513. In addition, in some embodiments, the presentation layer 1510 may provide charting support 1511 and other application-specific modules (not shown).

Figure 16:
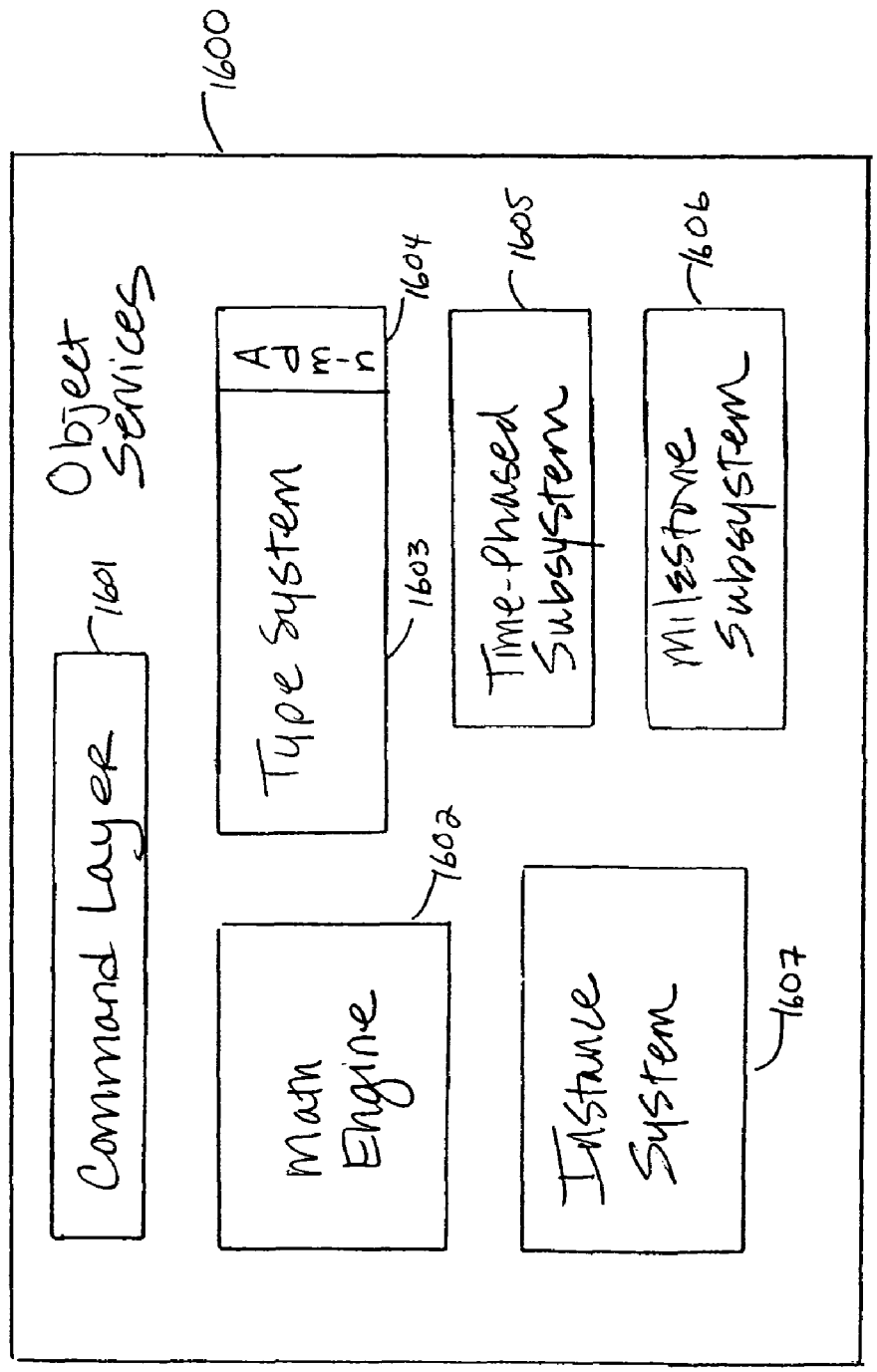
FIG. 16 is an example block diagram of components of an example object services layer of a Meta-Object Data Management System used to implement an example Enterprise Portfolio Management System.

In an example embodiment, the majority of the functions that were described with respect to FIGS. 1-12 are implemented in the object services layer 1531 of the web services 1530. FIG. 16 is an example block diagram of components of an example object services layer of a Meta-Object Data Management System used to implement an example Enterprise Portfolio Management System. To implement an MODMS, the object services 1600 comprises a command layer 1601; and various engines/subsystems 1602-1606 for implementing the functionality of the object type system and meta-object instantiation systems described earlier. For example, a typical object services layer 1600 may comprise an object instance system 1607; an object type system 1603 with an administration module 1604 for modifying object types; a time-phased subsystem 1605; a milestone subsystem 1606; and a math engine 1602. As described earlier, administrators use the type system module 1603 to define and manage object types in the system. The instance system 1607 is used to instantiate meta-objects of those types. The math engine 1602, time-phased subsystem 1605, and milestone subsystem 1606 are shown as supplemental components; however, one skilled in the art will recognize that their functionality may be incorporated into the other modules as appropriate.

As described in FIGS. 1-12, a meta-object data management system may be used to create applications such as an enterprise portfolio management system. In an enterprise portfolio management system, object types are created for each "investment" type to be managed by the system and, as portfolios are added to the system that contain investments, corresponding objects (meta-objects) are instantiated appropriately.

Figure 17:
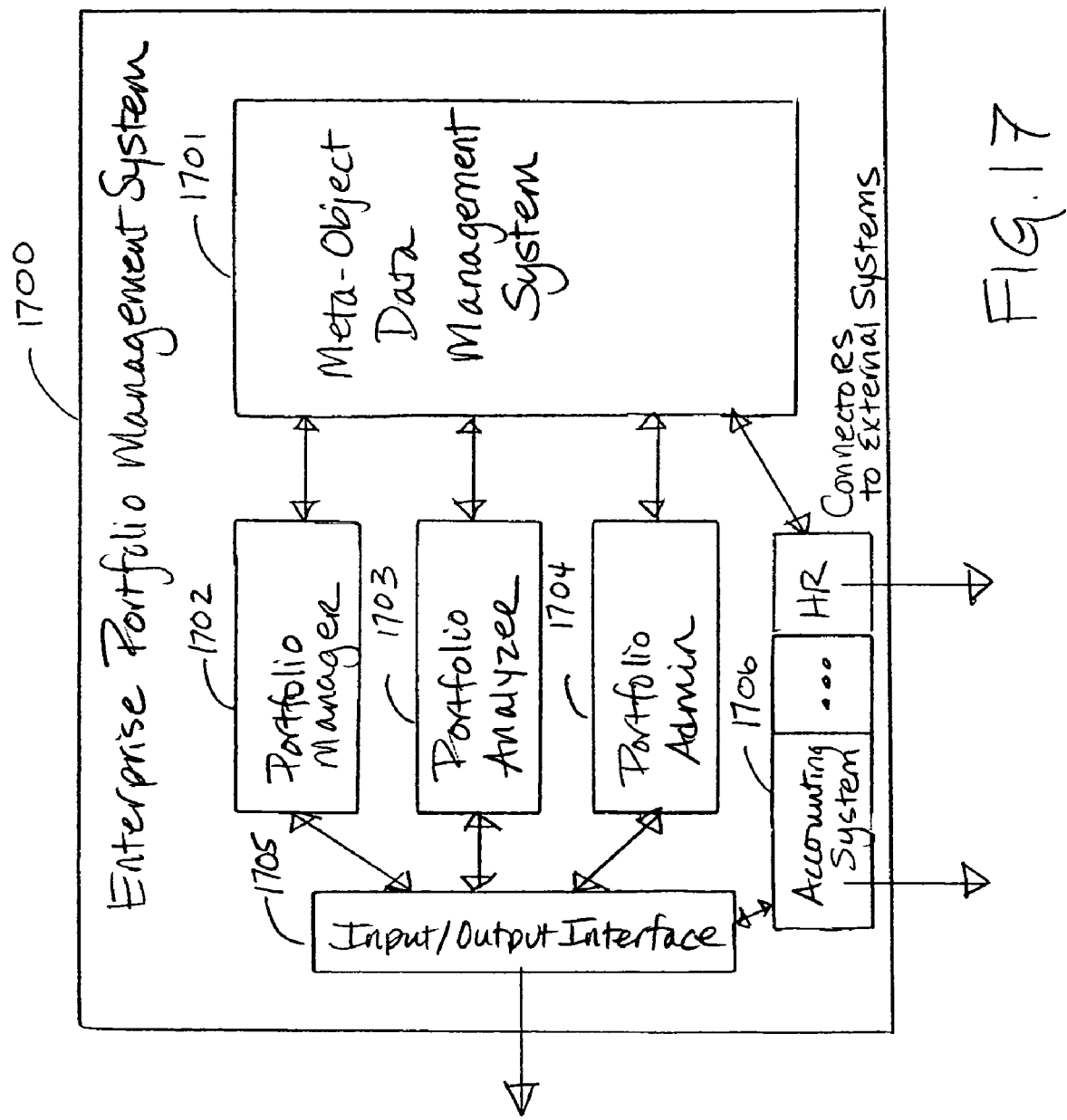
FIG. 17 is a block diagram of an example Enterprise Portfolio Management System implemented using an example Meta-Object Data Management System.

FIG. 17 is a block diagram of an example Enterprise Portfolio Management System implemented using an example Meta-Object Data Management System. In an example embodiment, the enterprise portfolio management system 1700 comprises a portfolio manager 1702, a portfolio analyzer 1703, and a portfolio administration interface 1704. These components provide the different enterprise (investment) data management and analysis capabilities and are accessed by a user of the portfolio management system through an input/output interface 1705. Components 1702-1704 communicate with the meta-object data management system 1701 through the different programmatic interfaces (e.g., the web service interfaces shown in FIG. 14) that access the object services layer of the MODMS 1701. In addition, as discussed with respect to FIGS. 14 and 15, connector modules 1706 to external systems may also be present and access the meta-object data management system 1701. For example, connector modules 1706 may connect to accounting systems, human resource systems, and financial systems otherwise available in the enterprise. Further, these systems may be legacy applications that pre-existed the enterprise portfolio management system 1701.

Figure 18:
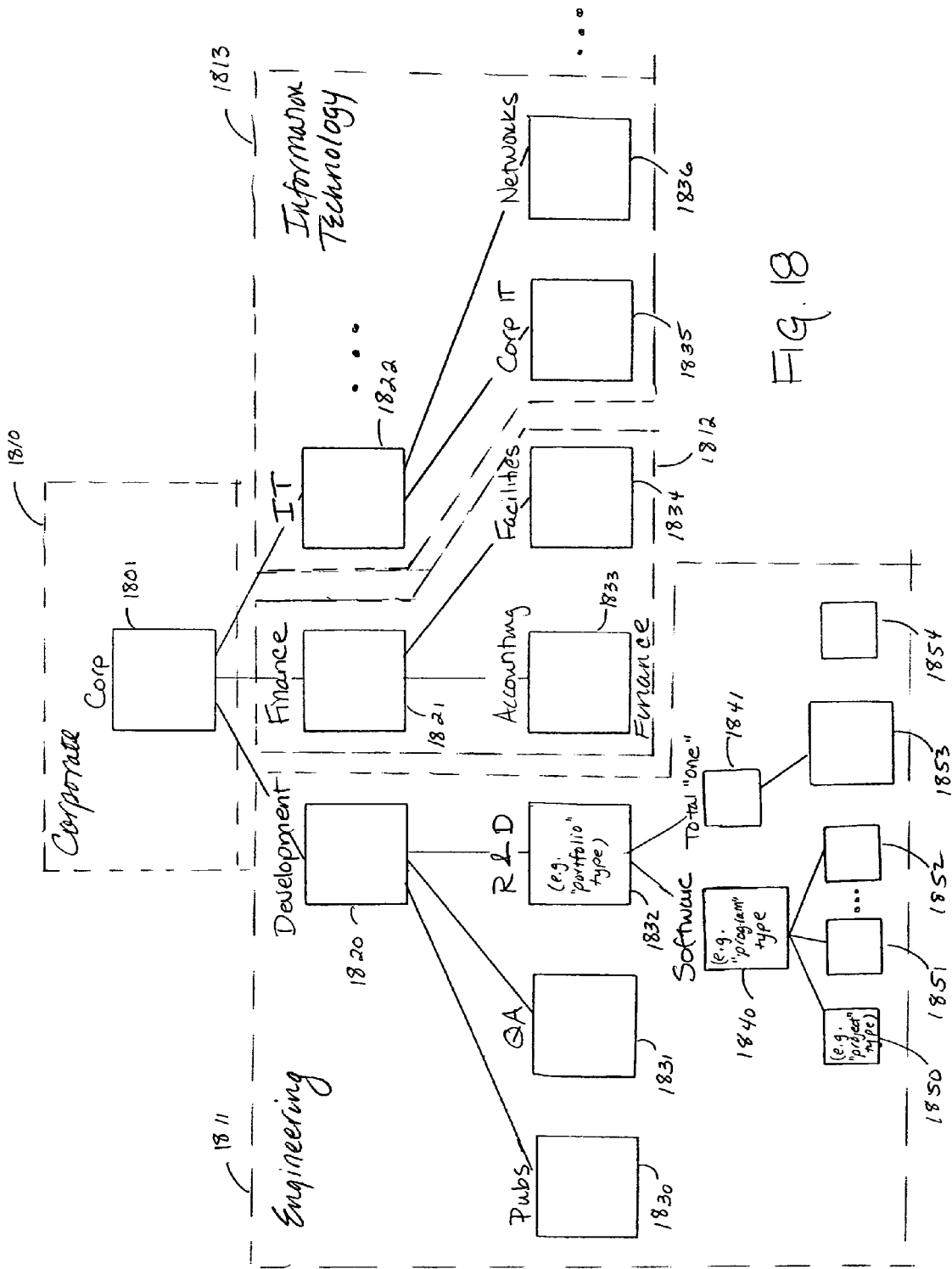
FIG. 18 is a block diagram of an example investment instance hierarchy of a hypothetical enterprise portfolio management system created using a Meta-Object Data Management System.

FIG. 18 is a block diagram of an example investment instance hierarchy of a hypothetical enterprise portfolio management system created using a Meta-Object Data Management System. For the purposes of FIG. 18, it is presumed that the enterprise organization comprises several sub-organizations including corporate management 1810, engineering 1811, finance 1812, and information technology 1813 portions of the organization. It is presumed also that each of the sub-organizations 1810-1813 comprise several departments, which each may desire to organize their own portfolio data, hence maintain and analyze investments, in their own particular ways. In addition, the investment data may be stored in data formats and on databases that are specific to that portion of the organization. So for example, as with most portfolio management systems, some portions of organizations within the enterprise may want to view the data in a partitioned fashion to analyze investments at a lower (more detailed) level, while other portions of the organization, such as the management executive committee members, may want to view all of the data of the various sub-organizations at a summary level. The different size boxes shown in FIG. 18 and linked to other size boxes, such as portfolio 1832, program 1840, project 1841, and project 1842 are provided to demonstrate that any type of investment can be contained in any other type of investment simply by virtue of its containment position within the hierarchy. So for example, a portfolio type object 1832 contains a project type object 1841, which contains a program type object 1853, even though elsewhere in the hierarchy, a program type object 1840 contains a project type object 1850 demonstrating the opposite containment relationship.

As described with respect to FIG. 17, the example enterprise portfolio management system comprises portfolio management functions, portfolio analysis functions, and portfolio administrative functions. Example screen displays of some of the functionality provided by these components are illustrated in the appendices of U.S. patent application Ser. No.10/613,534, entitled "METHOD AND SYSTEM FOR OBJECT-ORIENTED MANAGEMENT OF MULTI-DIMENSIONAL DATA," filed Jul. 3, 2003. The appendices therein includes screen displays from a portfolio management interface and a portfolio analysis interface to an executing portfolio management system. They also illustrate screen displays that exemplify the capabilities of a charting subsystem, which allows multi-dimensional data to be redisplayed in a chart using modified sets of axes, without rebuilding the underlying chart definition. In the examples shown, the charting system is integrated into the portfolio analysis interface such that each chart is associated with a designated multi-dimensional view of the data.

FIGS. 19-28 describe in greater detail example functions of the portfolio manager and portfolio analyzer components of an example enterprise portfolio management system such as that shown in FIG. 17. One skilled in the art will recognize that the capabilities shown can be modified using well-known techniques to be suitable for the application desired.

Figure 19:
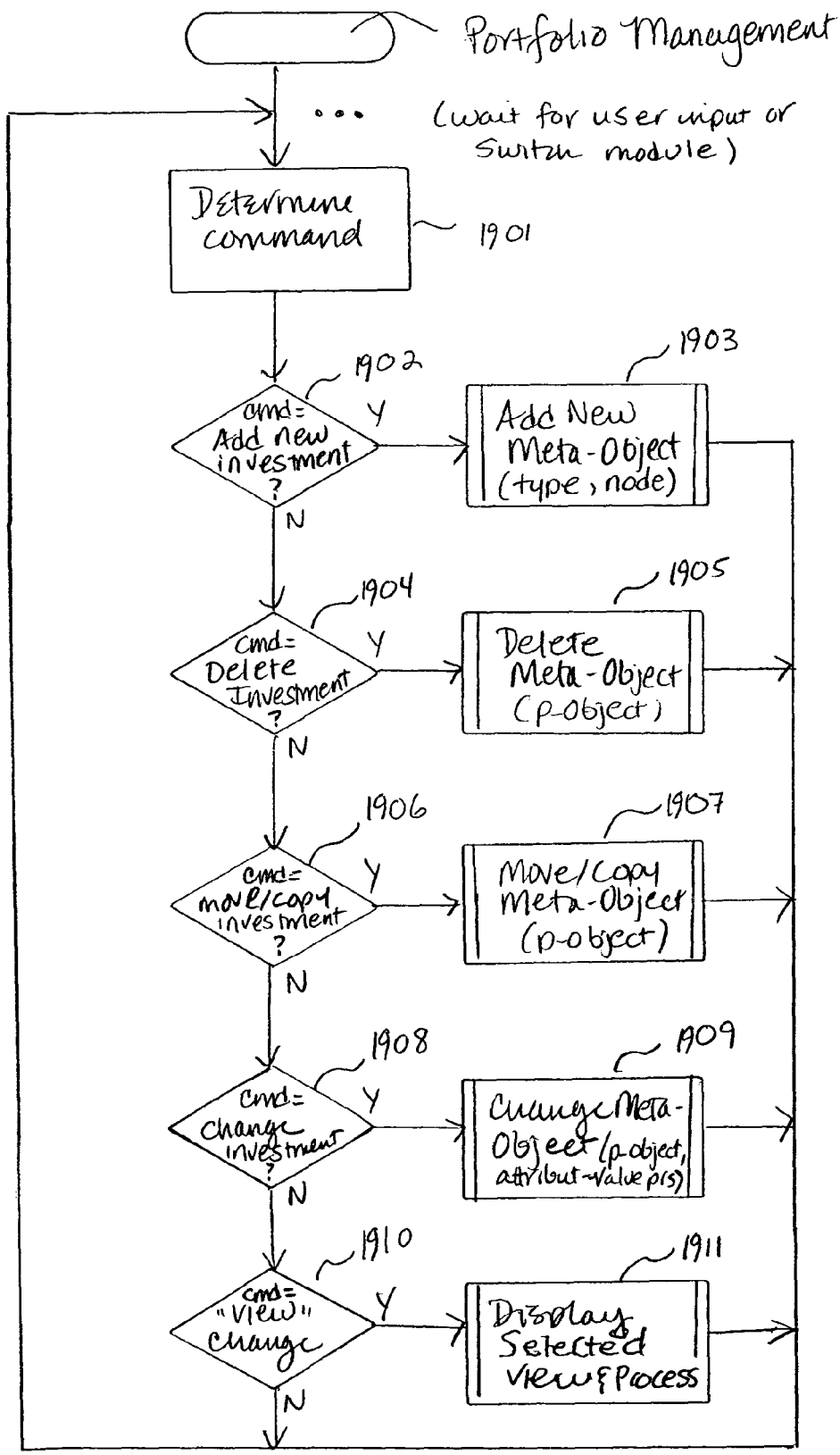
FIG. 19 is an overview flow diagram of example portfolio management functions of a portfolio manager component of an example Enterprise Portfolio Management System.

FIG. 19 is an overview flow diagram of example portfolio management functions of a portfolio manager component of an example Enterprise Portfolio Management System. The portfolio manager component of an enterprise portfolio management system is responsible for creating and managing the meta-object instances that correspond to investment data. One skilled in the art will recognize that the functions displayed in FIG. 19 are merely examples, and a portfolio manager component may be built with the same, similar, or altogether different functions. In step 1901, the portfolio manager component determines what command the user has designated to be executed. In step 1902, if the command indicates that a new investment object is to be added, then the portfolio manager continues in step 1903, else continues in step 1904. In step 1903, the portfolio manager invokes an Add New Meta-Object routine to add a new meta-object instance that corresponds to the type of investment object desired, and returns to step 1901 to determine and process the next user command. An example Add New Meta-Object routine is discussed further with reference to FIG. 20. In step 1904, if the command indicates that a particular investment object is to be deleted, then the portfolio manager continues in step 1905, else continues in step 1906. In step 1905, the portfolio manager invokes a Delete Meta-Object routine to delete the particular investment instance, and returns to step 1901 to determine and process the next user command. An example Delete Meta-Object routine is discussed further with reference to FIG. 22. In step 1906, if the command indicates that the user desires to move or copy an investment object to a different location in the investment instance hierarchy, then the portfolio manager continues in step 1907, else continues in step 1908. In step 1907, the portfolio manager calls a Move/Copy Meta-Object routine to move or copy the investment object indicated, and returns to step 1901 to determine and process the next user command. An example Move/Copy Meta-Object routine is discussed further with reference to FIG. 21. In step 1908, if the command indicates that an investment object is to be modified, then the routine continues in step 1909, else continues in step 1910. In step 1909, the portfolio manager invokes a Change Meta-Object routine to modify the object instance passing appropriate information, and then returns to step 1901 to determine and process the next user command. An example Change Meta-Object routine is discussed further with reference to FIG. 23. In step 1910, if the command indicates that the user's view is to be changed to a different component of the enterprise portfolio management system, then the portfolio manager continues in step 1911, else returns to step 1901 to determine and process the next user command. In step 1911, the portfolio manager relinquishes control to the indicated component. For example, the user may select a "Workflow View" to view and manipulate object transitions for a selected meta-object. Example screen displays that illustrate a workflow view are described further with reference to FIGS. 35 and 36. An example routine for processing a Workflow View is described further with reference to FIGS. 37A and 37B.

Figure 20:
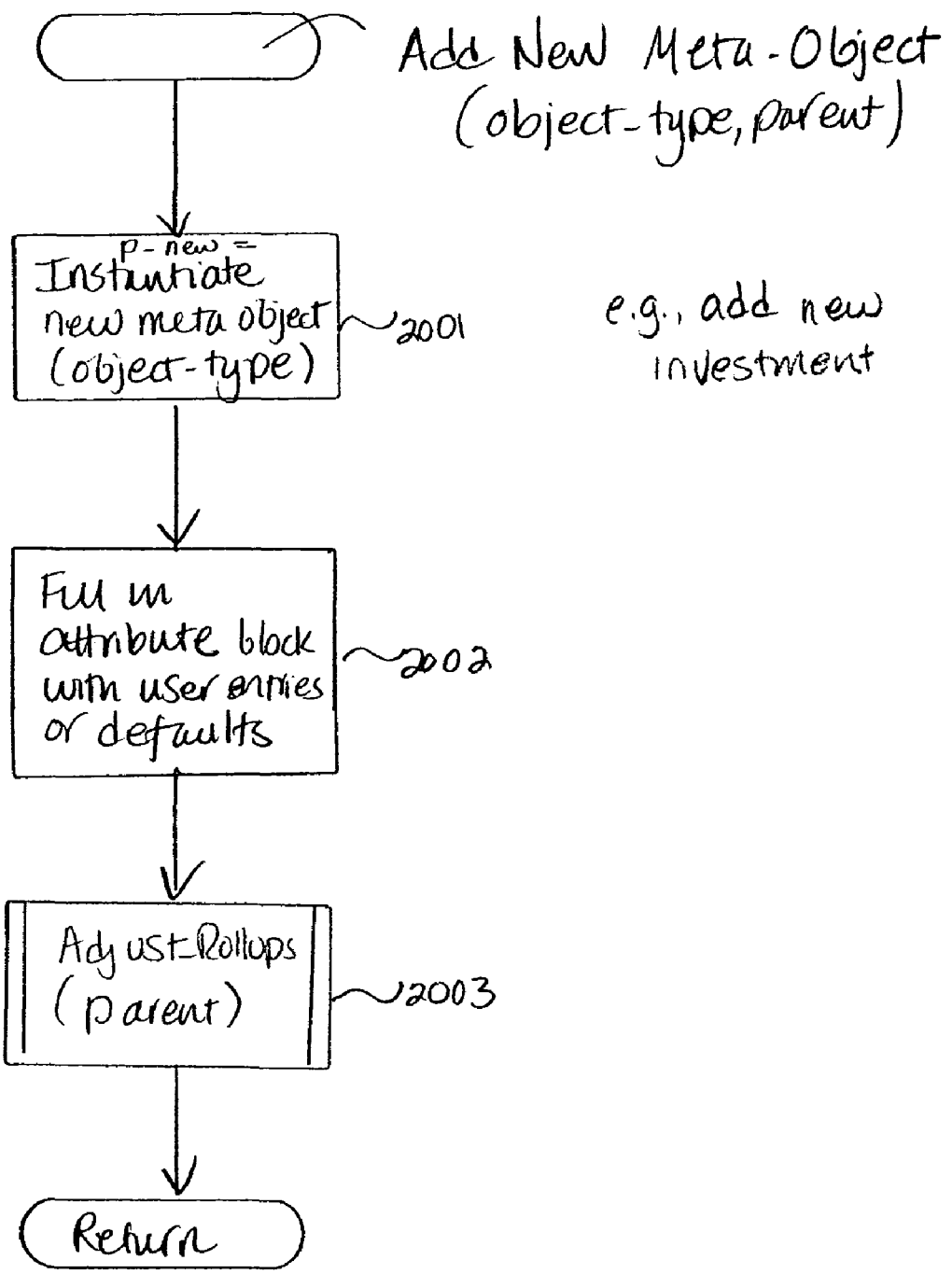
FIG. 20 is an example flow diagram of an Add New Meta-Object routine for adding a new meta-object (investment).

FIG. 20 is an example flow diagram of an Add New Meta-Object routine for adding a new meta-object (investment). The Add New Meta-Object routine is responsible for instantiating and adding a new investment object to a parent node in the investment object hierarchy. The routine takes as input a designated object type and a destination location (new parent object). In step 2001, the routine instantiates a new meta-object to correspond to the investment type. In step 2002, the routine populates the attribute block with user specified values or defaults for unspecified values. In step 2003, the routine invokes the Adjust Rollups routine (previously described with reference to FIG. 11) on the sub-tree of the instance hierarchy whose root is the parent node of the added object. The routine then returns.

Figure 21:
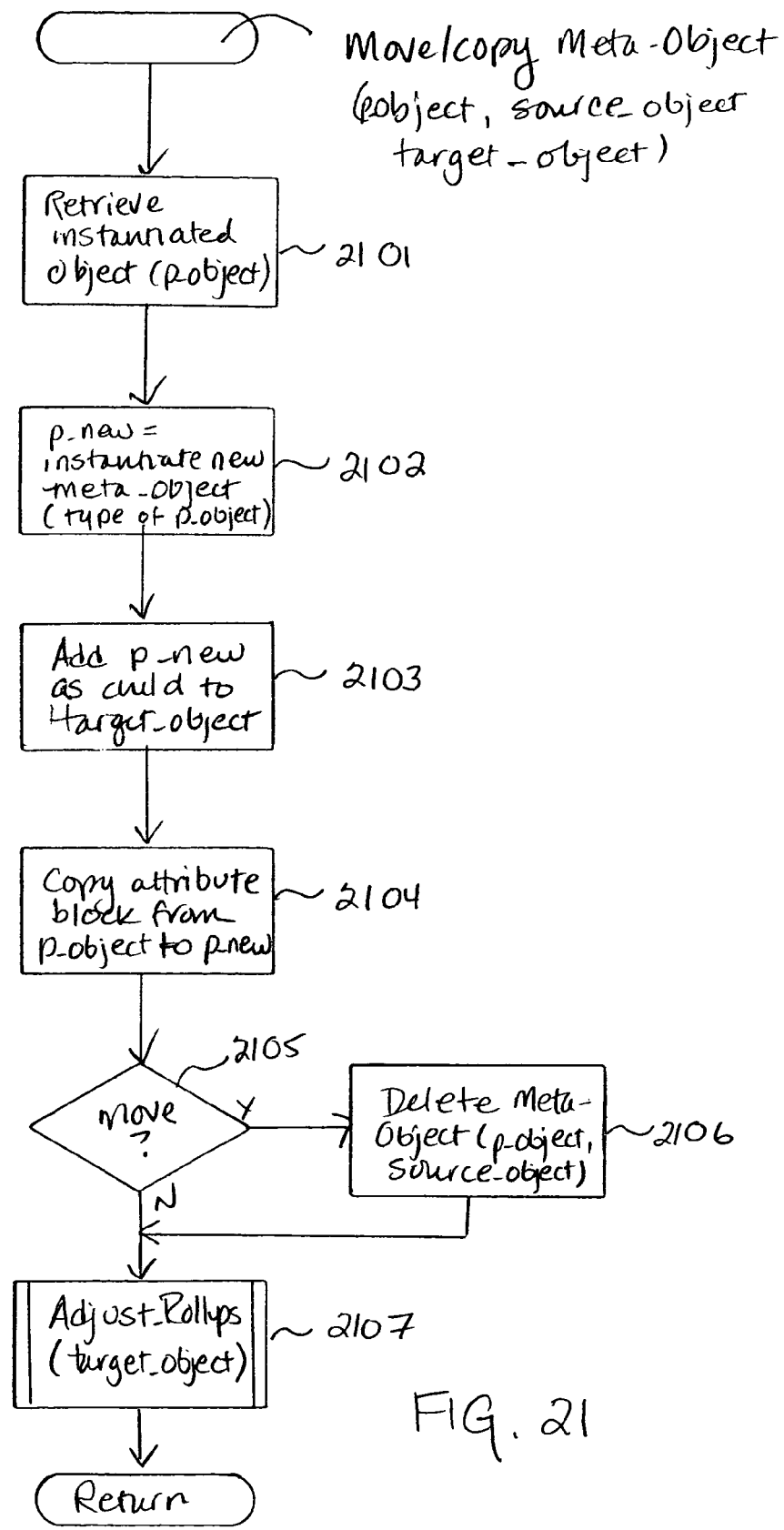
FIG. 21 is an example flow diagram of a Move/Copy Meta-Object routine for moving/copying a new meta-object (investment).

FIG. 21 is an example flow diagram of a Move/Copy Meta-Object routine for moving/copying a new meta-object (investment). The routine takes as input a designated object, a source location (current parent object), and a destination location (new parent object) in the instance hierarchy. In step 2101, the routine retrieves the instantiated object in the instance hierarchy that corresponds to the designated object. In step 2102, the routine instantiates a new object of the same type of object as the designated object. In step 2103, the routine adds the newly instantiated object as a child of the designated new parent object (where the new object is being moved to or copied to). In step 2104, the attribute block, including the values, is copied from the designated object to the new object. In step 2105, if the command has a indicated that a move of the investment object is desired as opposed to a copy of the investment object, then the routine continues in step 2106 to delete the designated object from the current parent, else continues in step 2107. Thus, a move operates similar to a copy except that the original investment object is deleted. In step 2107, the routine invokes the Adjust Rollups routine (previously described with reference to FIG. 11) on the entire instance hierarchy, and returns.

Figure 22:
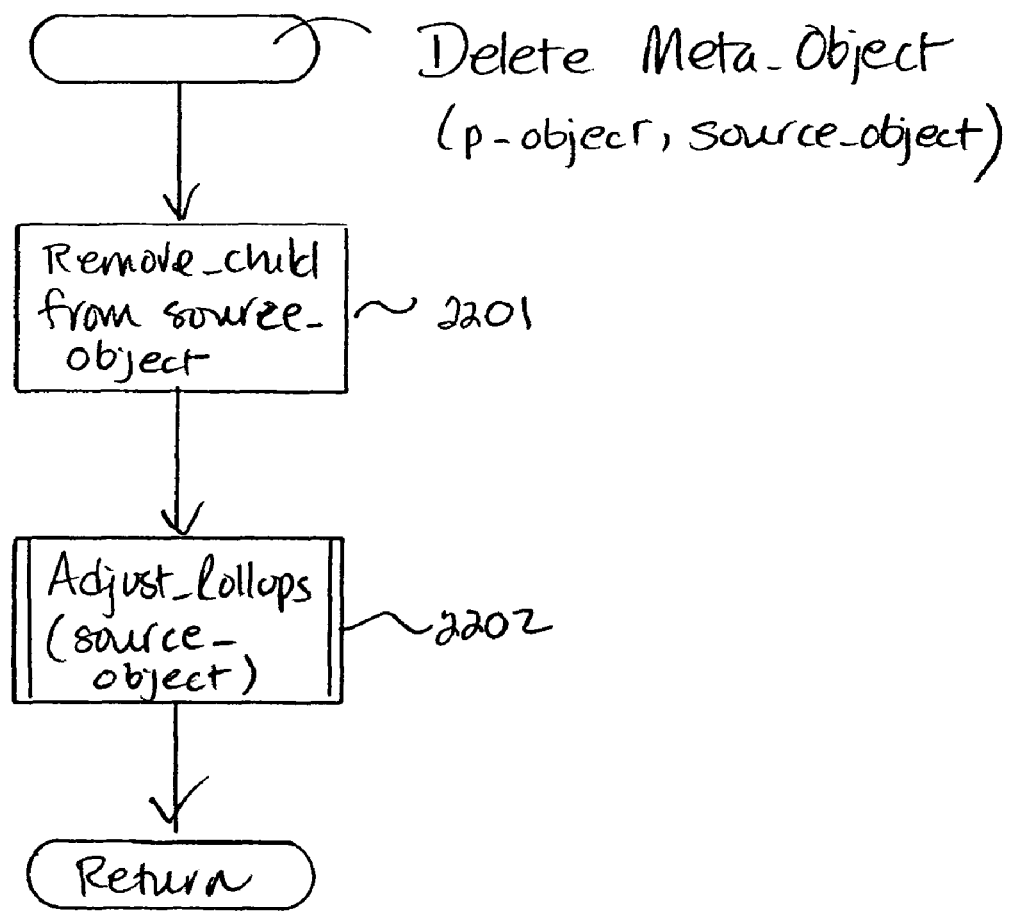
FIG. 22 is an example flow diagram of a Delete Meta-Object routine for deleting a meta-object (investment).

FIG. 22 is an example flow diagram of a Delete Meta-Object routine for deleting a meta-object (investment). The Delete Meta-Object routine takes as input parameters a designated object to be deleted and a source location (current parent object). In step 2201, the routine removes the designated child object from the source location. In step 2202, the routine invokes the Adjust Rollups routine (previously described with reference to FIG. 11) to adjust the rollups on the sub-tree whose root is the source location, since one of its children objects has been deleted. The routine then returns.

Figure 23:
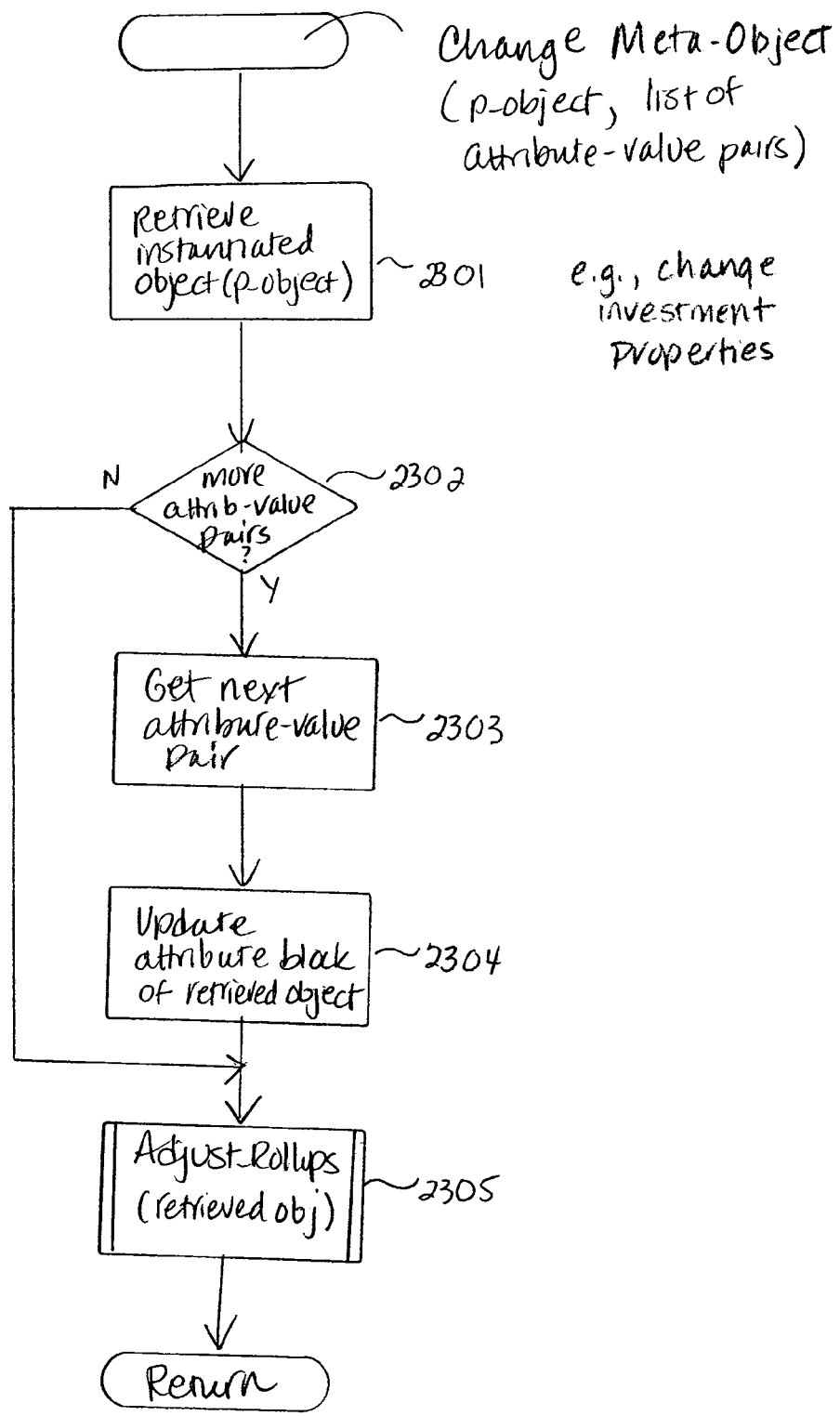
FIG. 23 is an example flow diagram of a Change Meta-Object routine for changing an existing meta-object (investment).

FIG. 23 is an example flow diagram of a Change Meta-Object routine for changing an existing meta-object (investment). The Change Meta-Object routine takes as input a designated object and a list of attribute tag-value pairs that describe values for the attributes of the designated object. This routine is used, for example, to change the properties of a particular investment. In step 2301, the routine retrieves the instantiated object that corresponds to the designated object. In steps 2302 through 2304, the routine executes a loop for each designated attribute tag-value pair to update the attribute block in the retrieved object. Specifically, in step 2302, the routine determines whether there are more designated attribute tag-value pairs and, if so, continues in step 2303, else continues in step 2305. In step 2303, the routines obtains the next attribute tag-value pair in the designated list. In step 2304, the routine updates the attribute block of the retrieved object with the particular attribute tag designated by the current attribute tag-value pair, and updates the value of that attribute in the attribute block of the retrieved object. In step 2305, the routine invokes the Adjust Rollups routine (previously described with reference to FIG. 11) on the sub-tree whose root is the retrieved object, and returns.

Figure 35:
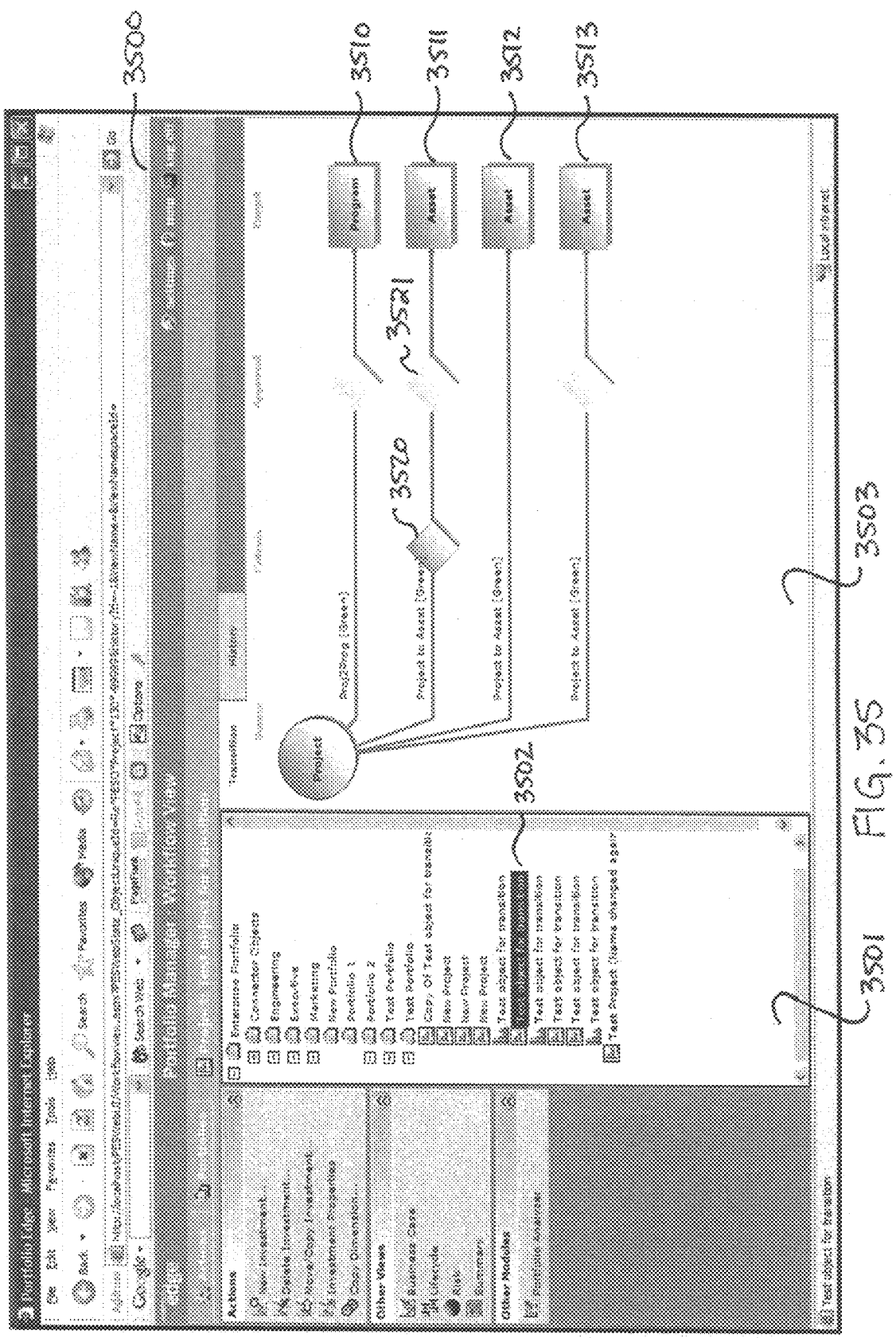
FIG. 35 is an example screen display of a workflow view of an example Enterprise Portfolio Management System that illustrates multiple transitions to different types of investments defined for a single investment.

FIG. 35 is an example screen display of a workflow view of an example Enterprise Portfolio Management System that illustrates multiple transitions to different types of investments defined for a single investment. The workflow view 3500 of the example portfolio manager is illustrated as a part of a client browser connected to a network, although one skilled in the art will recognize that it could be implemented as a standalone application or through a different client-side interface. The investment hierarchy that corresponds to a selected portfolio is shown in area 3501. The current potential object transitions that correspond to a selected investment 3502 are shown as transition representations (or "transition paths") in transitions area 3503. Each transition is "potential" because it cannot be initiated until its defined criteria, if any, are met and until requested by an initiating user. An initiating user is preferably one that has "write" access to the investment.

In an alternative embodiment, object transition management is automatic and does not require user initiation. (However, some implementations may optionally require user finalization to make sure that each particular transition is desired before a meta-object is transformed.) For example, when an investment is instantiated and corresponding object transitions are instantiated, then corresponding "transition events" are placed on an internal MODMS event list for processing. For example, in one embodiment, whenever an investment object is modified (or the workflow view is selected), the MODMS executes an event for each of the object's transitions to check the status of transition criteria and initiate the transition when the criteria is met. Approval notifications are then automatically sent as well according to the approval list that corresponds to the initiated transition.

There are four potential transitions represented by transition paths 3510-3513. Object transition path 3510 represents a potential transition from a "project" type investment to a "program" type investment, which contains an approval list (not yet approved) and no criteria. Thus, when a user initiates the transition associated with transition path 3510, the approval notifications will be sent approximately immediately. Since there are no criteria for the transition assocated with transition path 3510, the transition is available to be initiated. Object transition paths 3511-3513 represent potential transitions from a "project" type investment to an "asset" type investment. The transition associated with transition path 3513 operates similarly to the transition associated with transition path 3510, as no criteria are defined. The Transition associated with transition path 3512 progresses approximately immediately once the user initiates the associated transition as there are no criteria and no approval required. The transition associated with transition path 3511 is only available to be initiated once the criteria 3520 are met. Then, when the user initiates the transition associated with transition path 3511, the transition progresses to approval state 3521, where approval requests are sent via the stored notification paths to the approvers. Once any of transitions associated with transition paths 3510, 3511, or 3513 have been approved, the initiating user is given the option to finalize them before the transition to the destination object type occurs.

Figure 36:
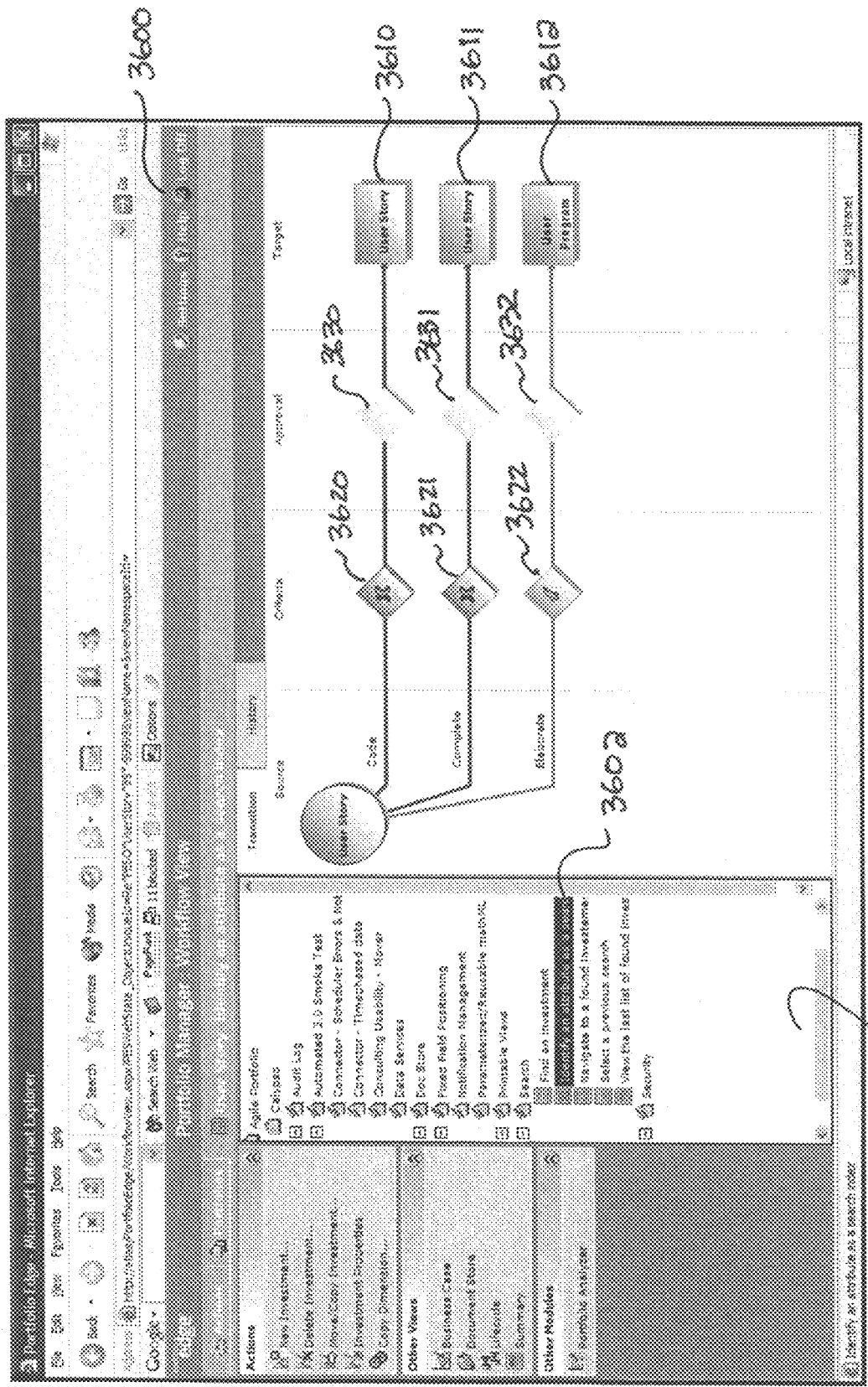
FIG. 36 is an example screen display of another workflow view of an example Enterprise Portfolio Management System that illustrates multiple transitions to the same type of investment and to one other type of investment based upon different transition paths defined for a single investment.

FIG. 36 is an example screen display of another workflow view of an example Enterprise Portfolio Management System that illustrates multiple transitions to the same type of investment and to one other type of investment based upon different transition paths defined for a single investment. In this example, an object of type "user story" is transformed to the same type "user story" by two different potential transitions and to an object of type "user program" by one potential transition. Transitions to the same type of object allow a user to designate a new location for the object if the corresponding criteria are met and approvals granted. Because they are not automatic in this embodiment, a user can choose which of three transitions to initiate. If a user initiates more than one, then different heuristics can be implemented, including letting the first successful transition go to completion and thereafter aborting the not yet successful transitions. In FIG. 35, three potential object transitions represented by transition paths 3610-3612 are instantiated for the selected investment 3602 shown in investment object area 3601. The "code" transition represented by the transition path 3610 is not yet available to be initiated, as shown by the "x" in criteria state 3620. Similarly, the "complete" transition represented by the transition path 3611 is note yet available to be initiated, as shown by the "x" in criteria state 3621. However, the "elaborate" transition represented by transition path 3612 is available to be initiated, as shown by the "✓" in criteria state 3622. FIGS. 38 and 41-44 describe further the possible operations and transition representations that can be displayed when the transition represented by the transition path 3612 is initiated.

Figure 37A:
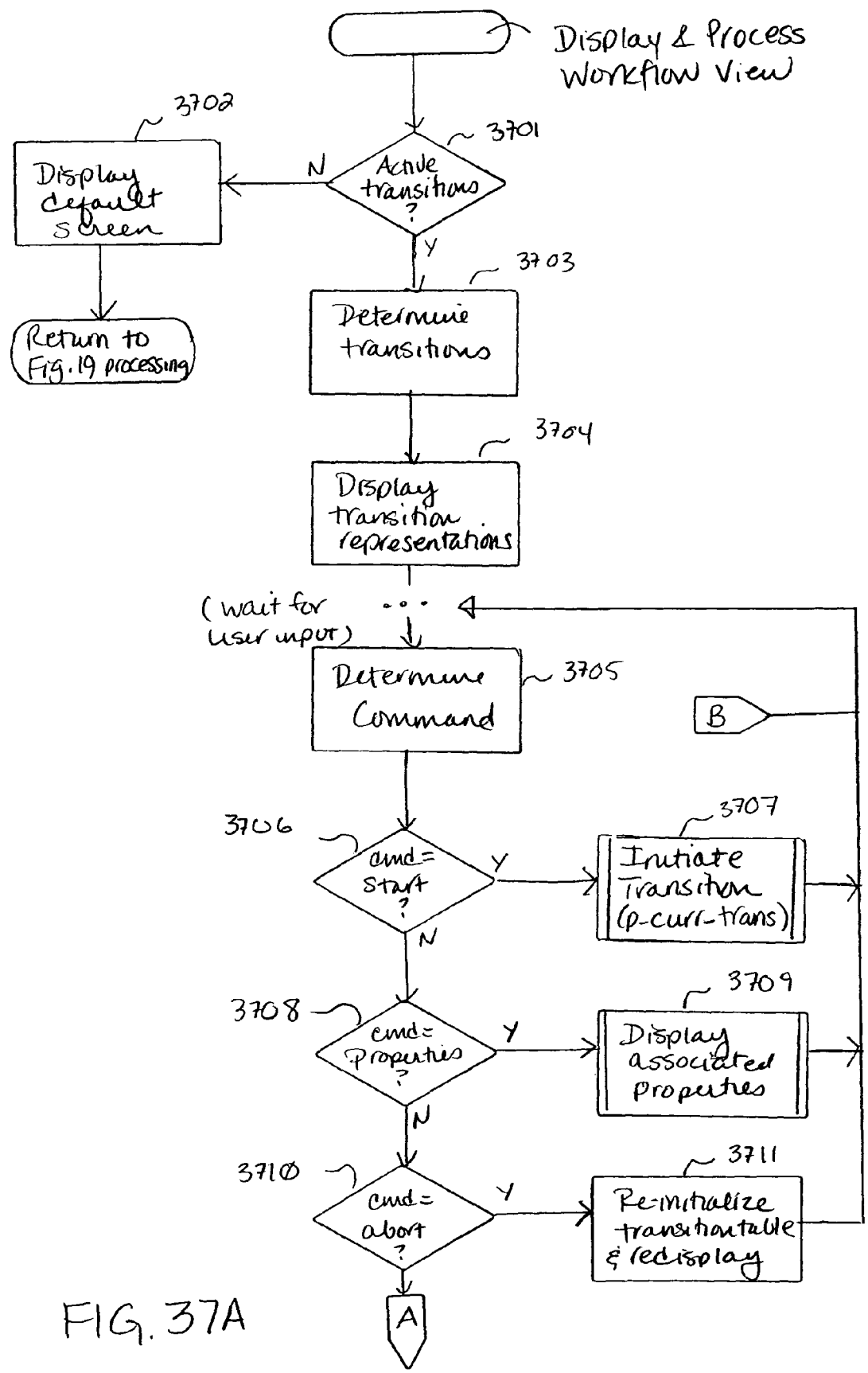
FIGS. 37A and 37B are an example flow diagram of the display and processing that occurs in a workflow view of an example Enterprise Portfolio Management System.
Figure 37B:
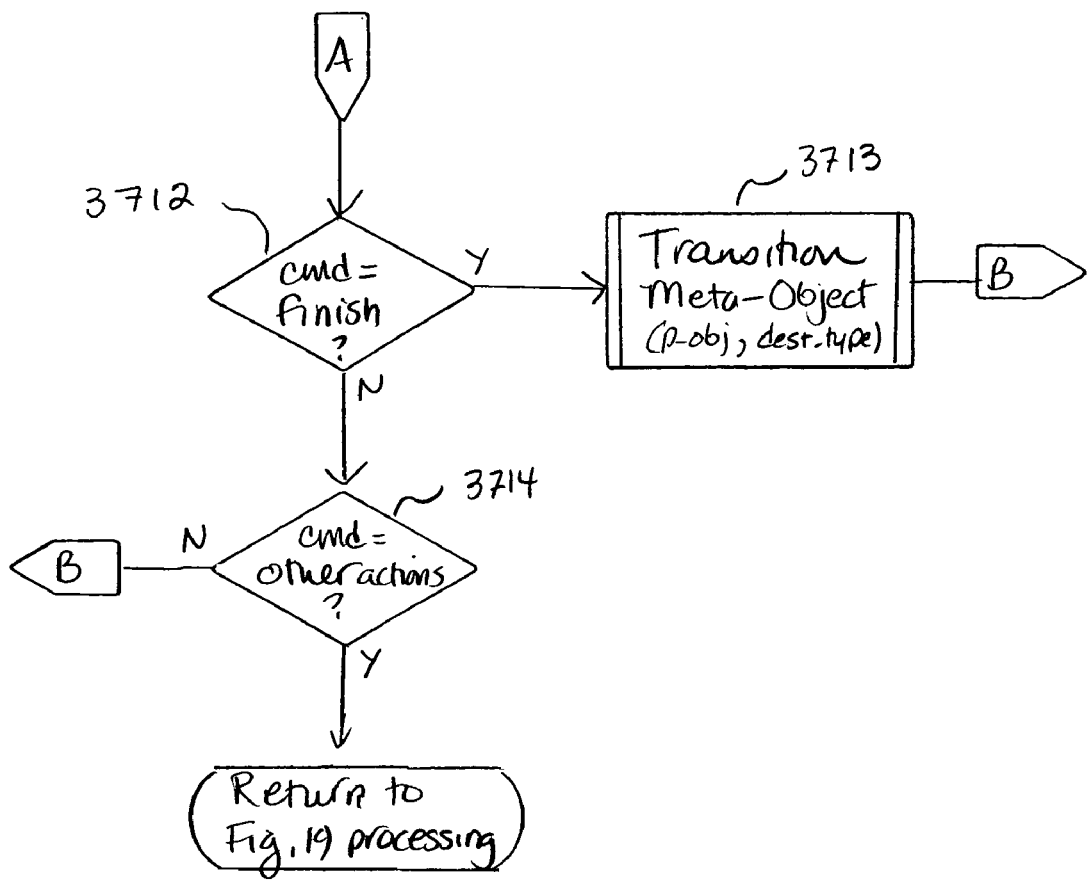

FIGS. 37A and 37B are an example flow diagram of the display and processing that occurs in a workflow view of an example Enterprise Portfolio Management System. This processing is invoked, for example, from step 1911 in FIG. 19 when workflow view is selected by a user. Note that when workflow view is selected, a meta-object (an investment) has been designated (by default or by the user). Thus, in step 3701, the MODMS determines whether there are any active object transitions for the meta-object, for example, by determining whether the pointer to the transition table 410 in FIG. 4 points to something or not. If not, then the routine continues in step 3702 to display a default screen for workflow view (possibly empty), and then returns to the command processing in FIG. 19 to await the next user command. Otherwise, the MODMS continues processing in step 3703. In step 3703, the MODMS determines the transitions for the meta-object, for example, by retrieving them from the meta-object transition table 3400 in FIG. 34. In step 3704, for each transition, the MODMS displays an appropriate diagram (a "transition path" or "transition representation") such as those displayed in FIGS. 35 and 36. For example, the MODMS may retrieve each entry from table 3400 and use the criteria met field 3411 and the approvals granted status field 3412 to determine the "states" of the various portions of the transition representation, such as criteria state 3622 in FIG. 36. The MODMS then awaits user input, for example initiation of a transition or a request for properties from some state of a designated transition.

Figure 43:
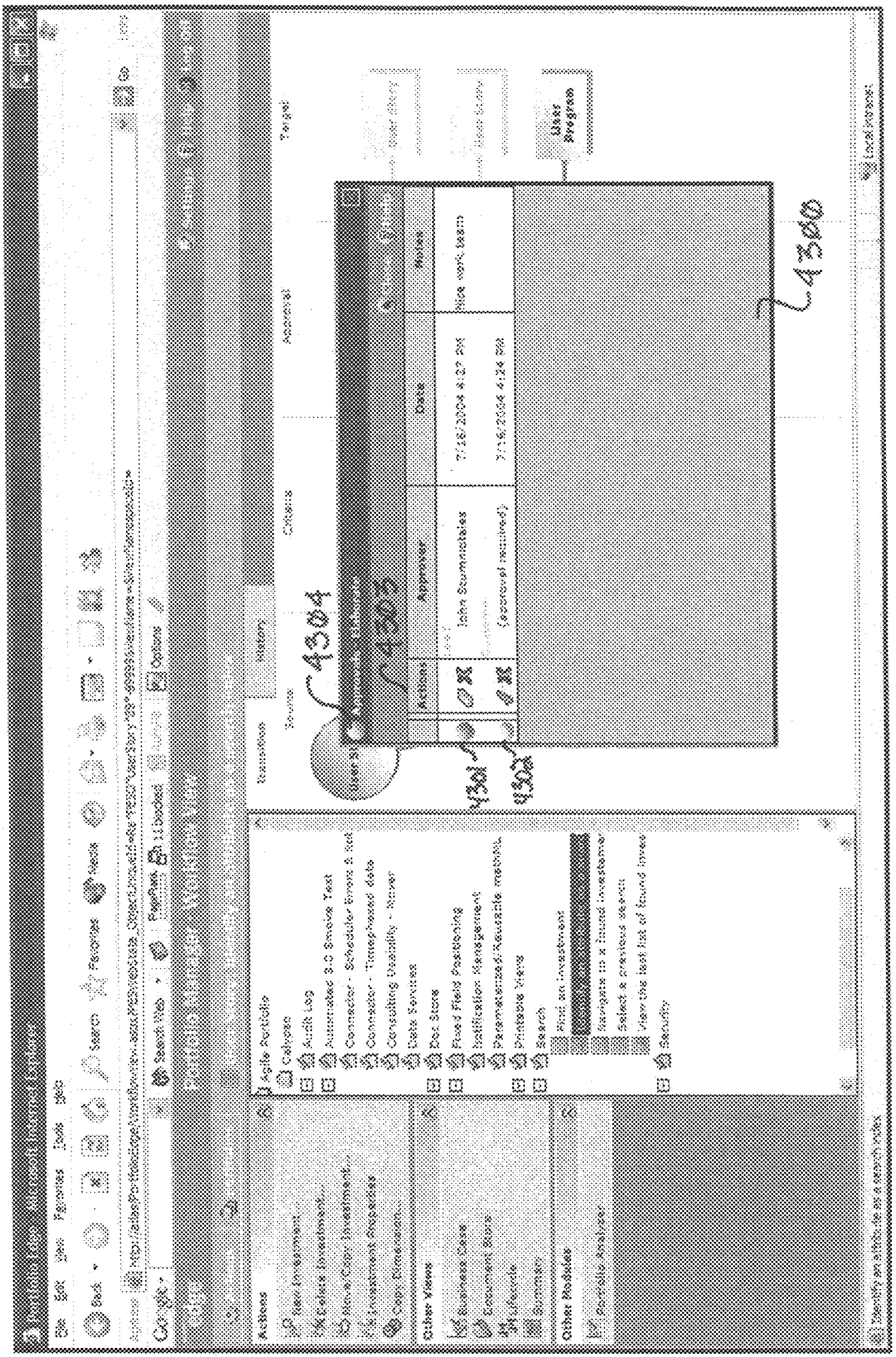
FIG. 43 is an example screen display in an example Enterprise Portfolio Management System of a properties dialog associated with the approval component of a transition.
Figure 44:
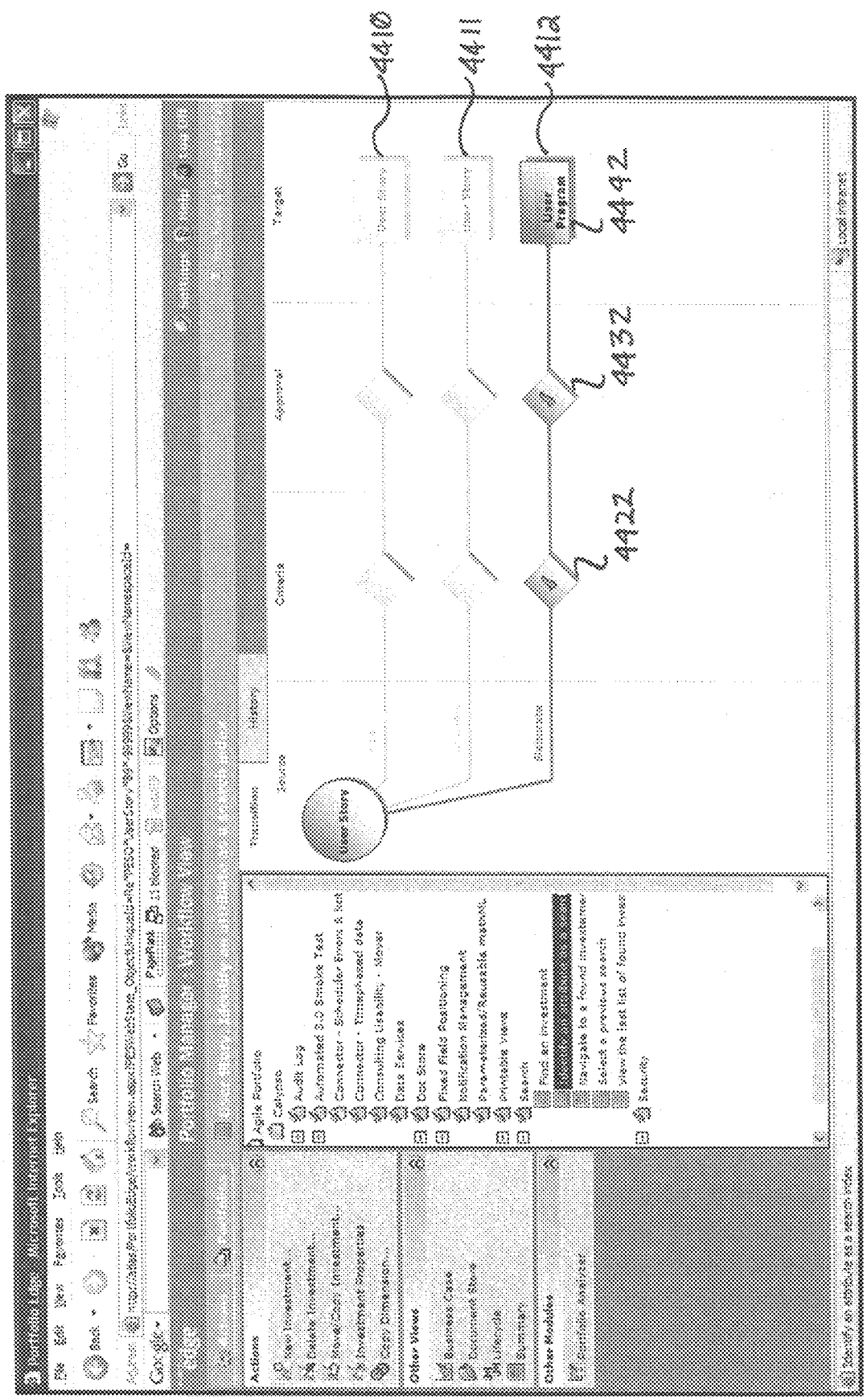
FIG. 44 is an example screen display of a transition ready to be finalized in an example Enterprise Portfolio Management System.

Specifically, in step 3705, the MODMS interprets the next user command. In step 3706, if the command indicates that the user wishes to initiate an indicated transition, then the MODMS continues in step 3707, otherwise continues in step 3708. In step 3707, the MODMS invokes an Initiate Transition routine designating the current transition, and then continues to the beginning of the command processing loop in step 3705. An example display screen displayed as a result of a user initiating the "elaborate" transition 3612 is described with reference to FIG. 38. An example Initiate Transition routine is described further with reference to FIG. 39. In step 3708, if the command indicates that the user desires to display properties of some portion of an indicated transition path, then the MODMS continues in step 3709, otherwise continues in step 3710. In step 3709, the appropriate properties are displayed, and then the MODMS continues to the beginning of the command processing loop in step 3705. Example properties display screens are described further with reference to FIGS. 41-43. In step 3710, if the command indicates that the user desires to abort an initiated transition, then the MODMS continues in step 3711, otherwise continues in step 3712. In step 3711, the MODMS re-initializes the corresponding transition table entry, redisplays the transition path, and continues back to the beginning of the command loop in step 3705. In step 3712, if the command indicates that the user desires to finish (complete) an initiated transition, then the MODMS continues in step 3713, otherwise continues in step 3714. The MODMS permits the "finish" command to allow a transition to progress to step 3713 preferably when all approvals have been granted. An example display screen of the state of a transition path ready for finalization is shown in FIG. 44. In step 3713, the MODMS invokes a Transition Meta-Object routine designating the current meta-object and an indication of the target (destination) object type. An example Transition Meta-Object routine is described further with reference to FIG. 45. In step 3714, the MODMS determines whether the command is another valid command (for example a change to a different user view), and if so, returns to FIG. 19 for further processing, otherwise returns to the beginning of the workflow view command loop in step 3705.

Figure 38:
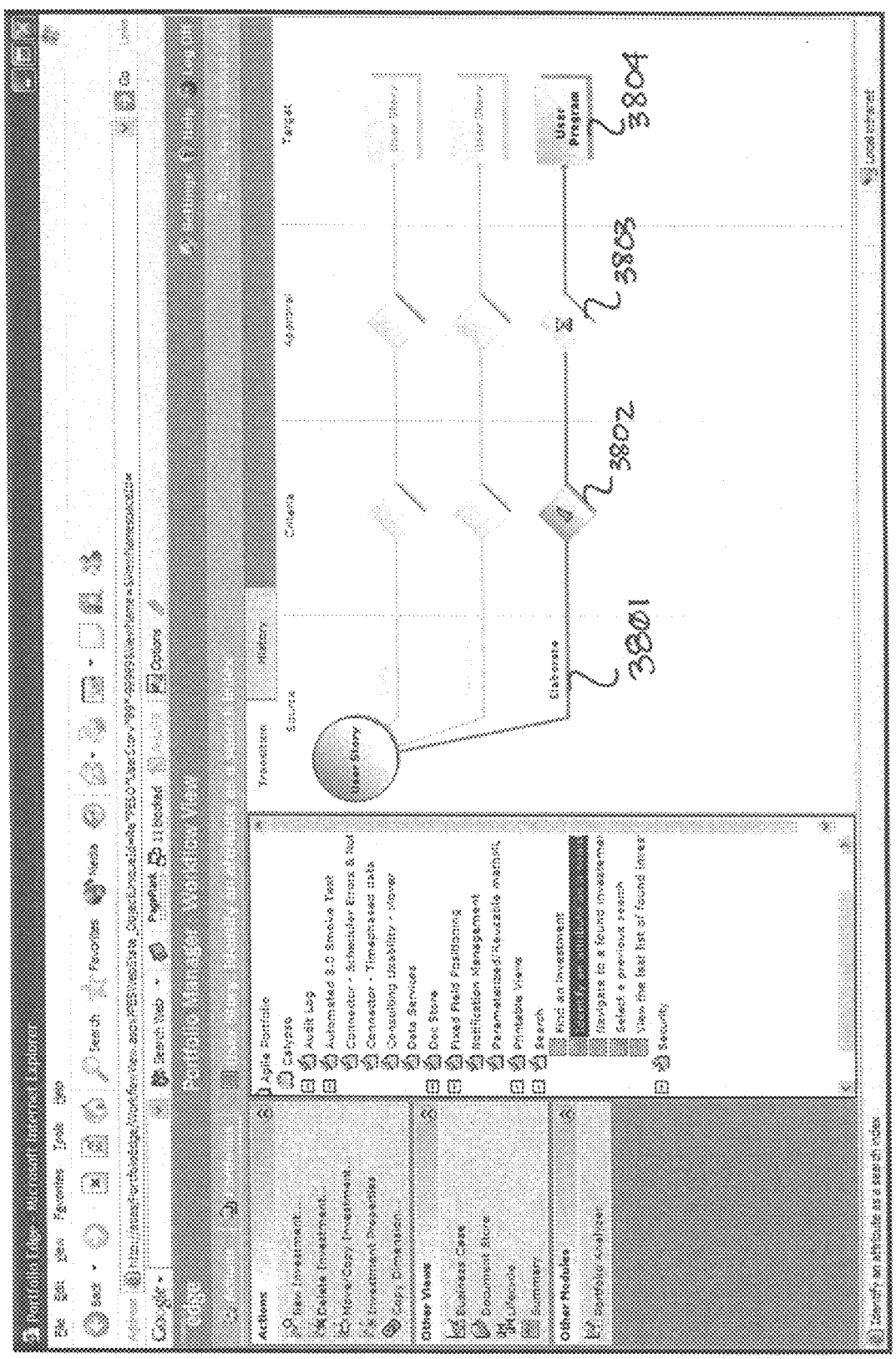
FIG. 38 is an example screen display in an example Enterprise Portfolio Management System of a meta-object (investment) transition that has been initiated after the criteria have been met.

FIG. 38 is an example screen display in an example Enterprise Portfolio Management System of a meta-object (investment) transition that has been initiated after the criteria have been met. Specifically, in the embodiment illustrated, a user brings up a context-menu (not shown), for example by selecting the representation of the destination object 3804 using an input device such as a mouse (or by selecting some other location on the transition path 3801 that is not associated with the criteria state 3802 or the approval state 3803), to start the associated transition or to display overall properties associated with the transition. In this example, this action is available preferably only if the criteria state 3802 indicates that the criteria have been met (as shown for example by the "✓" displayed in criteria state 3802). The "busy" indicator (as shown for example by the "⚖" icon) displayed in approval state 3803 indicates that approvals are being sought.

Figure 39:
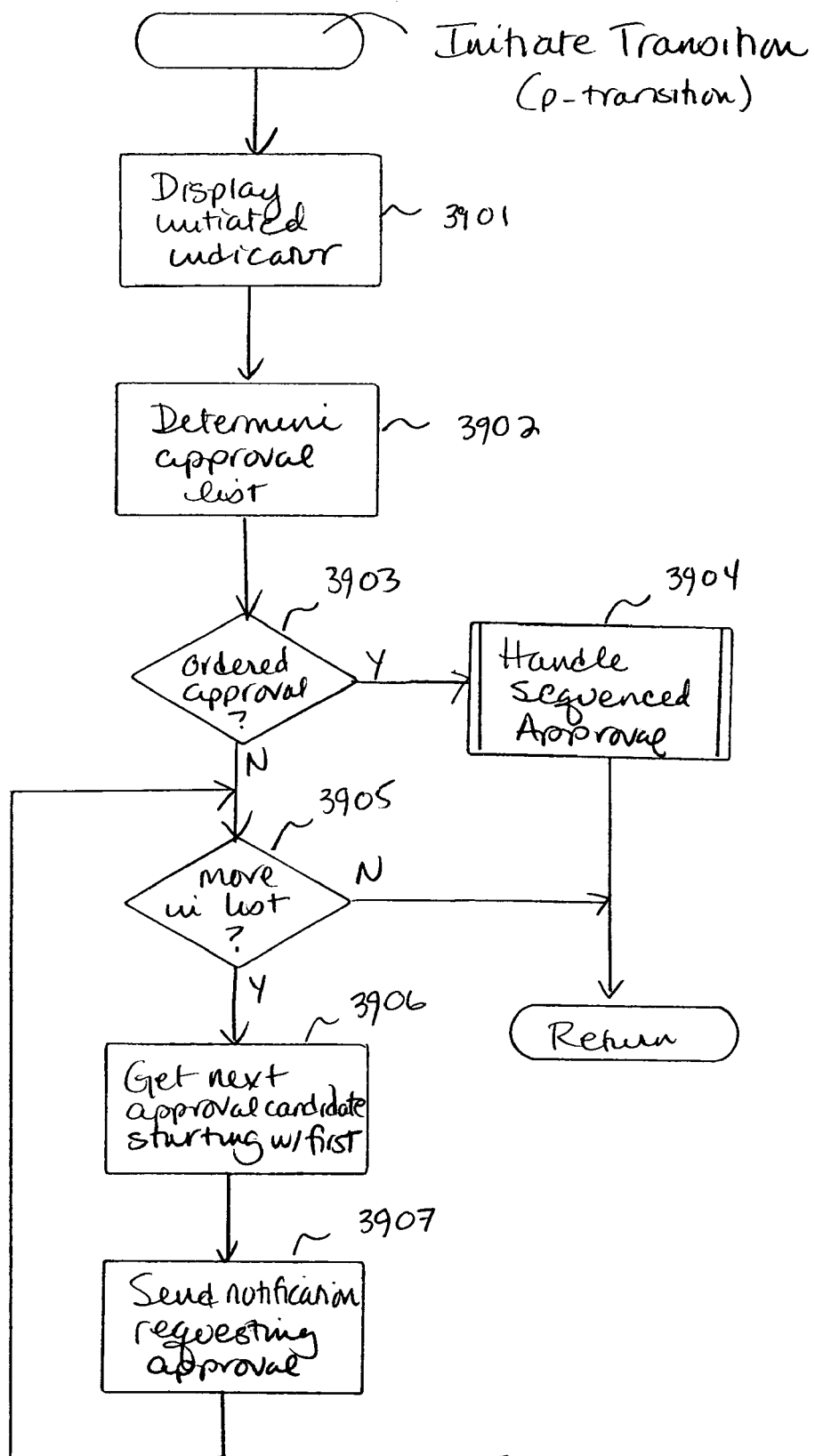
FIG. 39 is an example flow diagram of a routine for initiating a meta-object (investment) transaction in an example Enterprise Portfolio Management System.

FIG. 39 is an example flow diagram of a routine for initiating a meta-object (investment) transaction in an example Enterprise Portfolio Management System. A transaction to be initiated is designated as an input parameter. In summary, the Initiate Transition routine sends off the appropriate notifications according to the approval list associated with the designated transition. In step 3901, the routine displays some kind of indicator that the designated transition has been initiated to give feedback to the user. In step 3902, the routine determines the entities that are needed for granting approval (the "approvers"). In step 3903, the routine determines whether the object transition requires an "ordered" (sequential) approval, and, if so, invokes a routine to handle sequenced approval in step 3904, and then returns. Otherwise, then in step 3905, the routine determines whether there are more approvers in the list to process and, if so, continues in step 3906, else returns. In step 3906, the routine gets the next approval list entry to process starting with the first on the list. In step 3907, the routine retrieves the notification information from the approval list entry and sends an appropriate notification to the retrieved entity with a request to approve the designated transition. In one embodiment, notification is performed by sending email to the approver identifying the designated transition. Other means of notification could be employed, for example, sending network messages if the computer system is on-line and on a known network. The routine then returns to the beginning of the loop in step 3905 to process the next entry in the approval list. When complete, all notifications have been sent for requested approvals.

Return responses from such notifications can be implemented using well-known techniques for handling events that arrive asynchronously. For example, according to one embodiment, when a return notification event granting (or denying) permission is received by the MODMS, an event handler is triggered within the MODMS to update the approval status of the designated transition of the meta-object designated in the notification. The notification event changes the approval status of the corresponding entity in the approval list and determines whether all approvers have now approved the transition. If so, then the MODMS changes the approved status of the transition to "approved" in the appropriate entry in the transition table for the designated meta-object. That way, the next time the workflow view is refreshed or selected, the transition path for the designated object will indicate that the transition has been approved and ready for finalization.

Figure 40:
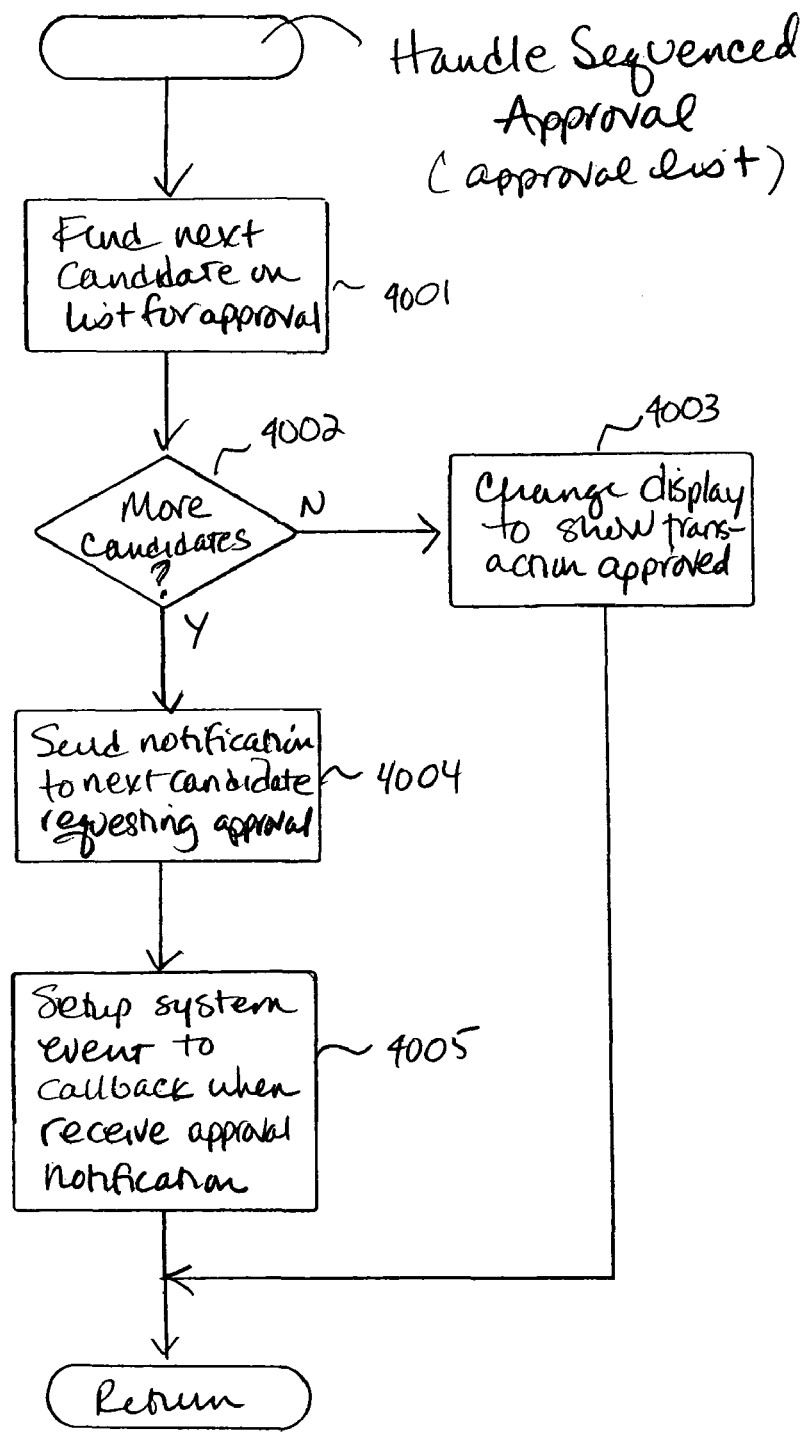
FIG. 40 is an example flow diagram of a routine for handling a sequenced approval process in an example Enterprise Portfolio Management System.

FIG. 40 is an example flow diagram of a routine for handling a sequenced approval process in an example Enterprise Portfolio Management System. According to this process, approvals are requested in order—after a prior approval has been granted, then the next approval request is sent out by the MODMS. Such a system can be implemented using well-known techniques for handling events that arrive asynchronously, such as an event handler similar to that described for handling return notifications. In this case, however, the event handler invokes the Handle Sequenced Approval return after the last notification response is received.

Specifically, in step 4001, the routine retrieves the next entry on the designated approval list. An approval list is designated, since the routine is invoked after each response notification. In step 4002, the routine determines whether there are any more entries to process, and, if so, continues in step 4004, else continues in step 4003. In step 4003, the routine changes the displayed transition path to show that the transition has been approved and is ready for finalization, and then returns. In step 4004, the routine sends an appropriate notification to the entity from the determined entry with a request to approve the designated transition, and then returns. In one embodiment, notification is performed by sending email to the entity identifying the designated transition. Other means of notification could be employed, for example, sending network messages if the computer system is on-line and on a known network.

Figure 41:
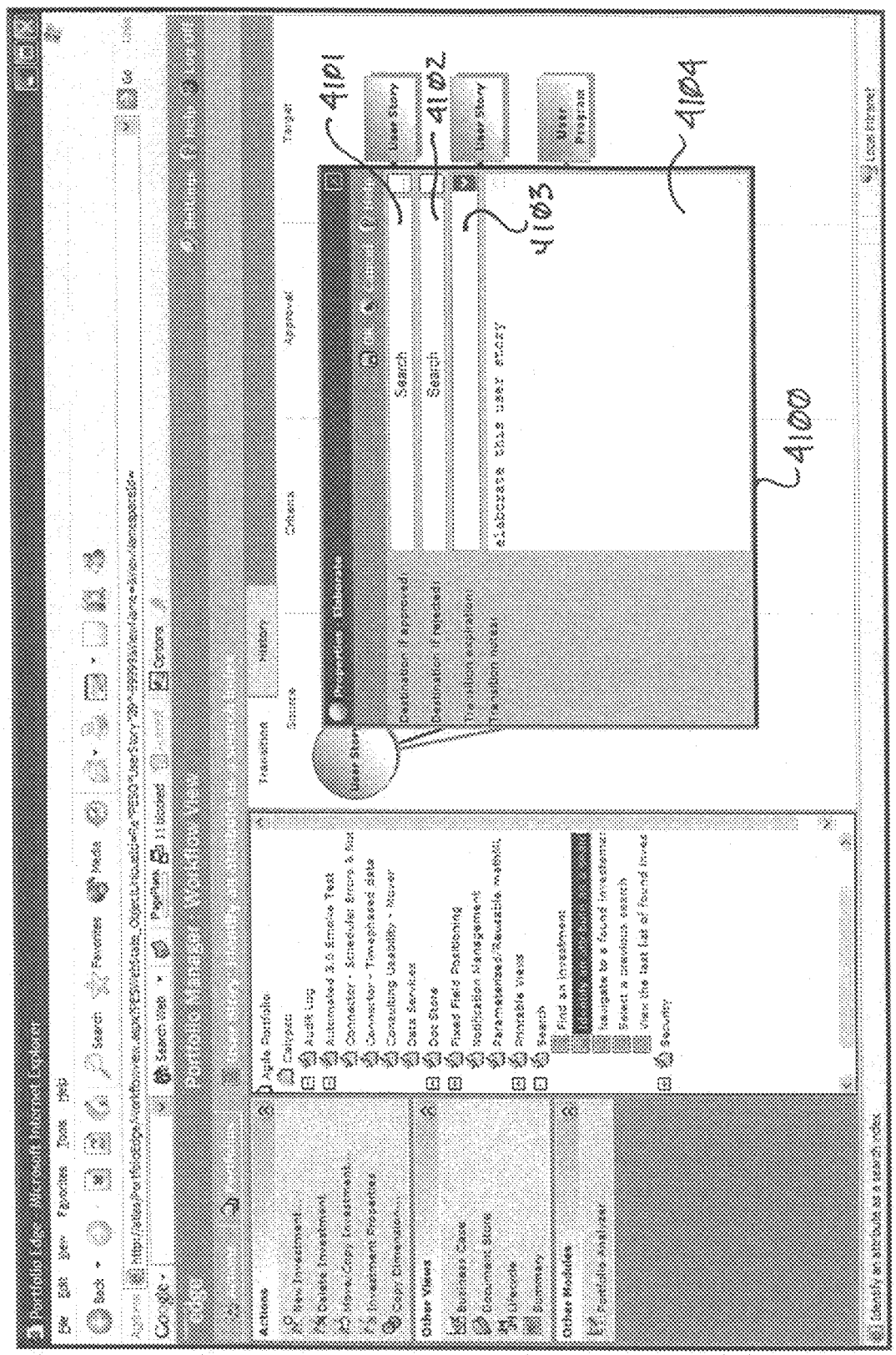
FIG. 41 is an example screen display in an example Enterprise Portfolio Management System of a properties dialog associated with a transition.

As indicated in step 3708 of FIG. 37, the user may select portions of a displayed transition path to display properties of the transition or of components of the transition (criteria or approvals). FIG. 41 is an example screen display in an example Enterprise Portfolio Management System of a properties dialog associated with a transition. It is displayed, for example, when the user selects the representation of the destination object to bring up a context menu, one menu item of which is "properties." The MODMS displays properties dialog 4100 in response. The properties dialog 4100 allows the transition initiator to set possible destinations—to other portions of the portfolio investment containment hierarchy—for the associated investment depending upon whether the transition is approved or disapproved in fields 4101 and 4102, respectively. That way, if the investment is transitioned to a same or a new type of investment, the initiator can choose a destination in the containment hierarchy for the adjusted investment. Accordingly, to simply transition an investment when particular criteria have been met or when approved, the initiator can define appropriate target locations without changing the investment type. Alternatively, the initiator can indicate that a change to the investment type is also desired, if a corresponding potential transition has been previously defined for the source object type that transitions to a different object type when the same criteria are met. In addition, the initiator can choose to set an expiration date for the transition to be effective in field 4103. Any notes are indicated in field 4104. One skilled in the art will recognize that other or different information may be displayed.

Figure 42:
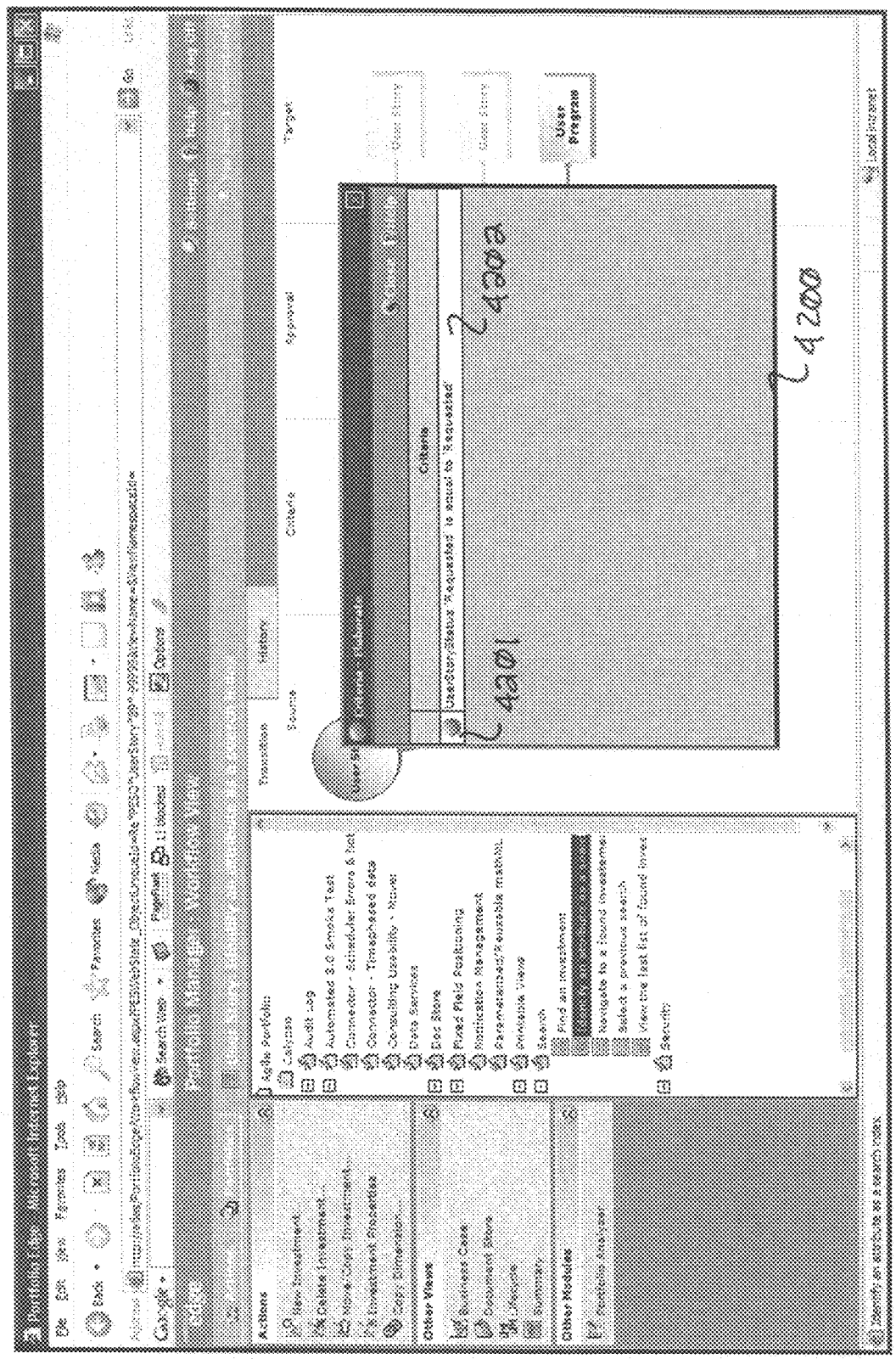
FIG. 42 is an example screen display in an example Enterprise Portfolio Management System of a properties dialog associated with the criteria component of a transition.

When the user brings up a context menu on a criteria state of a transition path, then the MODMS displays the properties associated with the criteria of the associated transition. For example, if the user requests properties of the criteria state 3622 in FIG. 36, then the MODMS displays the status of the criteria calculation and the result of the calculation. FIG. 42 is an example screen display in an example Enterprise Portfolio Management System of a properties dialog associated with the criteria component of a transition. In properties dialog 4200, the MODMS displays the current status of the criteria calculations in field 4201 using some kind of indicator, for example, a colored icon. The result of the criteria evaluation is displayed in field 4202. One skilled in the art will recognize that other or different information may be displayed.

When the user brings up a context menu on an approvals state of a transition path, then the MODMS displays the properties associated with the approvals list of the associated transition. For example, if the user requests properties of the approval state 3632 in FIG. 36, then the MODMS displays the approval list entities along with status of approval notifications. FIG. 43 is an example screen display in an example Enterprise Portfolio Management System of a properties dialog associated with the approval component of a transition. In properties dialog 4300, the MODMS displays an entry for each entity on the approval list. Each entry, for example entries 4301 and 4302, lists the name of the approver, the date an approval or other action was received, and any notes sent by the approver. The MODMS displays the actions that the associated entity can yet perform in action fields 4303. Possible actions may include, for example: clear approval, reject, or approve. A status indicator that indicates the approval state of an entry (for example, a colored indicator) is displayed next to each entry, and the properties dialog 4300 reflects the overall status of the approval list (for example, approved, rejected, or not yet approved) using an indicator 4304. One skilled in the art will recognize that other or different information may be displayed and that different indicators including sound or animation may be used.

FIG. 44 is an example screen display of a transition ready to be finalized in an example Enterprise Portfolio Management System. The transition associated with transition path 4412 is ready for finalization, as is represented by the successful indicators (e.g., "✓")in the criteria state 4422 and the approvals state 4432. The initiator can bring up a context menu on the target state 4442, which includes a menu item to finalize the associated transition. Once the transition is finalized, the meta-object is transformed to a new type if appropriate and placed in any designated target location in the containment hierarchy if one had been indicated, for example in the properties dialog 4100 displayed by FIG. 41. Once transformed the workflow view is typically refreshed because the displayed transition paths may no longer be applicable if, for example, the object type has been changed.

Figure 45:
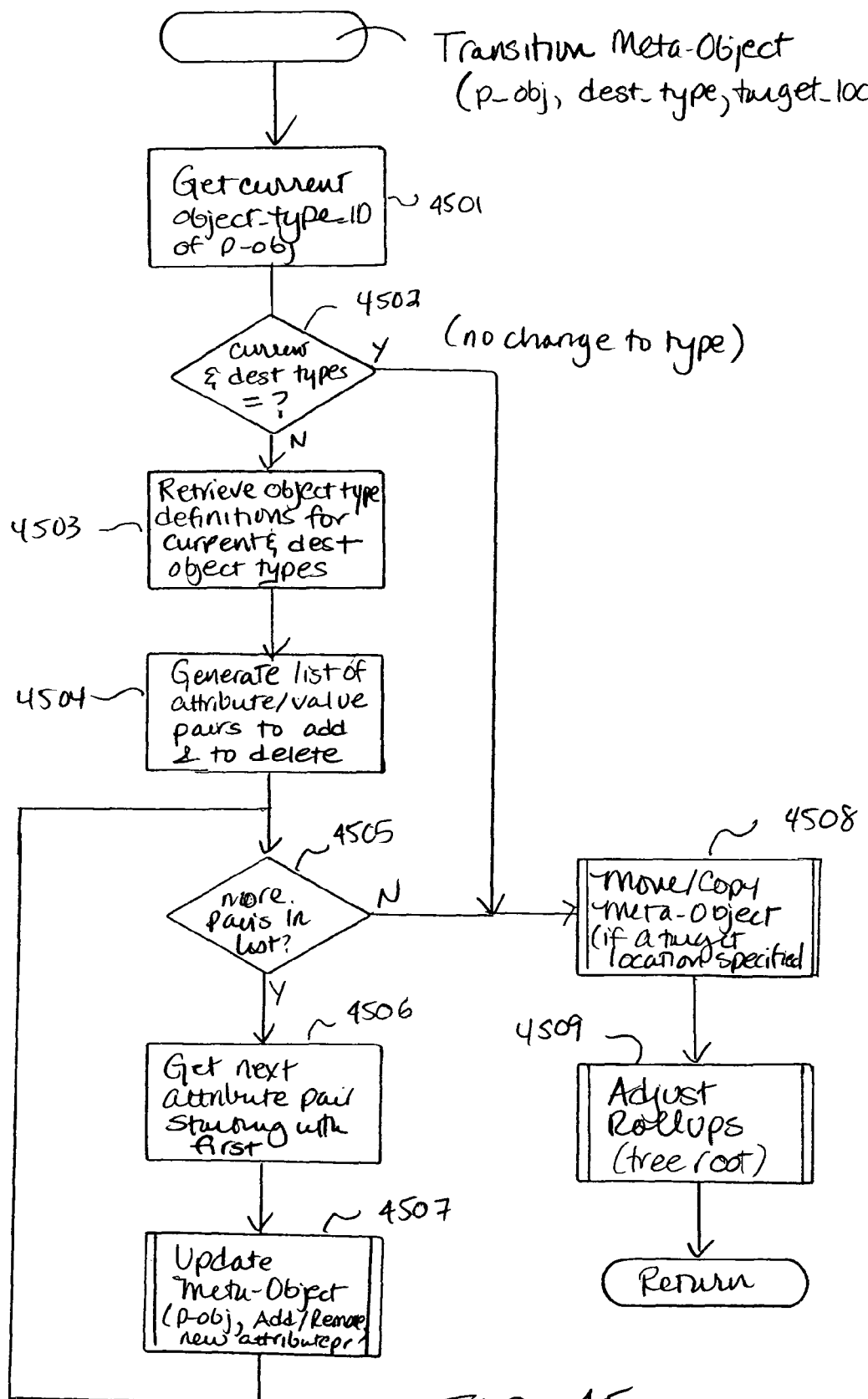
FIG. 45 is an example flow diagram of routine for performing the transition of meta-object (investment) from one type to another type in an example Enterprise Portfolio Management System.

FIG. 45 is an example flow diagram of routine for performing the transition of meta-object (investment) from one type to another type in an example Enterprise Portfolio Management System. An indicator to the meta-object and the destination object type are designated as input parameters. In summary, the MODMS transforms a meta-object from one type to another type by determining what attributes of the object are no longer included in the destination type and what new attributes need to be added to transform to the destination type. Then, for each of these attribute adjustments, the routine invokes a routine described with reference to FIG. 10 for updating a meta object with a new attribute/value pair. (This routine is also invoked when the definition for an object type is modified.) Once the meta-objects attributes have been adjusted, then the routine invokes the Adjust Rollups routine described with reference to FIG. 11 to recalculate any attributes that roll up due to new or modified attributes being added to an object in the containment hierarchy.

Specifically, in step 4501, the routine retrieves the current object type of the designated meta-object. In step 4502, the routine determines whether the object type is to be changed, and, if so, continues in step 4503, otherwise continues in step 4508. In step 4503, the routine retrieves the object type definitions associated with the current object type and the designated destination object type, so that they can be compared. In step 4504, the routine generates a list of attribute/value pairs that need to be deleted in the meta-object and the attribute/value pairs that need to be added in the meta-object to conform with the type definition for the destination object type. (For new attributes, default values may be used initially when the meta-object is transformed.) In step 4505, the routine determines whether there are any pairs left in the list(s) to process, and, if so, continues in step 4506, else continues in step 4508. In step 4506, the routine obtains as the current attribute the next attribute/value pair from the list starting with the first. Instep 4507, the routine invokes the Update Meta-Object routine with the current attribute and indicates whether the attribute is to be added or deleted, and then returns to process the next attribute/value pair in step 4505. In step 4508, after all new/deleted attribute/value pairs have been processed, the routine determines whether a new location has been designated for the current object and calls the Move/Copy Meta-Object routine to do so if appropriate. (The Move/Copy Meta-Object routine is described with reference to FIG. 21.) In step 4509, the routine invokes the Adjust Rollups routine to recalculate attributes that roll up for the entire portfolio, and then returns.

Figure 24:
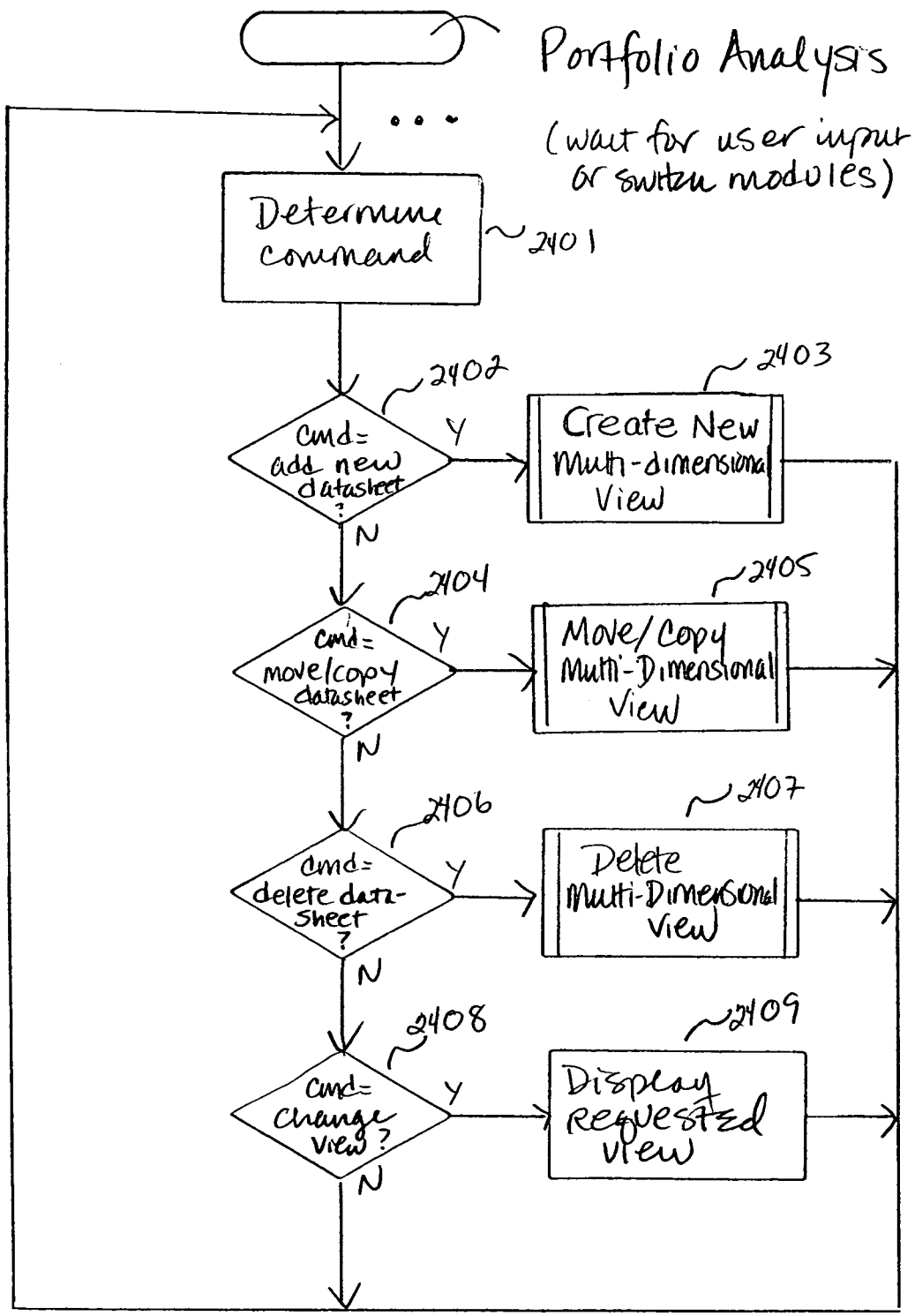
FIG. 24 is an overview flow diagram of example portfolio analysis functions of a portfolio analyzer component of an example Enterprise Portfolio Management System.

FIG. 24 is an overview flow diagram of example portfolio analysis functions of a portfolio analyzer component of an example Enterprise Portfolio Management System. The portfolio analyzer component of an enterprise portfolio management system is responsible for creating and managing multi-dimension views of the meta-object instances and charts that correspond to investment data. One skilled in the art will recognize that the functions displayed in FIG. 24 are merely examples, and a portfolio analyzer component may be built with the same, similar, or altogether different functions. In step 2401, the portfolio analysis component determines the command that was selected by the user as input. In step 2402, if the command indicates that a new datasheet is to be added, then the routine continues in step 2403, else continues in step 2404. In step 2403, the portfolio analyzer component invokes a Create Multi-Dimensional View routine to add a new multi-dimensional view to the enterprise portfolio management system, and then returns to step 2401 to determine and process the next user command. An example Create Multi-Dimensional View routine for adding a new multi-dimensional view is described further with reference to FIG. 25. In step 2404, if the command indicates that the user desires to move or copy a datasheet, then the portfolio analyzer component continues in step 2405, else continues in step 2406. In step 2405, the portfolio analyzer component invokes a Move/Copy Multi-Dimensional View routine to move or copy an existing multi-dimensional view, and then returns to step 2401 to determine and process the next user command. An example Move/Copy Multi-Dimensional View routine is described further with reference to FIG. 27. In step 2406, if the command indicates that a particular datasheet is to be deleted, then the routine continues in step 2407, else continues in step 2408. In step 2407, the portfolio analyzer component invokes a Delete Multi-Dimensional View routine to delete an existing multi-dimensional view, and then returns to step 2401 to determine and process the next user command. An example Delete Multi-Dimensional View routine is described further with reference to FIG. 28. In step 2408, if the command indicates that the user's view is to be changed to a different component of the enterprise portfolio management system, then the portfolio analyzer continues in step 2409, else returns to step 2401 to determine and process the next user command. In step 2409, the portfolio analyzer relinquishes control to the indicated component.

Figure 25:
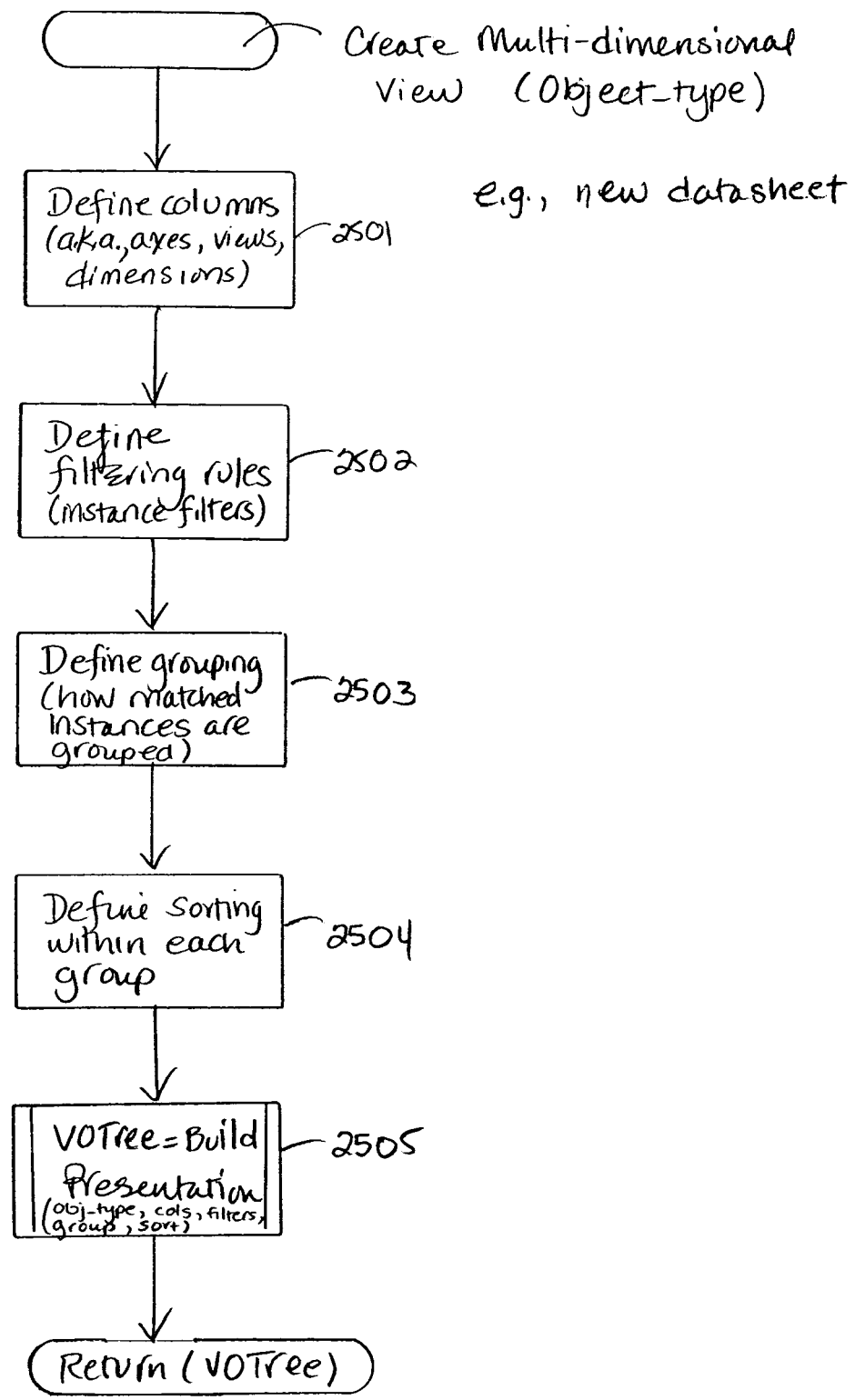
FIG. 25 is an example flow diagram of a Create Multi-Dimensional View routine for creating a multi-dimension view (datasheet) of an example portfolio.

FIG. 25 is an example flow diagram of a Create Multi-Dimensional View routine for creating a multi-dimension view (datasheet) of an example portfolio. As described earlier, new datasheets (also referred to as multi-dimensional views) can be defined for a particular portfolio or other object instance by populating values in a datasheet property sheet using well-known interfaces such as dialog windows or forms. One skilled in the art will also recognize that the equivalent input may be specified in a more "batch" oriented process, so that other code can use the routine to build a datasheet. Specifically, in step 2501, the routine implements a mechanism to define the various columns for the new datasheet view. In some environments, "columns" are also known as axes, views, dimensions, or by similar terminology. In step 2502, the routine implements a mechanism to define filtering rules. These rules are used filter out instances that do not match the specified rule or that match the specified rule, however indicated. In step 2503, the routine implements an interface to define how instances that match the column specification and filtering rules are to be grouped in the resultant datasheet. In step 2504, the routine implements an interface to define the particular sorting algorithm to be used to order matching instances within each grouping. In step 2505, the routine invokes a Build Presentation routine to build a presentation that corresponds to the new datasheet properties defined in steps 2501-2504. This presentation is referred to herein as a "virtual object tree" since objects are temporarily instantiated that correspond to the datasheet, which are not stored in the actual hierarchy or using persistent storage. An example Build Presentation routine is described further with reference to FIG. 26.

Figure 26:
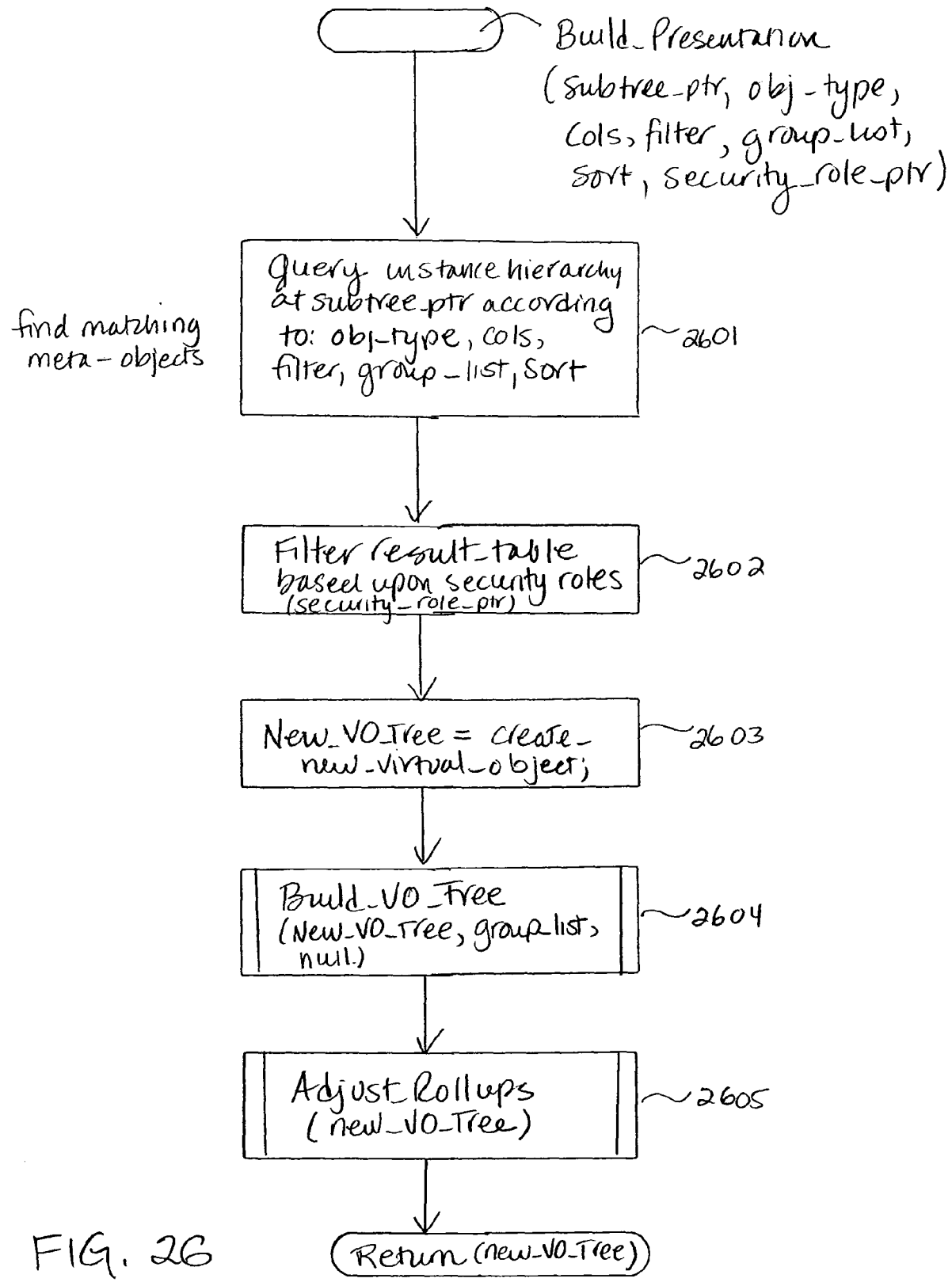
FIG. 26 is an example flow diagram of a Build Presentation routine for building a presentation for a multi-dimension view.

FIG. 26 is an example flow diagram of a Build Presentation routine for building a presentation for a multi-dimension view. The routine takes as input a indicator of a sub-tree in the instance hierarchy (typically a portfolio node) and other attributes specified by the datasheet attribute specification, such as an object type, list of relevant columns, filter definition, grouping list, sorting list, and a indication of an applicable security role. In summary, the build presentation routine queries the investment object instance hierarchy to determine all of the investment objects that match the attribute specification of the datasheet and builds a virtual object tree that corresponds to the matching instances. In essence, a virtual object is a temporary object instance that is used to group the real investment object instances based upon the groups indicated in the attribute specification. That is, since an instance does not exist that directly corresponds to the "group" itself and a grouping is a mere abstraction, in order for all of the rollup functions etc. to work properly, a virtual object needs to be created to correspond to each matching group, as if the group were an entity. The virtual objects look and behave like other investment objects to a user; however they live for the life of the datasheet, and are instantiated when needed to present the datasheet. Once the virtual object tree is created, then rollups are adjusted appropriately. One skilled in the art will recognize that there are other ways to implement a datasheet, and that FIG. 26 and Table 1 correspond to one of these implementation approaches.

Specifically, in step 2601, the routine queries the investment object instance hierarchy at the designated sub-tree according to the designated parameters specified in the datasheet attribute specification (see input parameter list) to determine a results table. Specifically, the query locates objects of the designated object type that have the designated columns and that correspond to the grouping, filtering, and sorting rules previously indicated and designated as input parameters. The designated group list is a list of each grouping of matching instances. For example, investments may be grouped by "rank" and then by geographic region. Once grouped, then the designating sorting rules are used to order matching instances within a group (the results of the query).

In step 2602, the routine filters the resulting table of instances based upon the security roles that are indicated by the designated security roles. For example, different security roles can be defined for different users and organizational groupings, etc., and the roles can be used to filter the data users have access to and what types of investment data can be viewed via the datasheets. Different security roles may be defined that correspond to modification access permissions as well as what data may be viewable. The security roles may directly correlate to the organizational hierarchy, which may also be reflected in the actual containment hierarchy of the investment instances.

In step 2603, a new virtual object tree root node (a virtual object) is created. In step 2604, a Build_VO_Tree routine is invoked to build a virtual object tree from the resultant table of instances that was returned as a result of the query. The pseudo code for an example Build_VO_Tree routine is described further with reference to Table 1. In step 2605, the routine invokes the Adjust Rollups routine described with reference to FIG. 11 on the newly created virtual object tree so that rollups can be properly computed for the datasheet. The routine then returns the instantiated virtual object tree, which corresponds to the datasheet.

TABLE 1

```
1   Build_VO_Tree (root, group_list, query_string) {
2
3      curr_group = head (group_list);
4      new_grp_list = rest (group_list);
5      # for each value in current group, starting with the first, ending with the last
6      for value = first_value (curr_group), next (curr_group, last_value (curr_group) {
7
8         subroot = create_new_virtual_object;
9
10        if (new_grp_list = null) {
11           # find all data that matches current sent of group values
12           leaf_table = query_results_table ( concat (query_string,
13                        curr_group, value));
14           for row in leaf_table {
15              # add pointers from subroot to all data that matches
16              add_row_as_child (subroot, row);
17              # update subroot attributes based on row data
18              update_subroot_attributes (subroot, row);
19           };
20           if (result != 0) {
21              # integrate new leaf node (virtual object) into VO tree
22              add_child (root, subroot);
23              # update root attributes based upon those of new VO
24              update_root_attributes (root, subroot);
25           } # no data exists with current group value
26           else delete (subroot);
27        }
28        else {
29           # recurse to build a child sub-tree with current group = value
30           child = Build_VO_Tree (subroot, new_grp_list,
```

TABLE 1-continued

```
31          concat (query_string, curr_group, value));
32        # add the newly built child into the current sub-tree
33        add_child (root, child);
34        # update root attributes based upon those of child
35        update_root_attributes (root, child);
36     };
37   }; # end loop on current group values
38
39   return (root);
40 }
```

Table 1 contains pseudo code for an example Build_VO_Tree routine. As illustrated, the Build_VO_Tree routine implements a recursive process for building up a virtual object tree from the results of a query of the investment instance hierarchy based up a datasheet attribute specification. It is assumed that the results of the query are in tabular form, or otherwise easily decomposed, and that the results are grouped and sorted in the order that they should be displayed. One skilled in the art will recognize that this is not a requirement and that the pseudo code for the Build_VO_Tree routine could be modified appropriately. Also, iterative equivalents of the recursive process could be equivalently substituted.

In summary, the routine builds a virtual object tree whose leaf nodes point to investment data. The routine operates from the "inside" out (leaf nodes up). That is, the datasheet is effectively a tree turned sideways, where the innermost groupings are the leaf nodes, the investment data that matches the innermost grouping are indicated in these leaf nodes, and the next level of grouping is the next "level" of intermediate virtual object nodes in the tree, and so forth. Virtual objects need to be created for each intermediate (group) node in the tree, since instantiated objects exist only for investment data. Thus, examining a datasheet excerpt shown in a Summary View of the Portfolio Analyzer, a subset of which is also displayed in Table 2 below, the investment data results are grouped first by Region values and grouped second by Score values. Under each combination of Region/Score values, there are 0 to N investment objects instances with those values. There are M levels of virtual objects for each M levels of groups. Thus, a virtual object is preferably created for each grouping (combination) value, with indicators to the instantiated investments, and a virtual object is needed for each discrete value (or combined value) of each group of groups, and so on.

TABLE 2

| Name | Budget | Region | Score | Status | Total Cost |
|---|---|---|---|---|---|
| Region: 2 | $81,000 | 2 | | | $72,000 |
| Score: 2 | $27,000 | | 2 | | $24,000 |
| Project 3 | $13,000 | 2 | 2 | Green | $12,000 |
| Project 2 | $9,000 | 2 | 2 | Red | $8,000 |
| Project 1 | $5,000 | 2 | 2 | Green | $4,000 |
| Score: 3 | $26,000 | | 3 | | $23,000 |
| Project A | $11,000 | 2 | 3 | Yellow | $10,000 |
| Project 4 | $8,000 | 2 | 3 | Green | $7,000 |
| Region: 1 | | 1 | | | |
| Score: 1 | | | 1 | | 1 |
| ... | | 1 | 1 | | |
| Score: 3 | | | 3 | | |

For example, looking at Table 2, a virtual object is created for a [region=2; score=2] leaf node; a [region=2; score=3] leaf node; a [region=1; score=1] leaf node; and a [region=1; score=3] leaf node. Each of these become children of an "intermediate" virtual object node, in this case, on the outermost grouping level: a virtual object is created for a [region=2] node and a virtual object is created for a [region=1] node, and so on. Thus, the resulting virtual object tree has 2 levels (since there are 2 levels of groups) with a topmost root, the first level corresponding to region values, and the second level corresponding to score/region values.

The pseudo code of Table 1 demonstrates an implementation of this approach. The loop of lines 6-37, examines each value of a current group. If the innermost group (leaf nodes) has not yet been reached, then the routine is invoked recursively in line 30 to build a virtual object tree starting with a newly created virtual object sub-tree and the rest of the group list. This process continues until the innermost group is reached, in which case line 10 is true. At that point, all of the matching investment instances for that combination of group values is determined (line 12), each matching instances is added to the virtual object leaf node (line 16), and the attributes of the virtual object leaf node are determined (line 18). Once all of the matching instances have been referenced by the virtual object leaf node (line 20), then the newly created leaf node is added into the virtual object sub-tree whose root is the next closest intermediate node (the parent virtual object of the leaf node) (line 22). The attribute values of the current root (the parent virtual object) are then updated based upon the attributes of the newly created virtual object leaf node (line 24). When the current invocation of the routine then pops back up to a prior recursive invocation (line 30 results), then the newly build virtual object sub-tree is added a child node to the current root of that sub-tree (line 33). The attributes of the current root are then updated to reflect the built sub-tree (line 35). In the example shown in Table 2, the current root at that point is the root of the datasheet—the entire virtual object tree. One skilled in the art will recognize that other implementations, such as those that actually persist the virtual objects that correspond to a datasheet are also feasible.

Figure 27:
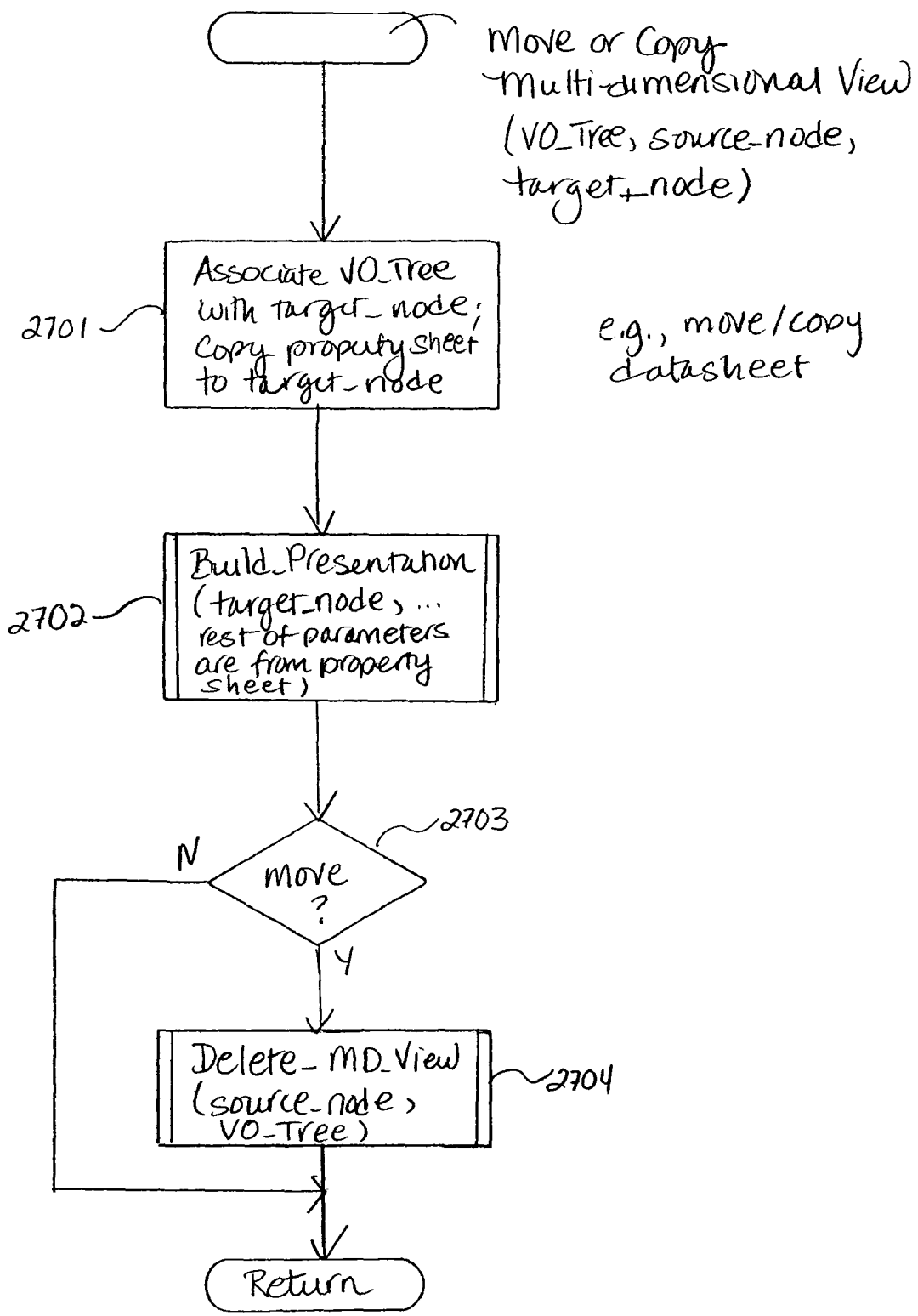
FIG. 27 is an example flow diagram of a Move/Copy Multi-Dimensional View routine for moving/copying a multi-dimension view.

As described earlier with respect to FIG. 24, once a datasheet is created, it can be moved or copied to another investment object. In one embodiment, datasheets are associated with portfolio objects only; however, one skilled in the art will recognize that it is possible to associate datasheets with other investment objects as well. FIG. 27 is an example flow diagram of a Move/Copy Multi-Dimensional View routine for moving/copying a multi-dimension view. The routine takes as input a virtual object tree, an indication of a source node, and an indication of a target (destination) node. Note that, if more than one datasheet can be associated with a node, then an indication of which datasheet is also an input parameter. In step 2701, the designated virtual object tree is associated with the designated target node so that the datasheet will become part of that investment object. The property sheet that defines the datasheet is also copied as appropriate to the properties of the designated target node so that the target node then has access to maintain the datasheet. In step 2702, the routine invokes the Build Presentation routine described with reference to FIG. 26 so that a new virtual object tree that corresponds to the moved datasheet can be created for the target node. This step is necessary since the values of the datasheet typically depend upon the sub-tree of nodes associated with the datasheet. In step 2703, if the portfolio analyzer interface has specified that the datasheet is to be moved, then the routine continues in step 2704, otherwise returns. In step 2704, the routine calls a Delete Multi-Dimensional View routine to delete the datasheet associated with the designated source node, and then returns.

Figure 28:
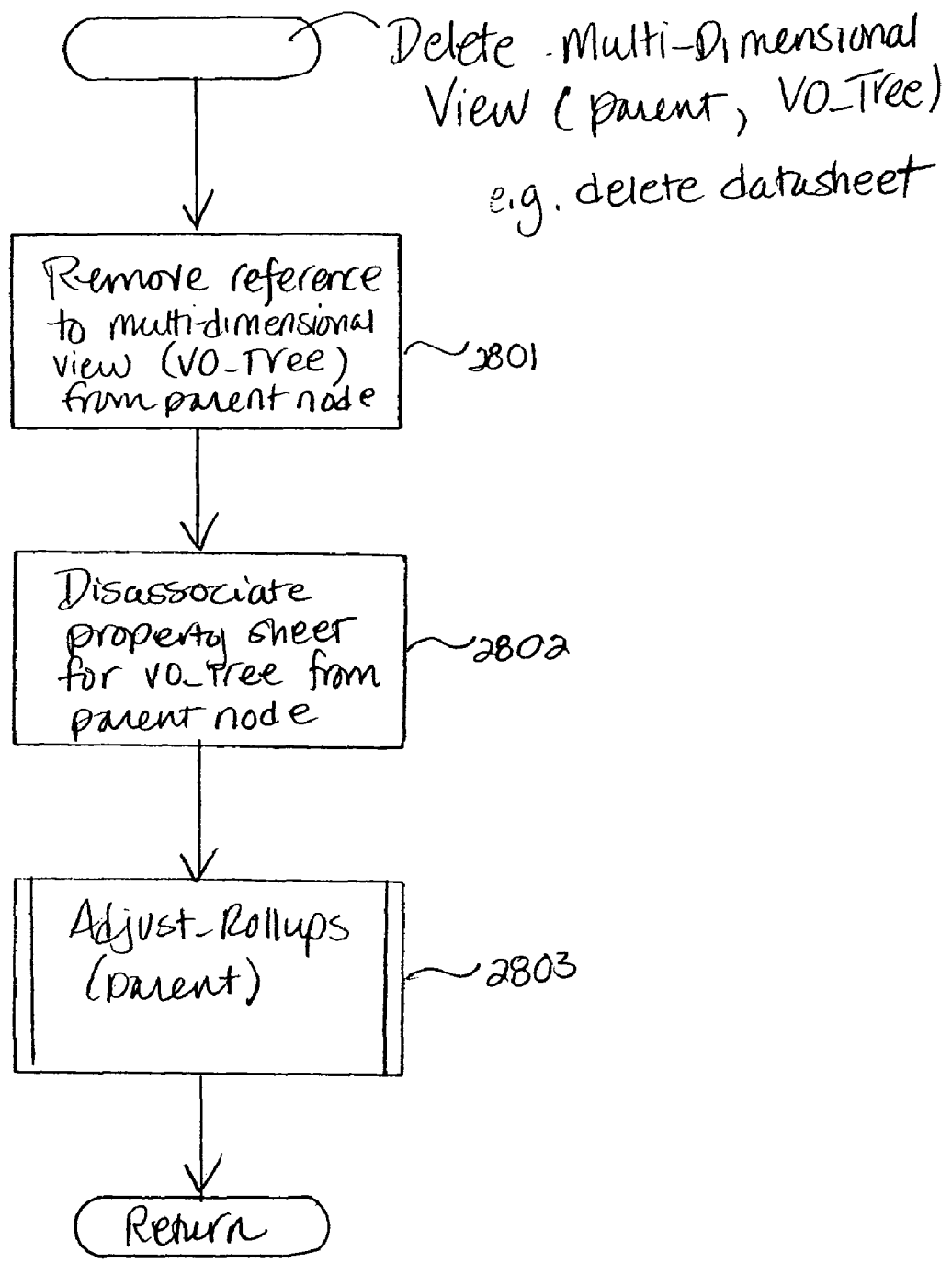
FIG. 28 is an example flow diagram of a Delete Multi-Dimensional View routine for deleting a multi-dimension view.

FIG. 28 is an example flow diagram of a Delete Multi-Dimensional View routine for deleting a multi-dimension view. This routine allows a user to delete an existing datasheet. The routine takes as input an indication of the parent (portfolio) node where the datasheet is to be deleted from, and an indicator to the virtual object tree. In cases where more than one datasheet is supported, an indicator to the datasheet is included as a parameter. In step 2801, the reference to the datasheet that is specified by the virtual object tree is removed from the designated parent node. In step 2802, the property sheet is disassociated from the parent node that corresponds to the designated virtual object tree. In step 2803, the routine then invokes the Adjust Rollups routine described with reference to FIG. 11 to recalculate the rollups on the sub-tree indicated by the parent node, in case values have been modified. The routine then returns.

In addition to creating and managing datasheets, the example portfolio analyzer also supports dynamic charting capabilities. the appendices of U.S. patent application Ser. No.10/613,534, entitled "METHOD AND SYSTEM FOR OBJECT-ORIENTED MANAGEMENT OF MULTI-DIMENSIONAL DATA," filed Jul. 3, 2003 show detailed display screens for a charting sequence from a charting subsystem of an example enterprise portfolio management system. A chart "vector," which defines all of the potential axes for a particular set of charts is associated with a datasheet. The axes thus preferably correspond to all of the dimensions viewable in the datasheet. Once a chart vector is created for a particular chart type (e.g., a bubble chart), the axes that correspond to the currently displayed presentation are dynamically selectable. Thus, the charts can redisplay the underlying datasheet investment data, without having to be rebuild the chart structure.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No.10/613,534, entitled "METHOD AND SYSTEM FOR OBJECT-ORIENTED MANAGEMENT OF MULTI-DIMENSIONAL DATA," filed Jul. 3, 2003, is incorporated herein by reference, in its entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems for creating, managing, and analyzing heterogeneous investment data discussed herein are applicable to other types of data management systems other than enterprise portfolio management. For example, the techniques used herein can be applied to homogeneous data such as streamlined inventory control systems or project management systems. One skilled in the art will also recognize that the methods and systems discussed herein are applicable to differing network protocols other than the Internet and web-based communication, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computer system for managing a plurality of types of enterprise portfolio data as investment items, each investment item having a source investment type and associated with a transition from the source investment type to a destination investment type, the associated transition configured to include indications to zero or more associated criteria and/or approvals, the method comprising:

presenting on a presentation device associated with the computer system a representation of one of the investment items including an indication of the source investment type and a graphical representation of the associated transition from the source investment type to the destination investment type;

receiving an indication, by the computer system, to perform the associated transition to transform the one of the investment items from the source investment type to the destination investment type; and transparently performing, by the computer system, the indicated transition to transform the one of the investment items from the source investment type to the destination investment type such that the representation of the one of the investment items now appears on the presentation device as a representation of an investment item of the destination investment type.

2. The method of claim 1 wherein the source investment type is the same as the destination investment type and the transition associated with the one of the investment items specifies a target location, and wherein the transparently performing the indicated transition to transform the one of the investment items to the destination investment type comprises moving the one of the investment items to the specified target location.

3. The method of claim 1 wherein the source investment type is different than the destination investment type.

4. The method of claim 1, further comprising:

receiving approval of the transition from at least one entity prior to transparently performing the transition of the one of the investment items to the destination investment type.

5. The method claim 4 wherein the receiving approval of the transition from at least one entity, further comprises:

when a list of entities needing to approve the transition is associated with the transition, notifying entities specified by the list to request approval of the transition; and receiving responses from the notified entities that the transition is approved.

6. The method of claim 5 wherein responses need to be received from all of the notified entities before the transition is approved.

7. The method of claim 6 wherein responses need to be received from a subset of the entities specified by the list before the transition is approved.

8. The method of claim 6 wherein the entities specified by the list to request approval are notified sequentially.

9. The method of claim 4 wherein the receiving approval of the transition from at least one entity further comprises receiving approval from at least one entity identified by a security role.

10. The method of claim 1, further comprising:
determining whether the transition is associated with at least one criterion to be evaluated;
when it is determined that the transition is associated with at least one criterion to be evaluated, evaluating the criterion prior to performing the transition.

11. The method of claim 10 wherein the evaluating the criterion prior to performing the transition determines whether to permit initiation of the transition.

12. The method of claim 10 wherein the evaluating the criterion to prior to transparently performing the transition further comprises:
evaluating the criterion to determine if the criterion is met, and, when the evaluated criterion is met, indicating that the potential transition is available to be initiated.

13. The method of claim 10, further comprising:
when the evaluated criterion is not met, preventing the transition from being initiated.

14. The method of claim 10 wherein the at least one criterion comprises a Boolean expression to be evaluated.

15. The method of claim 10 wherein the at least one criterion specifies a comparison of a value of an attribute of the investment item to another value.

16. The method of claim 10 wherein the at least one criterion specifies a comparison between at least two attributes of the investment item.

17. The method of claim 1 wherein the presenting the representation of the one of the investment items including the representation of the transition further comprises:
presenting a transition path having an indication of a source investment type and a destination investment type.

18. The method of claim 17 wherein the presenting the transition path further comprises an indication of any criteria to be met before initiation of the transition is permitted.

19. The method of claim 17 wherein the presenting the transition path further comprises an indication of whether there is a list of entities to approve the transition and whether the transition has been approved.

20. The method of claim 1, further comprising:
moving the transitioned investment item to a different location in a containment hierarchy associated with the enterprise portfolio data.

21. The method of claim 1 wherein the investment items are at least two of financial investments, project management, collections of projects, products, programs, assets, human resources, portfolios, initiatives, applications, operations, processes, and activities.

22. The method of claim 1, the enterprise portfolio data comprising at least two of engineering, marketing, product management, manufacturing, sales, information technology, finance, human resources, research, development, and professional services portfolios.

23. A memory medium containing instructions for controlling a computer processor to manage a plurality of types of enterprise portfolio data as investment items, each investment item having a source investment type and associated with a transition from the source investment type to a destination investment type, the associated transition configured to include indications to zero or more associated criteria and/or approvals, by performing a method comprising:
presenting on a presentation device a representation of one of the investment items including an indication of the source investment type and a graphical representation of the associated transition from the source investment type to the destination investment type;
receiving an indication to perform the transition to transform the one of the investment items from the source investment type to the destination investment type; and
transparently performing the transition of the one of the investment items from the source investment type to the destination investment type such that the representation of the one of the investment items now appears on the presentation device as a representation of an investment item of the destination investment type.

24. The memory medium of claim 23 wherein the source investment type is the same as the destination investment type and the transition associated with the one of the investment items specifies a target location, and wherein the instructions further control the computer processor by moving the one of the investment items to the specified target location.

25. The memory medium of claim 23 wherein the source investment type is different than the destination investment type.

26. The memory medium of claim 23, further containing instructions that control the computer processor to receive approval of the transition from at least one entity prior to performing the transition of the one of the investment items to the destination investment type.

27. The memory medium claim 26 further containing instructions that control the computer processor to notify a plurality of entities specified by a list to request approval of the transition.

28. The memory medium of claim 27 further containing instructions that control the computer processor to perform the transition only after approval is received from the at least one entity.

29. The memory medium of claim 23 further containing instructions that control the computer processor by:
determining whether the transition is associated with at least one criterion to be evaluated;
when it is determined that the transition is associated with at least one criterion to be evaluated, evaluating the criterion prior to performing the transition.

30. The memory medium of claim 29 wherein the at least one criterion is evaluated to determine whether to permit initiation of the transition.

31. The memory medium of claim 29 wherein, when the evaluated criterion is met, indicating that the potential transition is available to be initiated, and when the evaluated criteria is not met, indicating that the potential transition is not available to be initiated.

32. The memory medium of claim 29 wherein the at least one criterion comprises a Boolean expression to be evaluated.

33. The memory medium of claim 29 wherein the at least one criterion specifies a comparison of a value of an attribute of the investment item to another value.

34. The memory medium of claim 23 wherein the presented representation of the transition comprises a transition path having an indication of a source investment type and a destination investment type.

35. The memory medium of claim 34 wherein the transition path further comprises an indication of any criteria to be met before initiation of the transition is permitted.

36. The memory medium of claim 34 wherein the transition path further comprises an indication of whether the transition has been approved.

37. The memory medium of claim 23, further containing instructions that control the computer processor by:
moving the transitioned investment item to a different location in a containment hierarchy associated with the enterprise portfolio data.

38. A computer-implemented portfolio management system, comprising:
- a memory;
- a processor;
- a display device displaying a plurality of investment items of an organization displayed in a portfolio containment hierarchy, each item having a source investment type and associated with a transition from the source investment type to a destination investment type; and
- a portfolio management component stored in the memory and configured, when executed, to
  - display on the display device a representation of one of the investment items including an indication of the source investment type and a graphical representation of the associated transition from the source investment type to the destination investment type;
  - receive an indication, by the processor, to perform the transition to transform the one of the investment items from the source investment type to the destination investment type; and
  - as a result of the received indication, using the processor to transition the one of the investment items from the source investment type to the destination investment type such that the representation of the one of the investment items now appears on the display device as a representation of an investment item of the destination investment type.

39. The system of claim 38 wherein the source investment type is the same as the destination investment type and the transition associated with the one of the investment items specifies a target location, and wherein the portfolio management component is further configured to move the one of the investment items to the specified target location.

40. The system of claim 38 wherein the source investment type is different than the destination investment type.

41. The system of claim 38 wherein the portfolio management component is further configured to:
- receive approval of the transition from at least one entity prior to transitioning the one of the investment items to the destination investment type.

42. The system claim 41 wherein a list of entities that need to approve the transition is associated with the transition and wherein the portfolio management component is configured to notify the entities specified by the list to request approval of the transition and to receive responses from the notified entities.

43. The system of claim 42 wherein the entities specified by the list are notified sequentially.

44. The system of claim 41 wherein the at least one entity is identified by a security role.

45. The system of claim 38 wherein the portfolio management component is further configured to:
- determine whether the transition is associated with a set of criteria; and
- when it is determined that the transition is associated with the set of criteria, evaluate the criteria prior to transitioning the one of the investment items.

46. The system of claim 45 wherein the criteria is evaluated to determine whether to permit initiation of the transition.

47. The system of claim 45 wherein when the evaluation indicates that the criteria has been met, indicate that the potential transition is available to be initiated.

48. The system of claim 45 wherein when the evaluation indicates that the criteria has not been met, prevent the transition from being initiated.

49. The system of claim 45 wherein the criteria comprises at least one Boolean expression to be evaluated.

50. The system of claim 45 wherein the criteria specifies a comparison between a value of an attribute of the investment item and another value.

51. The system of claim 45 wherein the criteria specifies a comparison between at least two attributes of the investment item.

52. The system of claim 38 wherein the displayed representation of the transition associated with the one of the investment items displays a transition path that indicates a source investment type and a destination investment type.

53. The system of claim 52 wherein the displayed transition path indicates any criteria to be met before initiation of the transition is permitted.

54. The system of claim 52 wherein the displayed transition path indicates whether there is a list of entities to approve the transition and whether the transition has been approved.

55. The system of claim 38 wherein the portfolio management component is further configured to:
- move the transitioned investment item to a different location in the containment hierarchy.

* * * * *